(12) United States Patent
Wellum et al.

(10) Patent No.: US 11,762,705 B2
(45) Date of Patent: Sep. 19, 2023

(54) SYSTEM AND METHODS FOR CONFIGURING, DEPLOYING AND MAINTAINING COMPUTING CLUSTERS

(71) Applicant: SAS Institute Inc., Cary, NC (US)

(72) Inventors: Richard K. Wellum, Holly Springs, NC (US); Joseph Daniel Henry, Hillsborough, NC (US); Holden Ernest O'Neal, Raleigh, NC (US); John W. Waller, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/185,670

(22) Filed: Mar. 17, 2023

(65) Prior Publication Data
US 2023/0267010 A1  Aug. 24, 2023

Related U.S. Application Data

(63) Continuation of application No. 18/185,603, filed on Mar. 17, 2023.
(60) Provisional application No. 63/321,509, filed on Mar. 18, 2022, provisional application No. 63/311,914, filed on Feb. 18, 2022.

(51) Int. Cl.
*G06F 9/50* (2006.01)
*G06F 9/451* (2018.01)
*G06F 9/48* (2006.01)

(52) U.S. Cl.
CPC ........... *G06F 9/5044* (2013.01); *G06F 9/451* (2018.02); *G06F 9/4881* (2013.01)

(58) Field of Classification Search
None
See application file for complete search history.

(56) References Cited

U.S. PATENT DOCUMENTS

| 2017/0201569 A1 | 7/2017 | Fu |
| 2018/0165122 A1 | 6/2018 | Dobrev |
| 2019/0278928 A1 | 9/2019 | Rungta |

*Primary Examiner* — Wynuel S Aquino
(74) *Attorney, Agent, or Firm* — KDW FIRM PLLC

(57) ABSTRACT

An apparatus includes at least one node device to host a computing cluster, and at least one processor to: use at least one of a level of resource observed to be consumed by operation of the computing cluster or a level of performance observed to be provided by operation of the computing cluster as an input to a pre-existing cluster model to derive a predicted level; compare the predicted level to a corresponding observed level of resource consumed or performance provided; and in response to the predicted level not matching the observed level to within a pre-selected degree, derive a new cluster model from observations of the operation of the computing cluster, and generate a prompt to perform repeat the configuration of the computing cluster using the new cluster model in place of the pre-existing cluster model to generate a new set of configuration settings for the computing cluster.

30 Claims, 49 Drawing Sheets

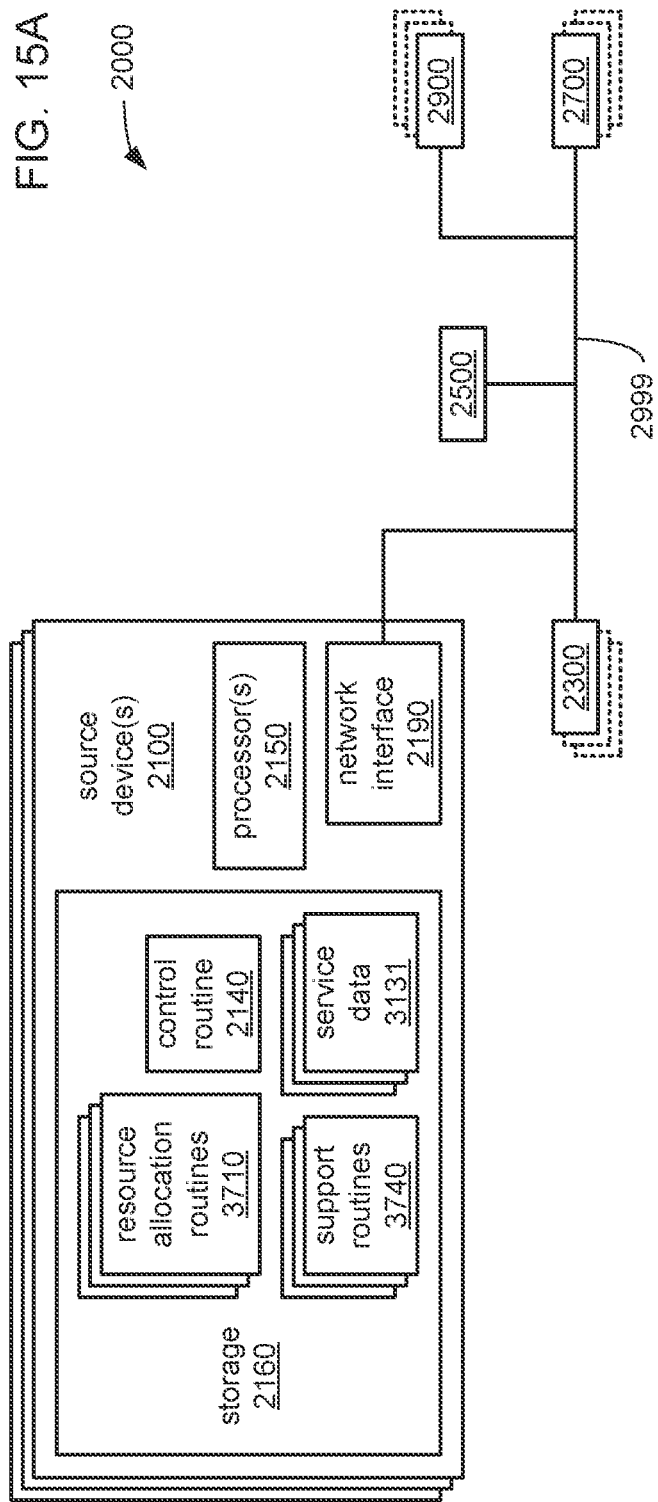

2000

2000

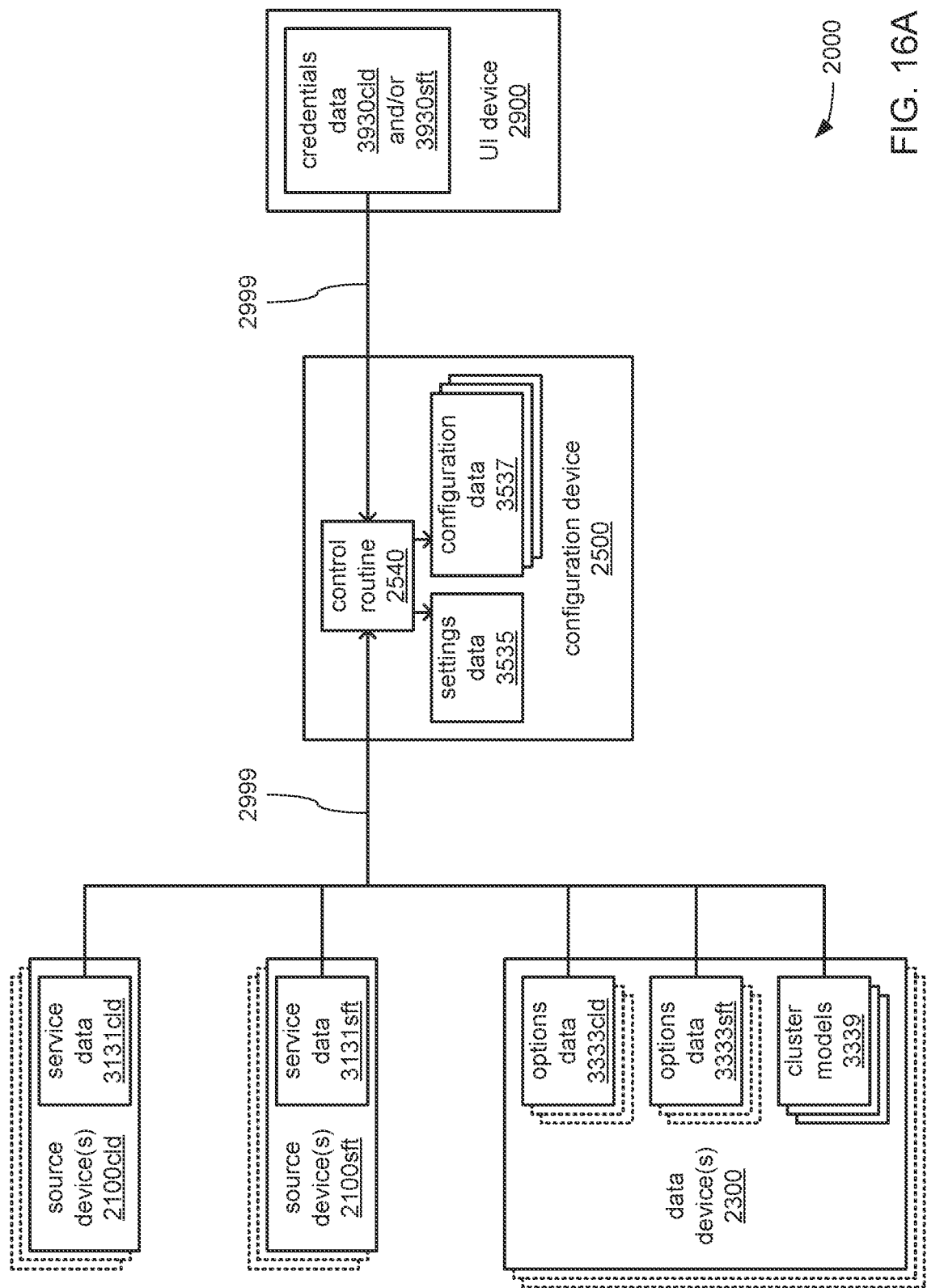

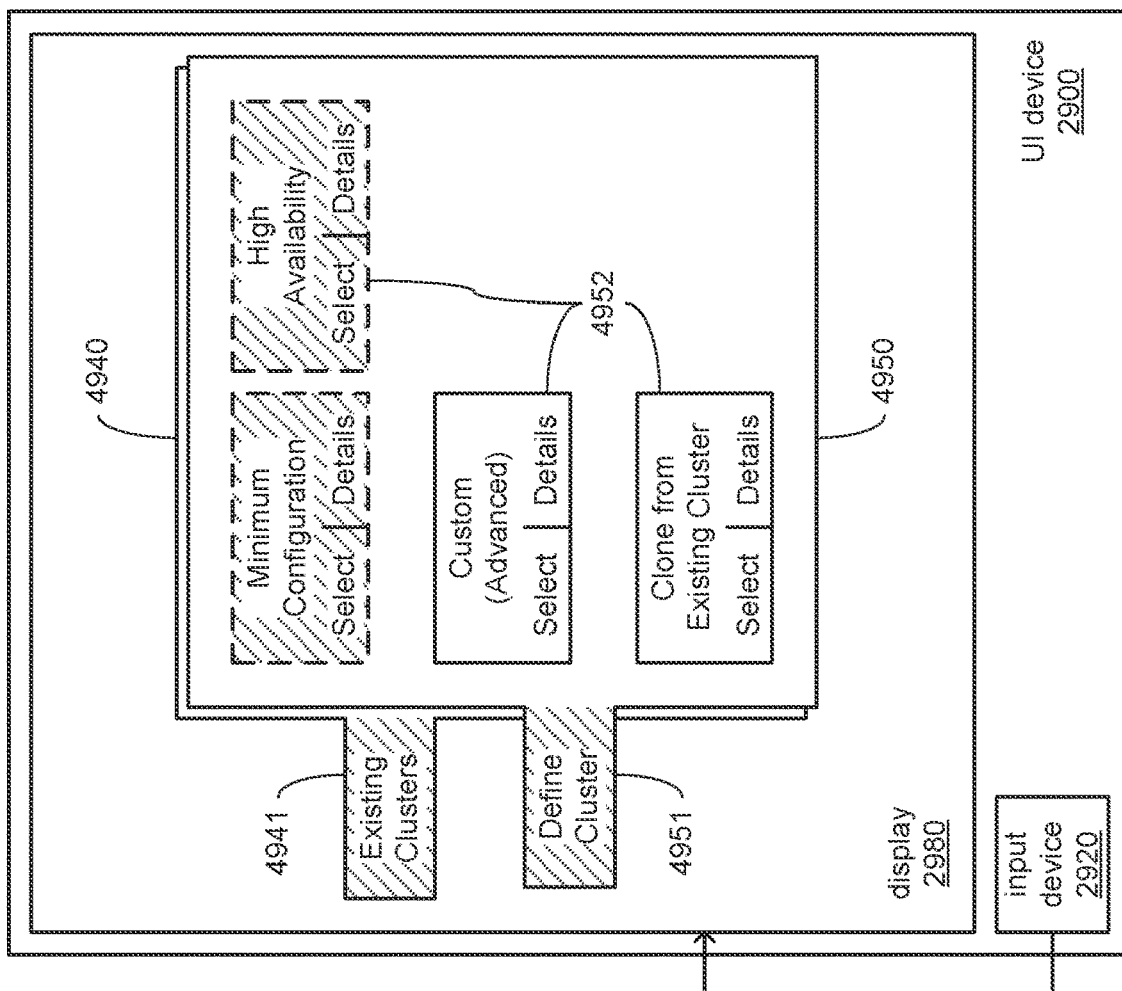
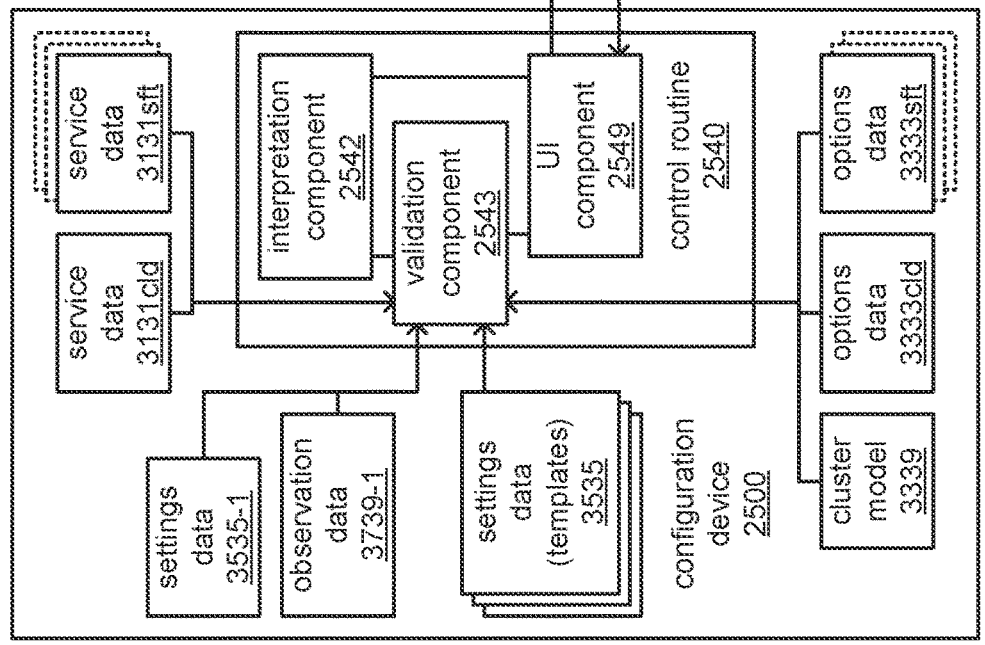
FIG. 17H

SYSTEM AND METHODS FOR CONFIGURING, DEPLOYING AND MAINTAINING COMPUTING CLUSTERS

CROSS-REFERENCE TO RELATED APPLICATIONS

This application is a continuation of, and claims the benefit of priority under 35 U.S.C. § 120 to, U.S. patent application Ser. No. 18/185,603 filed Mar. 17, 2023, and entitled "System and Methods for Configuring, Deploying and Maintaining Computing Clusters", which is incorporated herein by reference in its entirety for all purposes. In turn, U.S. patent application Ser. No. 18/185,603 claims the benefit of priority under 35 U.S.C. § 119(e) to both U.S. Provisional Application Ser. No. 63/311,914 filed Feb. 18, 2022, and U.S. Provisional Application Ser. No. 63/321,509 filed Mar. 18, 2022, which are both incorporated herein by reference in their entireties for all purposes.

BACKGROUND

It is well known to use computing clusters of physical or virtual computing devices to provide the processing resources of multiple processors and/or processor cores to support the performance of various analyses as sets of tasks that are able to be executed among the multiple processors and/or processor cores, at least partially in parallel. Such analyses may include the derivation of models and/or generation of visualizations from collected scientific and/or other testing data; the generation of predictions of ductile and/or brittle failure of structural components; the identification of correlations among observed behaviors of mechanical, biological, geological and/or meteorological systems; the generation of predictions of spread of fire, flooding and/or disease throughout a region; etc.

More recently, it has become commonplace for computing clusters of physical or virtual computing devices to be made available on a paid basis for use by various institutional customers, such as businesses, academic institutions, government departments, etc. In this way, such institutions are able to take advantage of ongoing improvements in computing devices and/or multi-processing techniques without having to take on the expense and expenditure of various resources to maintain computing clusters of physical or virtual computing devices, themselves. Such providers of access to physical and/or virtual computing devices for a fee are often referred to as "cloud providers" or "hosting providers." It has become commonplace to describe a computing cluster of physical or virtual computing devices that is deployed within a set of physical computing devices that are provided by for a fee by such providers as being "hosted in the cloud."

Also more recently, it has become commonplace to use various resource allocation routines together with various suites of support routines to provide and/or maintain a computing cluster of physical or virtual computing devices. Such resource allocation routines and suites of support routines are often developed by multiple different organizations that each employ entirely different approaches for configuration, deployment and/or maintenance of installations of their software. By way of example, for resource allocation software, it has become commonplace to use Kubernetes offered by the Cloud Native Computing Foundation of San Francisco, California, USA, in conjunction with the SAS Viya software suite offered by SAS Institute of Cary, North Carolina, USA, for a suite of support routines. Such software is often configured using script files based on differing scripting languages and/or application programming interfaces (APIs). As a result, successfully deploying an installation of such a diverse combination of software to set up and maintain one or more computing clusters of physical or virtual computing devices often requires learning multiple different scripting languages and/or APIs.

Added to these complexities is the commonplace use of still other scripting languages and/or APIs by cloud providers for the configuration of multiple physical or virtual computing devices on which a computing cluster is to reside, as well as to provide processing, storage and/or other resources for such a diverse combination of software. As those skilled in the art will readily recognize, this situation creates numerous opportunities for failure in deploying such combinations of a hosting service and software due to typographical errors made in scripting languages, as well as due to configuration errors arising from conflicting settings.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one node device to provide a selected level of hosting service to host a computing cluster, wherein: the at least one node device provides a level of a processing resource and a level of a storage resource to support execution of a selected resource allocation routine; the level of the processing resource and the level of the storage resource are defined by the selected level of hosting service; the selected resource allocation routine allocates the processing resource and the storage resource through provision of multiple containers; and each container of the multiple containers provides an execution environment in which to execute instructions of an executable routine to perform a task. The apparatus also includes at least one processor and a storage to store instructions that, when executed by the at least one processor, cause the at least one processor to perform operations including generate a user interface (UI) that provides guidance through a set of configuration settings for at least one of the provision of the processing resource, the provision of the storage resource, or the provision of the multiple containers, wherein, for each configuration setting of the set of configuration settings that is received as an input from an input device used to provide the UI: perform a check of the set of configuration settings to determine whether the received configuration setting creates a conflict among the set of configuration settings; and in response to a determination that the received configuration setting creates a conflict among the set of configuration settings, perform operations including generate an indication of the conflict for presentation by the UI, and receive a change to a configuration setting as an input from the input device. Also, for each received configuration setting, the at least one processor is also caused to generate a configuration script to configure at least one of the selected level of hosting service or the selected resource allocation routine based on the set of configuration settings.

A computer-program product tangibly embodied in a non-transitory machine-readable storage medium includes instructions operable to cause at least one processor to perform a configuration of a computing cluster, wherein: at least one node device is to provide a selected level of hosting service to host the computing cluster; the selected level of hosting service defines a level of processing resource and a level of storage resource provided by the at least one node device to support execution of a selected resource allocation routine; the selected resource allocation routine allocates the processing resource and the storage resource through provision of multiple containers; and each container of the multiple containers provides an execution environment in which to execute instructions of an executable routine to perform a task. Also, the at least one processor is caused to perform operations including generate a user interface (UI) that provides guidance through a set of configuration settings for at least one of the provision of the processing resource, the provision of the storage resource, or the provision of the multiple containers, wherein, for each configuration setting of the set of configuration settings that is received as an input from an input device used to provide the UI: perform a check of the set of configuration settings to determine whether the received configuration setting creates a conflict among the set of configuration settings; and in response to a determination that the received configuration setting creates a conflict among the set of configuration settings, perform operations including generate an indication of the conflict for presentation by the UI, and receive a change to a configuration setting as an input from the input device. Also, for each received configuration setting, the at least one processor is also caused to generate a configuration script to configure at least one of the selected level of hosting service or the selected resource allocation routine based on the set of configuration settings.

The level of the processing resource and the level of the storage resource provided by the at least one node device may support execution of a selected support routine in addition to the selected resource allocation routine; the selected support routine may provide a library of at least one callable routine able to be called by the executable routine executed within a container of the multiple containers; and the UI may additionally provide guidance through a subset of the set of configuration settings for the provision of the library of at least one callable routine.

The at least one processor may be caused to perform operations including generate an initial portion of the UI that provides: a first initial prompt that specifies at least one of the selected level of hosting service or a cloud provider that provides the selected level of hosting service; and a second initial prompt that specifies at least one of the selected resource allocation routine or a software provider that provides the selected resource allocation routine. The at least one processor may also be caused to perform operations including: based on first initial input received from the input device in response to the first initial prompt, retrieve first data specifying at least one of a known incompatibility or a known affinity of the selected level of hosting service with at least one resource allocation routine or at least one support routine; based on second initial input received from the input device in response to the second initial prompt, retrieve second data specifying at least one of a known incompatibility or a known affinity of the selected resource allocation routine or the selected support routine with at least one hosting service; perform an interoperability check for a combination of the selected level of hosting service, the selected resource allocation routine and the selected support routine based on the first data and the second data to determine whether the selected level of hosting service, the selected resource allocation routine and the selected support routine are interoperable with each other; and in response to a determination that at least two of the selected level of hosting service, the selected resource allocation routine or the selected support routine are not interoperable with each other, generate an indication that at least two of the selected level of hosting service, the selected resource allocation routine and the select support routine are not interoperable for presentation by through the UI.

The at least one processor may be caused to perform operations including generate an initial portion of the UI that provides: a first initial prompt to provide at least one of the selected level of hosting service or a cloud provider that provides the selected level of hosting service; and a second initial prompt to provide at least one of the selected resource allocation routine or a software provider that provides the selected resource allocation routine. The at least one processor may also be caused to, based on input received from the input device in response to the first initial prompt and the second initial prompt, retrieve, from among multiple stored cluster models, a cluster model associated with another computing cluster employing an identical combination of level of hosting service and resource allocation routine, wherein: the retrieved cluster model is generated based on levels of resources and levels of performance observed during operation of the other computing cluster; and the retrieved cluster model includes at least one correlation between a level of resources and a level of performance of the other computing cluster. The at least one processor may be further caused to: use the retrieved cluster model to generate at least one prediction of either a level of resources or a level of performance of the computing cluster; and use the at least one prediction in the check of the set of configuration settings.

The UI may include a set of menus; and each menu of the set of menus may include at least one prompt to provide input for a subset of configuration settings of the set of configuration settings. Also, the at least one processor may be caused to perform operations including: present each menu of the set of menus sequentially via a presentation device used to provide the UI; monitor the input device for the receipt of the input that specifies each configuration setting of the corresponding subset of configuration settings; and perform the check of the set of configuration settings in response to each instance of a presentation of one menu of the set of menus being followed by a presentation of another menu of the set of menus.

The generation of the indication of the conflict may include the at least one processor performing operations including: generate a visual presentation of a least a first portion of a first menu of the set of menus that comprises a first configuration setting of the set of configuration settings along with at least a second portion of a second menu of the set of menus that comprises a second configuration setting of the set of configuration settings that is in conflict with the first configuration setting; generate the first portion of the first menu to include visual highlighting of the first portion; and generate the second portion of the second menu to include visual highlighting of the second portion.

The at least one processor may be caused to perform operations including: generate an editing portion of the UI comprising a visual presentation of text of the configuration script to enable editing of the text of the configuration script via operation of the input device to introduce a customization of at least one configuration setting into the configuration script; after completion of the editing of the text of the configuration script, parse the configuration script to interpret the at least one customization; perform a check of the set of configuration settings to determine whether the customization creates a conflict between the customization and at least one other configuration setting; and in response to a determination that the customization creates a conflict between the customization and at least one other setting, generate an indication of the conflict between the customization and the at least one other setting.

The generation of the indication of the conflict between the customization and the at least one other setting may include the at least one processor performing operations including: generate a visual presentation of a portion of the configuration script that comprises the customization along with a portion of the set of the set of configuration settings that includes the at least one other configuration setting; generate the portion of the configuration script to include visual highlighting of the customization; and generate the at least one other configuration setting to include visual highlighting of the at least one other setting.

The check of the set of configuration settings may include: using a level of a resource that is to be provided by the selected level of hosting service as an input to a cluster model to derive a predicted level of performance of the computing cluster; and comparing the predicted level of performance to a level of performance specified as one of the configuration settings. The level of a resource that is to be provided by the selected level of hosting service may include at least one of: a quantity of multiple node devices of the at least one node device; a quantity of VMs instantiated within the at least one node device; a quantity of processors of multiple processors of the at least one node device; a quantity of cores of the multiple processors of the at least one node device; or an amount of electrical power consumed by the at least one node device during a preselected period of time. The predicted level of performance may include at least one of: a quantity of containers to be simultaneously provided by the computing cluster; a quantity of users to be simultaneously supported by the computing cluster; or an amount of cost to operate the computing cluster during the preselected period of time.

The check of the set of configuration settings may include: using a level of performance of the computing cluster as an input to a cluster model to derive a predicted level of a resource that is to be provided by the selected level of hosting service; and comparing the predicted level of a resource to a level of resource that is specified in one of the configuration settings to be provided by the selected level of hosting service. The level of performance may include at least one of: a quantity of containers to be simultaneously provided by the computing cluster; a quantity of users to be simultaneously supported by the computing cluster; or an amount of cost to operate the computing cluster per during a preselected period of time. The predicted level of a resource that is to be provided by the selected level of hosting service may include at least one of: a quantity of multiple node devices of the at least one node device; a quantity of VMs instantiated within the at least one node device; a quantity of processors of multiple processors of the at least one node device; a quantity of cores of the multiple processors of the at least one node device; or an amount of electrical power consumed by the at least one node device during the preselected period of time.

The at least one node device may include multiple node devices; and the computing cluster may include the multiple node devices to form a cluster of physical computing devices. The level of the processing resource may include at least one of: a quantity of node devices of the multiple node devices; a quantity of processors provided by the multiple node devices; or a quantity of cores of the processors provided by the multiple node devices. The level of storage resource may include at least one of: a quantity of volatile storage provided by the multiple node devices; a quantity of nonvolatile storage provided by the multiple node devices; or a quantity of virtual storage provided within the quantity of nonvolatile storage provided by the multiple node devices.

The computing cluster may include multiple virtual machines (VMs) instantiated within the at least one node device to form a cluster of virtual computing devices. The level of the processing resource may include at least one of: a quantity of VMs of the multiple VMs; a quantity of processors of the at least one node device that are provided to the multiple VMs; or a quantity of cores of the processors of the at least one node device that are provided to the multiple VMs. The level of storage resource comprises at least one of: a quantity of volatile storage of the at least one node device that is provided to the multiple VMs; a quantity of nonvolatile storage of the at least one node device that is provided to the multiple VMs; or a quantity of virtual storage within the quantity of nonvolatile storage that is provided to the multiple VMs.

A computer-implemented method for configuring a computing cluster, wherein at least one node device is to provide a selected level of hosting service to host the computing cluster; the selected level of hosting service defines a level of processing resource and a level of storage resource provided by the at least one node device to support execution of a selected resource allocation routine; the selected resource allocation routine allocates the processing resource and the storage resource through provision of multiple containers; and each container of the multiple containers provides an execution environment in which to execute instructions of an executable routine to perform a task. The method includes generating, by at least one processor, a user interface (UI) that provides guidance through a set of configuration settings for at least one of the provision of the processing resource, the provision of the storage resource, or the provision of the multiple containers, wherein, for each configuration setting of the set of configuration settings that is received as an input from an input device used to provide the UI, the method includes: performing, by the at least one processor, a check of the set of configuration settings to determine whether the received configuration setting creates a conflict among the set of configuration settings; and in response to a determination that the received configuration setting creates a conflict among the set of configuration settings, performing operations including generating, by the at least one processor, an indication of the conflict for presentation by the UI and receiving, at the at least one processor, a change to a configuration setting as an input from the input device. The method also includes, for each received configuration setting, generating, by the at least one processor, a configuration script to configure at least one of the selected level of hosting service or the selected resource allocation routine based on the set of configuration settings.

The level of the processing resource and the level of the storage resource provided by the at least one node device may support execution of a selected support routine in addition to the selected resource allocation routine; the selected support routine may provide a library of at least one callable routine able to be called by the executable routine executed within a container of the multiple containers; and the method may include, generating, by the at least one processor, the UI to additionally provide guidance through a subset of the set of configuration settings for the provision of the library of at least one callable routine.

The method may also include generating, by the at least one processor, an initial portion of the UI that provides: a first initial prompt that specifies at least one of the selected level of hosting service or a cloud provider that provides the selected level of hosting service; and a second initial prompt that specifies at least one of the selected resource allocation routine or a software provider that provides the selected resource allocation routine. The method may further include: based on first initial input received from the input device in response to the first initial prompt, retrieving first data specifying at least one of a known incompatibility or a known affinity of the selected level of hosting service with at least one resource allocation routine or at least one support routine; based on second initial input received from the input device in response to the second initial prompt, retrieving second data specifying at least one of a known incompatibility or a known affinity of the selected resource allocation routine or the selected support routine with at least one hosting service; performing, by the at least one processor, an interoperability check for a combination of the selected level of hosting service, the selected resource allocation routine and the selected support routine based on the first data and the second data to determine whether the selected level of hosting service, the selected resource allocation routine and the selected support routine are interoperable with each other; and in response to a determination that at least two of the selected level of hosting service, the selected resource allocation routine or the selected support routine are not interoperable with each other, generating, by the at least one processor, an indication that at least two of the selected level of hosting service, the selected resource allocation routine and the select support routine are not interoperable for presentation by through the UI.

The method may also include generating, by the at least one processor, an initial portion of the UI that provides: a first initial prompt to provide at least one of the selected level of hosting service or a cloud provider that provides the selected level of hosting service; and a second initial prompt to provide at least one of the selected resource allocation routine or a software provider that provides the selected resource allocation routine. The method may further include, based on input received from the input device in response to the first initial prompt and the second initial prompt, retrieving, from among multiple stored cluster models, a cluster model associated with another computing cluster employing an identical combination of level of hosting service and resource allocation routine, wherein: the retrieved cluster model is generated based on levels of resources and levels of performance observed during operation of the other computing cluster; and the retrieved cluster model includes at least one correlation between a level of resources and a level of performance of the other computing cluster. The method may still further include: using, by the at least one processor, the retrieved cluster model to generate at least one prediction of either a level of resources or a level of performance of the computing cluster; and using, by the at least one processor, the at least one prediction in the check of the set of configuration settings.

The UI may include a set of menus; each menu of the set of menus may include at least one prompt to provide input for a subset of configuration settings of the set of configuration settings; and the method may include: presenting each menu of the set of menus sequentially via a presentation device used to provide the UI; monitor the input device for the receipt of the input that specifies each configuration setting of the corresponding subset of configuration settings; and performing, by the at least one processor, the check of the set of configuration settings in response to each instance of a presentation of one menu of the set of menus being followed by a presentation of another menu of the set of menus.

The generation of the indication of the conflict may include: generating, by the at least one processor, a visual presentation of a least a first portion of a first menu of the set of menus that comprises a first configuration setting of the set of configuration settings along with at least a second portion of a second menu of the set of menus that comprises a second configuration setting of the set of configuration settings that is in conflict with the first configuration setting; generating, by the at least one processor, the first portion of the first menu to include visual highlighting of the first portion; and generating, by the at least one processor, the second portion of the second menu to include visual highlighting of the second portion.

The method may include: generating, by the at least one processor, an editing portion of the UI comprising a visual presentation of text of the configuration script to enable editing of the text of the configuration script via operation of the input device to introduce a customization of at least one configuration setting into the configuration script; after completion of the editing of the text of the configuration script, parsing, by the at least one processor, the configuration script to interpret the at least one customization; performing, by the at least one processor, a check of the set of configuration settings to determine whether the customization creates a conflict between the customization and at least one other configuration setting; and in response to a determination that the customization creates a conflict between the customization and at least one other setting, generating, by the at least one processor, an indication of the conflict between the customization and the at least one other setting.

The generation of the indication of the conflict between the customization and the at least one other setting may include: generating, by the at least one processor, a visual presentation of a portion of the configuration script that comprises the customization along with a portion of the set of the set of configuration settings that includes the at least one other configuration setting; generating, by the at least one processor, the portion of the configuration script to include visual highlighting of the customization; and generating, by the at least one processor, the at least one other configuration setting to include visual highlighting of the at least one other setting.

The check of the set of configuration settings may include: using a level of a resource that is to be provided by the selected level of hosting service as an input to a cluster model to derive a predicted level of performance of the computing cluster; and comparing the predicted level of performance to a level of performance specified as one of the configuration settings. The level of a resource that is to be provided by the selected level of hosting service may include at least one of: a quantity of multiple node devices of the at least one node device; a quantity of VMs instantiated within the at least one node device; a quantity of processors of multiple processors of the at least one node device; a quantity of cores of the multiple processors of the at least one node device; or an amount of electrical power consumed by the at least one node device during a preselected period of time. The predicted level of performance may include at least one of: a quantity of containers to be simultaneously provided by the computing cluster; a quantity of users to be simultaneously supported by the computing cluster; or an amount of cost to operate the computing cluster during the preselected period of time.

The check of the set of configuration settings may include: using a level of performance of the computing cluster as an input to a cluster model to derive a predicted level of a resource that is to be provided by the selected level of hosting service; and comparing the predicted level of a resource to a level of resource that is specified in one of the configuration settings to be provided by the selected level of hosting service. The level of performance may include at least one of: a quantity of containers to be simultaneously provided by the computing cluster; a quantity of users to be simultaneously supported by the computing cluster; or an amount of cost to operate the computing cluster per during a preselected period of time. The predicted level of a resource that is to be provided by the selected level of hosting service may include at least one of: a quantity of multiple node devices of the at least one node device; a quantity of VMs instantiated within the at least one node device; a quantity of processors of multiple processors of the at least one node device; a quantity of cores of the multiple processors of the at least one node device; or an amount of electrical power consumed by the at least one node device during the preselected period of time.

The at least one node device may include multiple node devices; and the computing cluster may include the multiple node devices to form a cluster of physical computing devices. The level of the processing resource may include at least one of: a quantity of node devices of the multiple node devices; a quantity of processors provided by the multiple node devices; or a quantity of cores of the processors provided by the multiple node devices. The level of storage resource may include at least one of: a quantity of volatile storage provided by the multiple node devices; a quantity of nonvolatile storage provided by the multiple node devices; or a quantity of virtual storage provided within the quantity of nonvolatile storage provided by the multiple node devices.

The computing cluster may include multiple virtual machines (VMs) instantiated within the at least one node device to form a cluster of virtual computing devices. The level of the processing resource may include at least one of: a quantity of VMs of the multiple VMs; a quantity of processors of the at least one node device that are provided to the multiple VMs; or a quantity of cores of the processors of the at least one node device that are provided to the multiple VMs. The level of storage resource comprises at least one of: a quantity of volatile storage of the at least one node device that is provided to the multiple VMs; a quantity of nonvolatile storage of the at least one node device that is provided to the multiple VMs; or a quantity of virtual storage within the quantity of nonvolatile storage that is provided to the multiple VMs.

An apparatus includes a computing cluster that employs a combination of at least a selected level of hosting service and a selected resource allocation routine, wherein: an initial set of configuration settings for the computing cluster is generated during an initial configuration of the computing cluster performed at a time prior to operation of the computing cluster; the initial configuration of the computing cluster is based on at least one prediction generated using a pre-existing cluster model that is derived from observations of operation of at least one pre-existing computing cluster; and the at least one pre-existing computing cluster employs a combination of at least a level of hosting service and a resource allocation routine that is identical to the combination of at least the selected level of hosting service and the selected resource allocation routine of the computing cluster. The apparatus also includes at least one node device to provide the selected level of hosting service to host the computing cluster, wherein: the at least one node device provides a level of a processing resource and a level of a storage resource to support execution of the selected resource allocation routine; the selected resource allocation routine allocates the processing resource and the storage resource of the at least one node device through provision of multiple containers; and each container of the multiple containers provides an execution environment in which to execute instructions of an executable routine to perform a task. The apparatus further includes at least one processor and a storage to store instructions that, when executed by the at least one processor, cause the at least one processor to perform operations including: use at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster; compare the predicted level to a corresponding observed level of resource consumed or of performance provided; and in response to the predicted level not matching the observed level to within a pre-selected degree, perform operations including derive a new cluster model from observations of the operation of the computing cluster, and generate a prompt to perform a repetition of the configuration of the computing cluster using the new cluster model in place of the pre-existing cluster model to generate a new set of configuration settings for the computing cluster that replaces the initial set of configuration settings.

A computer-program product tangibly embodied in a non-transitory machine-readable storage medium includes instructions operable to cause at least one processor to conditionally repeat configuration of a computing cluster, wherein: the computing cluster employs a combination of at least a selected level of hosting service and a selected resource allocation routine; an initial set of configuration settings for the computing cluster is generated during an initial configuration of the computing cluster performed at a time prior to operation of the computing cluster; the initial configuration of the computing cluster is based on at least one prediction generated using a pre-existing cluster model that is derived from observations of operation of at least one pre-existing computing cluster; the at least one pre-existing computing cluster employs a combination of at least a level of hosting service and a resource allocation routine that is identical to the combination of at least the selected level of hosting service and the selected resource allocation routine of the computing cluster; at least one node device provides the selected level of hosting service to host the computing cluster; the selected level of hosting service defines a level of processing resource and a level of storage resource provided by the at least one node device to support execution of a selected resource allocation routine; the selected resource allocation routine allocates the processing resource and the storage resource of the at least one node device through provision of multiple containers; and each container of the multiple containers provides an execution environment in which to execute instructions of an executable routine to perform a task. The at least one processor is caused to perform operations including: use at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster; compare the predicted level to a corresponding observed level of resource consumed or of performance provided; and in response to the predicted level not matching the observed level to within a pre-selected degree, perform operations including derive a new cluster model from observations of the operation of the computing cluster, and generate a prompt to perform a repetition of the configuration of the computing cluster using the new cluster model in place of the pre-existing cluster model to generate a new set of configuration settings for the computing cluster that replaces the initial set of configuration settings.

The prompt to perform the repetition of the configuration of the computing cluster may be generated in a user interface (UI), and the at least one processor may be caused to perform operations including: compare the observed level of resource consumed or of performance provided to a corresponding minimum level or maximum level specified in the initial set of configuration settings; and in response to the observed level falling below the corresponding minimum level, or in response to the observed level rising above the corresponding maximum level, generate the UI to include an indication of the minimum level not being reached or an indication of the maximum level being exceeded.

During the initial configuration of the computing cluster, an initial configuration script to configure at least one of the selected level of hosting service or the selected resource allocation routine may have been generated based on the initial set of configuration settings; the initial configuration script may have been edited to include a customization of at least one configuration setting of the initial set of configuration settings that is associated with the corresponding minimum level or maximum level; and generation of the UI to include an indication of the minimum level not being reached or an indication of the maximum level being exceeded may include the at least one processor being caused to generate a view of a portion of the initial configuration script that includes the customization of the at least one configuration setting.

During the initial configuration of the computing cluster, an initial interoperability check of the combination of at least the selected level of hosting service and the selected resource allocation routine may have been performed to determine whether at least the selected level of hosting service and the selected resource allocation routine are interoperable with each other; and the prompt to perform the repetition of the configuration of the computing cluster may be generated in a user interface (UI). Also, in response to receiving, from an input device used to provide the UI, input indicative of a choice to perform a repetition of the configuration of the computing cluster, the at least one processor may be caused to perform operations including: retrieve first data specifying at least one of a known incompatibility or a known affinity of the selected level of hosting service with at least one resource allocation routine; retrieve second data specifying at least one of a known incompatibility or a known affinity of the selected resource allocation routine with at least one hosting service; perform a repetition of the interoperability check for the combination of at least the selected level of hosting service and the selected resource allocation routine based on the first data and the second data to determine whether the selected level of hosting service and the selected resource allocation routine are interoperable with each other; and in response to a determination that the selected level of hosting service and the selected resource allocation routine are not interoperable with each other, generate an indication that the selected level of hosting service and the selected resource allocation routine are not interoperable for presentation by through the UI.

The prompt to perform the repetition of the configuration of the computing cluster may be generated in a user interface (UI), and in response to receiving, from an input device used to provide the UI, input indicative of a choice to perform a repetition of the configuration of the computing cluster, the at least one processor may be caused to perform operations comprising: retrieve, from among multiple stored sets of configuration settings associated with multiple other computing clusters, at least one alternate set of configuration settings associated with at least one other computing cluster that employs a combination of at least a level of hosting service and a resource allocation routine that is identical to the combination of at least the selected level of hosting service and the selected resource allocation routine of the computing cluster; generate the UI to include a prompt to choose between using the initial set of configuration settings, and using an alternate set of configuration settings of the at least one alternate set of configuration settings, as a template of default configuration settings for the repetition of the configuration of the computing cluster to generate the new set of configuration settings; receive, from the input device, input indicative of a selection of a set of configuration settings to use as the template of default configuration settings; perform an initial check of the selected set of configuration settings to determine whether the selected set of configuration settings includes a conflict among the selected set of configuration settings; and in response to a determination that the selected set of configuration settings includes a conflict among the selected set of configuration settings, perform operations including generate an indication of the conflict for presentation in the UI, and receive a change to a configuration setting as an input from the input device.

The new cluster model may include at least one correlation between a level of resources consumed by the computing cluster and a level of performance provided by the computing cluster based on the observations of the operation of the computing cluster, and performing the initial check of the selected set of configuration settings may include the at least one processor performing operations including: use an observation of at least one of a level of resource consumed by operation of the computing cluster or a level of performance provided by operation of the computing cluster as an input to the new cluster model to derive a predicted level of resource consumed or of performance provided; and compare the predicted level to a corresponding minimum level or maximum level of resource consumed or of performance provided that is specified in the selected set of configuration settings to determine whether the selected set of configuration settings includes a conflict among the selected set of configuration settings.

The at least one processor may be caused to perform operations including: generate a new configuration script to configure at least one of the selected level of hosting service or the selected resource allocation routine based on the new set of configuration settings; generate an editing portion of the UI comprising a visual presentation of text of the new configuration script to enable editing of the text of the new configuration script via operation of the input device to introduce a customization of at least one configuration setting into the new configuration script; after completion of the editing of the text of the new configuration script, parse the new configuration script to interpret the at least one customization; perform a check of the new set of configuration settings to determine whether the customization creates a conflict between the customization and at least one other configuration setting; and in response to a determination that the customization creates a conflict between the customization and at least one other setting, generate an indication of the conflict between the customization and the at least one other setting for presentation in the UI.

The computing cluster may employ a combination of the selected level of hosting service, the selected resource allocation routine and a selected support routine; the level of the processing resource and the level of the storage resource provided by the at least one node device may support execution of the selected support routine in addition to the selected resource allocation routine; the selected support routine may provide a library of at least one callable routine able to be called by the executable routine executed within a container of the multiple containers; the pre-existing cluster model may be derived from observations of multiple pre-existing computing clusters that each employ a combination of a level of hosting service, a resource allocation routine and a support routine that is identical to the combination of the selected level of hosting service, the selected resource allocation routine and the selected support routine of the computing cluster; and deriving the new cluster model from the observations of the operation of the computing cluster may include the at least one processor updating the pre-existing cluster model to become additionally based on the observations of the operation of the computing cluster to generate the new cluster model.

The at least one node device may include multiple node devices; and the computing cluster may include the multiple node devices to form a cluster of physical computing devices. The level of the processing resource may include at least one of: a quantity of node devices of the multiple node devices; a quantity of processors provided by the multiple node devices; or a quantity of cores of the processors provided by the multiple node devices. The level of storage resource may include at least one of: a quantity of volatile storage provided by the multiple node devices; a quantity of nonvolatile storage provided by the multiple node devices; or a quantity of virtual storage provided within the quantity of nonvolatile storage provided by the multiple node devices.

The computing cluster may include multiple virtual machines (VMs) instantiated within the at least one node device to form a cluster of virtual computing devices. The level of the processing resource may include at least one of: a quantity of VMs of the multiple VMs; a quantity of processors of the at least one node device that are provided to the multiple VMs; or a quantity of cores of the processors of the at least one node device that are provided to the multiple VMs. The level of storage resource may include at least one of: a quantity of volatile storage of the at least one node device that is provided to the multiple VMs; a quantity of nonvolatile storage of the at least one node device that is provided to the multiple VMs; or a quantity of virtual storage within the quantity of nonvolatile storage that is provided to the multiple VMs.

A computer-implemented method for conditionally repeating configuration of a computing cluster, wherein: the computing cluster employs a combination of at least a selected level of hosting service and a selected resource allocation routine; an initial set of configuration settings for the computing cluster is generated during an initial configuration of the computing cluster performed at a time prior to operation of the computing cluster; the initial configuration of the computing cluster is based on at least one prediction generated using a pre-existing cluster model that is derived from observations of operation of at least one pre-existing computing cluster; the at least one pre-existing computing cluster employs a combination of at least a level of hosting service and a resource allocation routine that is identical to the combination of at least the selected level of hosting service and the selected resource allocation routine of the computing cluster; at least one node device provides the selected level of hosting service to host the computing cluster; the selected level of hosting service defines a level of processing resource and a level of storage resource provided by the at least one node device to support execution of a selected resource allocation routine; the selected resource allocation routine allocates the processing resource and the storage resource of the at least one node device through provision of multiple containers; and each container of the multiple containers provides an execution environment in which to execute instructions of an executable routine to perform a task. The method includes: using, by at least one processor, at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster; comparing, by the at least one processor, the predicted level to a corresponding observed level of resource consumed or of performance provided; and in response to the predicted level not matching the observed level to within a pre-selected degree, performing operations including: deriving, by the at least one processor, a new cluster model from observations of the operation of the computing cluster; and generating, by the at least one processor, a prompt to perform a repetition of the configuration of the computing cluster using the new cluster model in place of the pre-existing cluster model to generate a new set of configuration settings for the computing cluster that replaces the initial set of configuration settings.

The prompt to perform the repetition of the configuration of the computing cluster may be generated in a user interface (UI), and the method may include: comparing, by the at least one processor, the observed level of resource consumed or of performance provided to a corresponding minimum level or maximum level specified in the initial set of configuration settings; and in response to the observed level falling below the corresponding minimum level, or in response to the observed level rising above the corresponding maximum level, generating, by the at least one processor, the UI to include an indication of the minimum level not being reached or an indication of the maximum level being exceeded.

During the initial configuration of the computing cluster, an initial configuration script to configure at least one of the selected level of hosting service or the selected resource allocation routine may have been generated based on the initial set of configuration settings; the initial configuration script may have been edited to include a customization of at least one configuration setting of the initial set of configuration settings that is associated with the corresponding minimum level or maximum level; and generating the UI to include an indication of the minimum level not being reached or an indication of the maximum level being exceeded may include generating, by the at least one processor, a view of a portion of the initial configuration script that includes the customization of the at least one configuration setting.

During the initial configuration of the computing cluster, an initial interoperability check of the combination of at least the selected level of hosting service and the selected resource allocation routine may have been performed to determine whether at least the selected level of hosting service and the selected resource allocation routine are interoperable with each other; and the prompt to perform the repetition of the configuration of the computing cluster may be generated in a user interface (UI). Also, the method may include, in response to receiving, from an input device used to provide the UI, input indicative of a choice to perform a repetition of the configuration of the computing cluster, performing operations including: retrieving first data specifying at least one of a known incompatibility or a known affinity of the selected level of hosting service with at least one resource allocation routine; retrieving second data specifying at least one of a known incompatibility or a known affinity of the selected resource allocation routine with at least one hosting service; performing, by the at least one processor, a repetition of the interoperability check for the combination of at least the selected level of hosting service and the selected resource allocation routine based on the first data and the second data to determine whether the selected level of hosting service and the selected resource allocation routine are interoperable with each other; and in response to a determination that the selected level of hosting service and the selected resource allocation routine are not interoperable with each other, generating by the at least one processor, an indication that the selected level of hosting service and the selected resource allocation routine are not interoperable for presentation by through the UI.

The prompt to perform the repetition of the configuration of the computing cluster may be generated in a user interface (UI), and the method may include, in response to receiving, from an input device used to provide the UI, input indicative of a choice to perform a repetition of the configuration of the computing cluster, performing operations including: retrieving, from among multiple stored sets of configuration settings associated with multiple other computing clusters, at least one alternate set of configuration settings associated with at least one other computing cluster that employs a combination of at least a level of hosting service and a resource allocation routine that is identical to the combination of at least the selected level of hosting service and the selected resource allocation routine of the computing cluster; generating, by the at least one processor, the UI to include a prompt to choose between using the initial set of configuration settings, and using an alternate set of configuration settings of the at least one alternate set of configuration settings, as a template of default configuration settings for the repetition of the configuration of the computing cluster to generate the new set of configuration settings; receiving, from the input device, input indicative of a selection of a set of configuration settings to use as the template of default configuration settings; performing, by the at least one processor, an initial check of the selected set of configuration settings to determine whether the selected set of configuration settings includes a conflict among the selected set of configuration settings; and in response to a determination that the selected set of configuration settings includes a conflict among the selected set of configuration settings, performing operations including generating, by the at least one processor, an indication of the conflict for presentation in the UI, and receiving a change to a configuration setting as an input from the input device.

The new cluster model may include at least one correlation between a level of resources consumed by the computing cluster and a level of performance provided by the computing cluster based on the observations of the operation of the computing cluster, and performing the initial check of the selected set of configuration settings may include: using, by the at least one processor, an observation of at least one of a level of resource consumed by operation of the computing cluster or a level of performance provided by operation of the computing cluster as an input to the new cluster model to derive a predicted level of resource consumed or of performance provided; and comparing, by the at least one processor, the predicted level to a corresponding minimum level or maximum level of resource consumed or of performance provided that is specified in the selected set of configuration settings to determine whether the selected set of configuration settings includes a conflict among the selected set of configuration settings.

The method may include: generating, by the at least one processor, a new configuration script to configure at least one of the selected level of hosting service or the selected resource allocation routine based on the new set of configuration settings; generating, by the at least one processor, an editing portion of the UI comprising a visual presentation of text of the new configuration script to enable editing of the text of the new configuration script via operation of the input device to introduce a customization of at least one configuration setting into the new configuration script; after completion of the editing of the text of the new configuration script, parsing, by the at least one processor, the new configuration script to interpret the at least one customization; performing, by the at least one processor, a check of the new set of configuration settings to determine whether the customization creates a conflict between the customization and at least one other configuration setting; and in response to a determination that the customization creates a conflict between the customization and at least one other setting, generating by the at least one processor, an indication of the conflict between the customization and the at least one other setting for presentation in the UI.

The computing cluster may employ a combination of the selected level of hosting service, the selected resource allocation routine and a selected support routine; the level of the processing resource and the level of the storage resource provided by the at least one node device may support execution of the selected support routine in addition to the selected resource allocation routine; the selected support routine may provide a library of at least one callable routine able to be called by the executable routine executed within a container of the multiple containers; the pre-existing cluster model may be derived from observations of multiple pre-existing computing clusters that each employ a combination of a level of hosting service, a resource allocation routine and a support routine that is identical to the combination of the selected level of hosting service, the selected resource allocation routine and the selected support routine of the computing cluster; and deriving the new cluster model from the observations of the operation of the computing cluster may include updating, by the at least one processor, the pre-existing cluster model to become additionally based on the observations of the operation of the computing cluster to generate the new cluster model.

The at least one node device may include multiple node devices; and the computing cluster may include the multiple node devices to form a cluster of physical computing devices. The level of the processing resource may include at least one of: a quantity of node devices of the multiple node devices; a quantity of processors provided by the multiple node devices; or a quantity of cores of the processors provided by the multiple node devices. The level of storage resource may include at least one of: a quantity of volatile storage provided by the multiple node devices; a quantity of nonvolatile storage provided by the multiple node devices; or a quantity of virtual storage provided within the quantity of nonvolatile storage provided by the multiple node devices.

The computing cluster may include multiple virtual machines (VMs) instantiated within the at least one node device to form a cluster of virtual computing devices. The level of the processing resource may include at least one of: a quantity of VMs of the multiple VMs; a quantity of processors of the at least one node device that are provided to the multiple VMs; or a quantity of cores of the processors of the at least one node device that are provided to the multiple VMs. The level of storage resource may include at least one of: a quantity of volatile storage of the at least one node device that is provided to the multiple VMs; a quantity of nonvolatile storage of the at least one node device that is provided to the multiple VMs; or a quantity of virtual storage within the quantity of nonvolatile storage that is provided to the multiple VMs.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A, 15B, 15C, 15D, 15E, 15F, 15G, 15H, 15I, 15J, 15K and 15L, together, illustrate aspects of devices, data structures and executable routines of the distributed processing system of either of FIG. 14A or 14B in greater detail.

FIGS. 16A, 16B and 16C, together, illustrate an overview of an example embodiment of use of the distributed processing system of either of FIG. 14A or 14B to configure, provision and/or monitor the operation of a new computing cluster.

FIGS. 17A, 17B, 17C, 17D, 17E, 17F, 17G, 17H, 17I, 17J, 17K, 17L, 17M and 17N, together, illustrate aspects of an example embodiment of use of the distributed processing system of either of FIG. 14A or 14B to configure a new computing cluster in greater detail.

DETAILED DESCRIPTION

Figure 1:
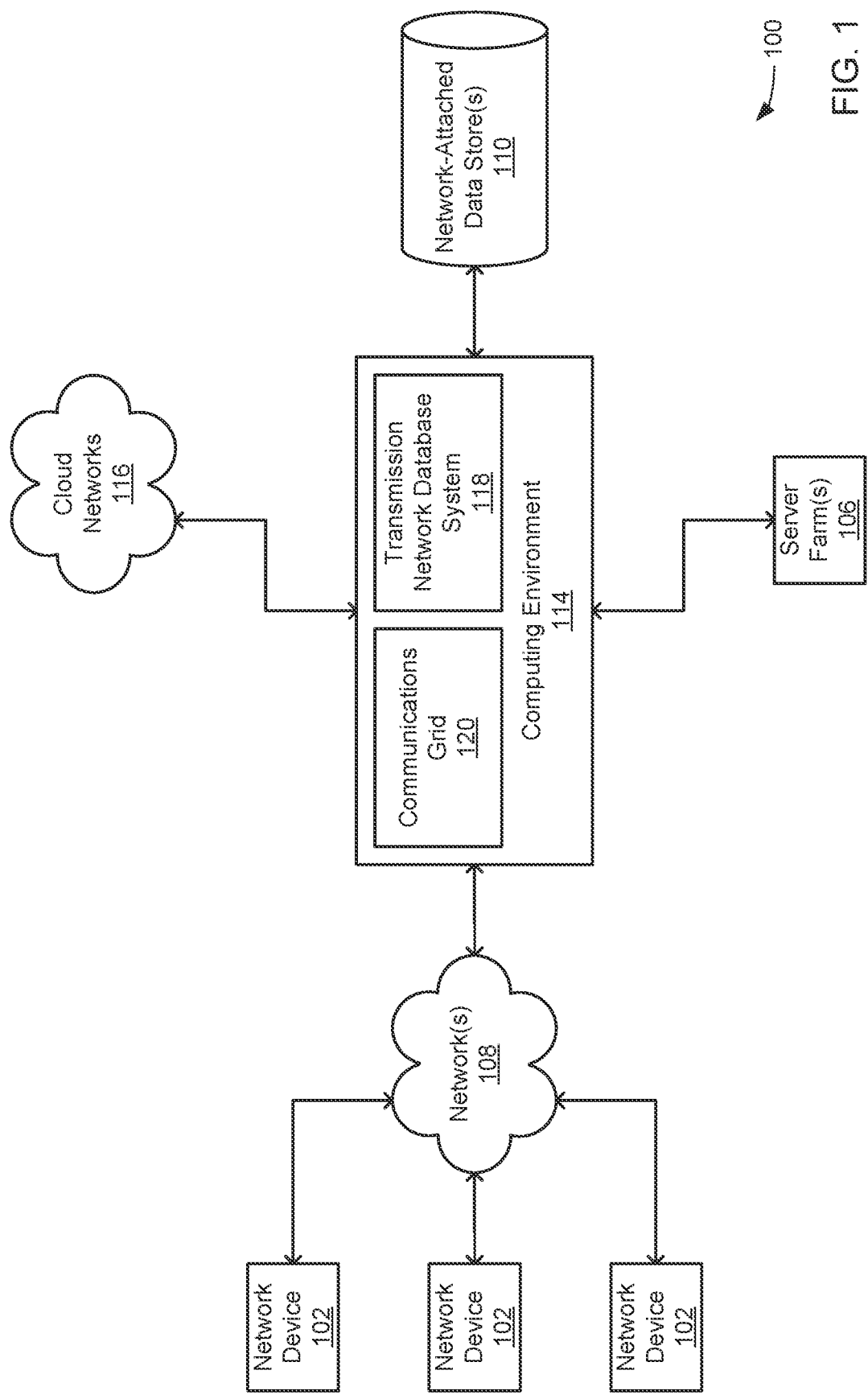
FIG. 1 illustrates a block diagram that provides an illustration of the hardware components of a computing system, according to some embodiments of the present technology.

Various embodiments described herein are generally directed to techniques for guiding and automating various aspects of the configuration, deployment and maintenance of a combination of a hosting service, resource allocation routine(s) and/or other support software for a computing cluster of physical and/or virtual computing devices. During configuration, a customer seeking to set up a computing cluster of physical or virtual computing devices may be automatically guided through various configuration choices for a hosting service from a cloud provider, as well as various configuration choices for resource allocation routine(s) and/or other support routine(s) from one or more software providers. The customer may also be guided through various configuration choices for the computing cluster, itself, including the specification of minimum, maximum and/or expected levels of various aspects of the operation of the computing cluster. At various points in providing such guidance, the customer may be provided with the option to accept various default configuration settings derived from their selections and/or a template of configuration settings, and/or to customize one or more configuration settings. Also at various points during configuration, the various selections made by the customer, along with any customizations, may be analyzed for incompatible and/or conflicting configuration settings. Where such an analysis identifies such conflicting configuration settings, the customer may be automatically presented with indications of what configuration settings are in conflict and/or with suggestions for changes to thereto.

As part of configuration, information from the cloud and/or software providers, as well as other information, may be used to identify issues with interoperability of the hosting service and/or software offered by those providers and/or selected by the customer. Alternatively or additionally, models of aspects of the performance of various combinations of a hosting service, resource allocation routine(s), and/or support routine(s) may be used to identify conflicting configuration settings. As will be explained in greater detail, each model may correlate levels of various resources that are consumed to levels of various resources that are provided, and/or may correlate such levels of resources to various levels of performance. By way of example, it may be that various models include correlation(s) of levels of costs to be paid for hosting a cluster by a cloud provider to levels of processing, storage and/or other resources that are provided. Alternatively or additionally, it may be that various models include correlation(s) of quantities of containers, pods, etc. enabled by a resource allocation routine to levels of resources that are consumed and/or costs to be paid for each such unit of allocation of resources. Also alternatively or additionally, it may be that various models include correlations of instances of use of particular portions of a suite of support routine(s) to levels of resources that are consumed and/or to licensing fees. Such models may be used in conjunction with specifications of minimum, maximum and/or expected levels of various aspects operation of a computing cluster to make predictions that may be used to identify combinations of configuration settings that are predicted to not be achievable. Alternatively or additionally, such models may be used in conjunction with such specifications to make predictions that may be used to generate suggestions for configuration settings that may work well enough together to meet one or more of those customer provided specifications.

Among the suggestions for configuration settings that may be generated during configuration may be a suggestion to select one of a set of configuration templates of pre-selected combinations of configuration settings that may be used as at least a starting point for the automated guiding of the customer. By way of example, it may be that a range of templates for small, mid-sized and/or large computing clusters are maintained. Such inputs as a customer's choice of level of hosting service from a cloud provider, as well as the customer's choice(s) of licensing of resource allocation routine(s) and/or support routine(s) may be used as a basis to identify a configuration template to suggest. Once one of the configuration templates has been selected, a customer may simply accept and use the pre-selected configuration settings of that configuration template without modification, thereby significantly reducing and simplifying the input required from the customer. Alternatively, a customer may use the configuration settings of the selected configuration template as a starting point from which the customer may make some changes as part of providing more input to create a more customized computing cluster. As customizations to a configuration template are made, an applicable one of the models may be used to check for conflicting configuration settings arising from such customizations.

During deployment, the configuration choices made by the customer may then be used as part of the basis for deriving a set of configuration settings for the hosting service, the resource allocation routine(s) and/or supporting routine(s) selected by the customer. Such configuration settings may then be implemented in configuration scripts and/or other data structures generated for use in effecting such configuration settings as part of deployment. Also, access credentials provided by the customer may be used to retrieve copies of the selected resource allocation routine(s) and/or support routine(s). Such retrieved copies of the selected software and such configuration scripts may then be combined to form packages that are able to be provided to each physical or virtual computing device that is to be used in hosting the computing cluster. Following the generation of such packages, the access credentials provided by the customer may be used to convey the packages to the physical or virtual computing devices that are to be used to host the computing cluster, thereby enabling the selected software to be deployed.

During operation of the resulting computing cluster of physical or virtual computing devices, instances of collection routine(s) installed within each physical or virtual computing device of the computing cluster may monitor various aspects of their operation, and generate portions of observation data that may be assembled together to form more of a complete picture of various aspects of the operation of both individual devices, and of the whole computing cluster. Indications of levels of various aspects of the operation of the computing cluster, and/or of individual devices therein, may be compared to minimum, maximum and/or expected levels that were specified by the customer for those aspects. Notifications may be automatically provided to the customer where a level of an aspect of operation of the computing cluster repeatedly rises to a specified maximum level and/or falls to a specified minimum level as a mechanism to inform the customer that one or more of their specified minimum and/or maximum levels may need to be reconsidered. Alternatively or additionally, notifications may be automatically provided to the customer where the observed level of an aspect of operation of the computing cluster repeatedly deviates by more than a specified degree from an expected level specified by the customer.

Also during operation, such indications of levels of various aspects of the operation of the computing cluster, and/or of individual devices therein, may be compared to levels that were predicted by a model originally used during configuration of the computing cluster. By way of example, given the observed levels of use of the computing cluster, a check may be made as to whether the levels of resources and/or of costs that were predicted by the model match, to within a selected degree of accuracy, the levels of consumption of resources and/or costs that are observed to have actually resulted. Notifications may be automatically provided to the customer where such observed levels do not match what was predicted to within such a selected degree of accuracy, which may suggest that the model used during configuration of the computing cluster is not accurate enough and/or needs to be updated.

As will be explained in greater detail, it may be that the model that was initially used during configuration of the computing cluster was based on observations of aspects of the operation of one or more other computing clusters. However, as those skilled in the art will readily recognize, it is possible for operational differences to arise between even identically configured computing clusters as a result of differing circumstances under which each is operated. By way of example, the uses to which different ones of identically configured computing clusters may be put may differ greatly based on the behavior of different users. Alternatively or additionally, computing clusters that may have originally been of identical configuration may become different over time as a result of repairs and/or replacements of various hardware and/or software components. Also alternatively or additionally, computing clusters that may have been designed to be identical may be caused to perform differently as a result of differences in levels of performance of the networks that are used to link the computing devices thereof. To take into account such potential differences between even identically configured computing clusters, it may be that a model that is based on observations of one or more other computing clusters and that is initially used to guide the initial configuration of a new computing cluster is subsequently updated and/or replaced by a model that is derived from observations of the new computing cluster. Thus, over time, it may be that separate model is maintained for each computing cluster.

Further during operation, it may be that the generated and assembled observation data is used to provide one or more visualizations of aspects of the operation of the computing cluster to the customer. Such visualizations may also include indications of the results of comparing the observation data to specified minimum, maximum and/or expected levels, and/or of comparing the observation data to predictions made by the model most recently used during configuration, as an approach to guiding the customer's attention toward potential issues that may have been identified during operation of the computing cluster. By way of example, a single visualization may be generated that includes indications of various aspects of the computing cluster that currently are and/or are not in use, alongside indications of configuration settings that may be associated with controlling those same aspects, and/or logs documenting particular events associated with those same aspects. In this way, the customer may be prompted to consider events arising from anomalous behavior of users of the computing cluster and/or arising from problematic configuration settings. It may be that such visualizations provide prompting to a customer to consider repeating the configuration of the computing cluster to take advantage of what is revealed in the most recent observation data, especially where the computing cluster is relatively new such that the model that was initially used in an initial configuration of the computing cluster has just been updated and/or replaced with a newer model that is based on observation data received from the computing cluster so as to be more specifically associated with the computing cluster.

Repeating the configuration of the computing cluster may proceed in a manner that is quite similar to the initial configuration of the computing cluster. In so doing, the guidance provided to the customer may now include the use of a model that has been updated and/or replaced based on the observation data associated with the computing cluster that is now being re-configured, instead of a model based on observations of one or more other similar computing clusters. Also, depending on the observation data, the customer may be prompted to at least reconsider various minimum, maximum and/or expected levels of various aspects of the computing cluster that the customer had originally specified. Further, depending on the observation data and/or improvements made to the model that is used, the customer may be guided to the option making a selection of a template, once again, to serve as at least a starting point for re-configuring the computing cluster. In so doing, it may be that a different template is recommended than the one that was recommended during the initial configuration of the computing cluster. Alternatively or additionally, the customer may be guided to use the configuration settings that were previously made, but with prompting to reconsider one or more particular settings.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
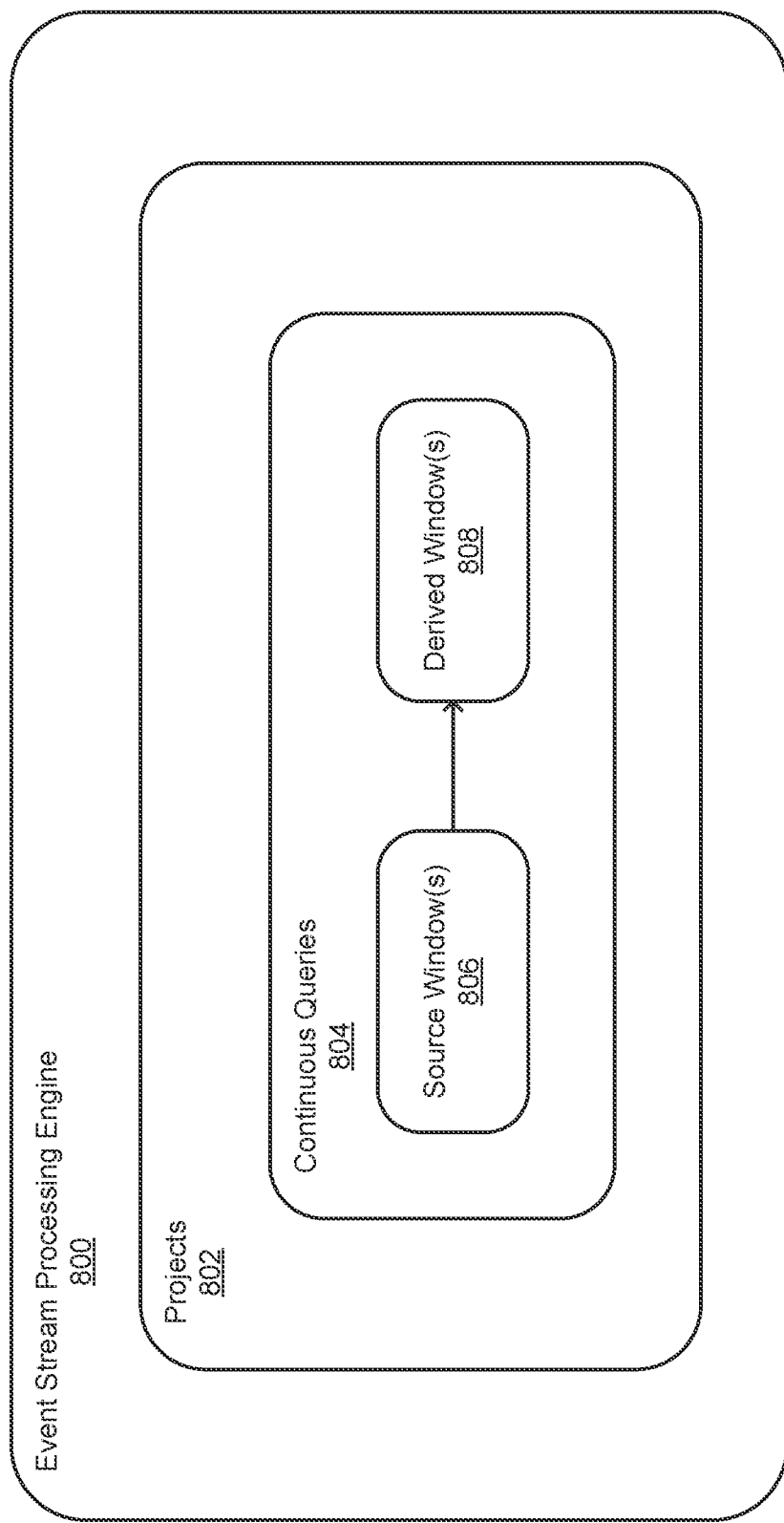
FIG. 8 illustrates a block diagram including components of an Event Stream Processing Engine (ESPE), according to embodiments of the present technology.
Figure 9:
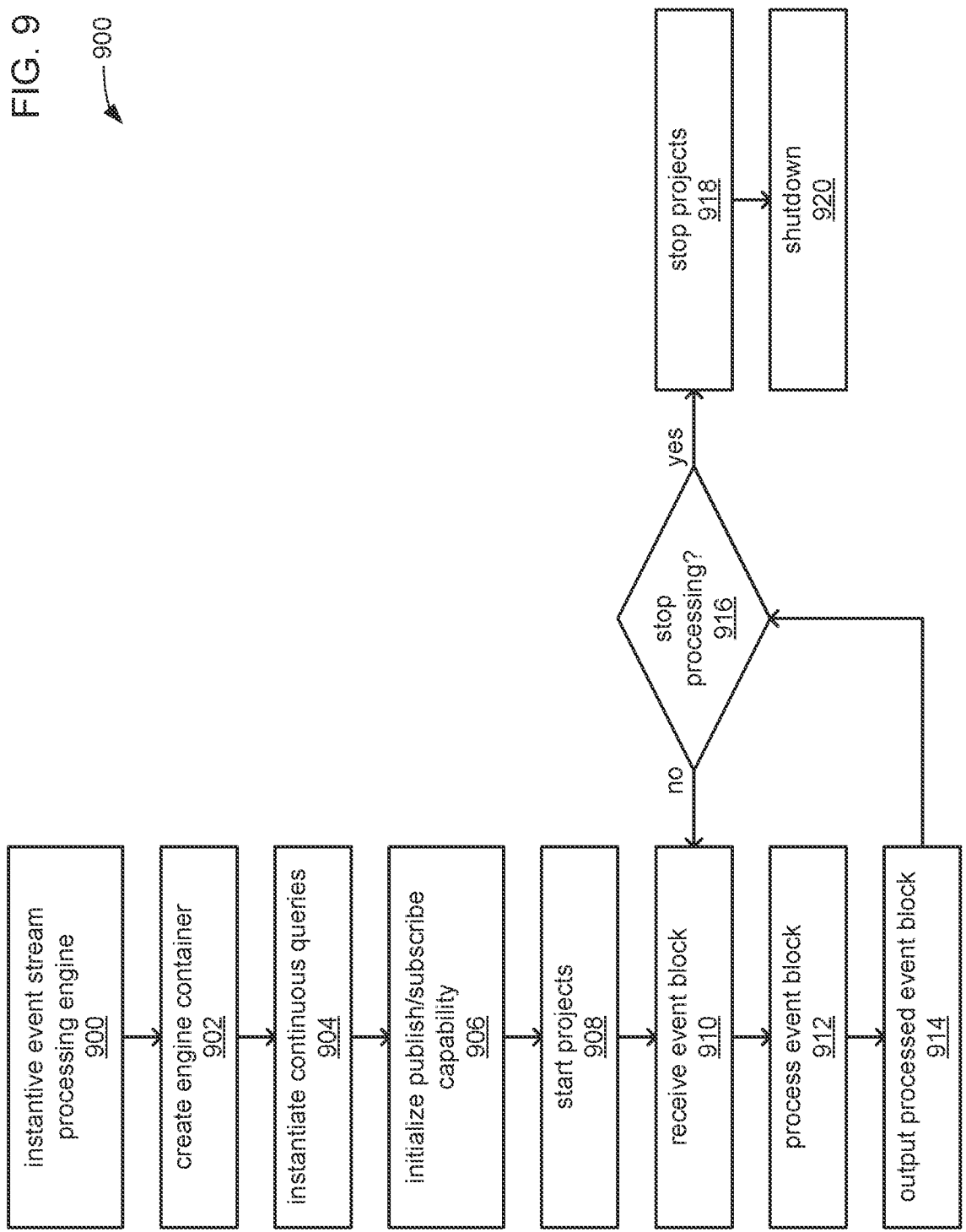
FIG. 9 illustrates a flow chart showing an example process including operations performed by an event stream processing engine, according to some embodiments of the present technology.
Figure 10:
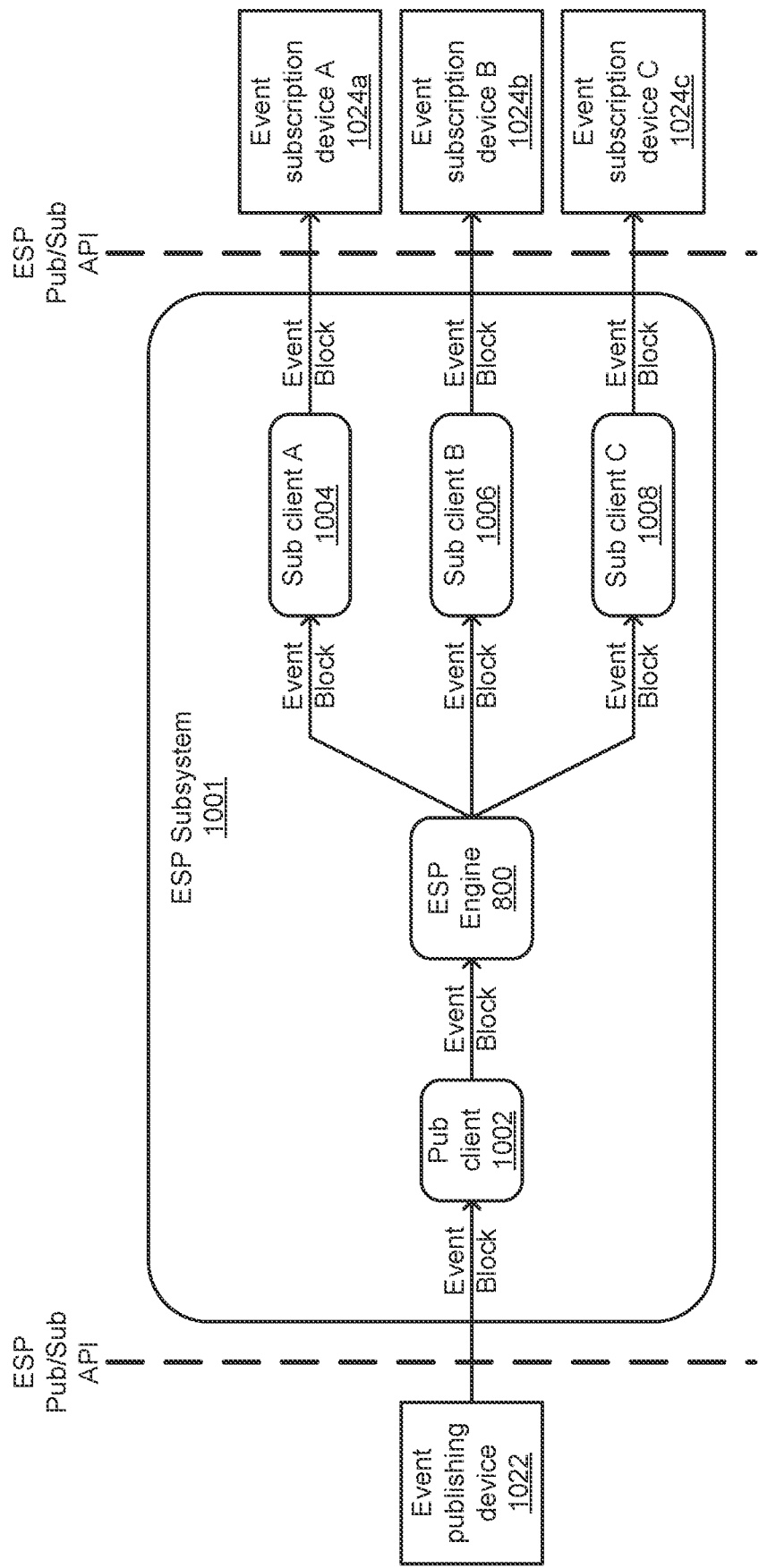
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
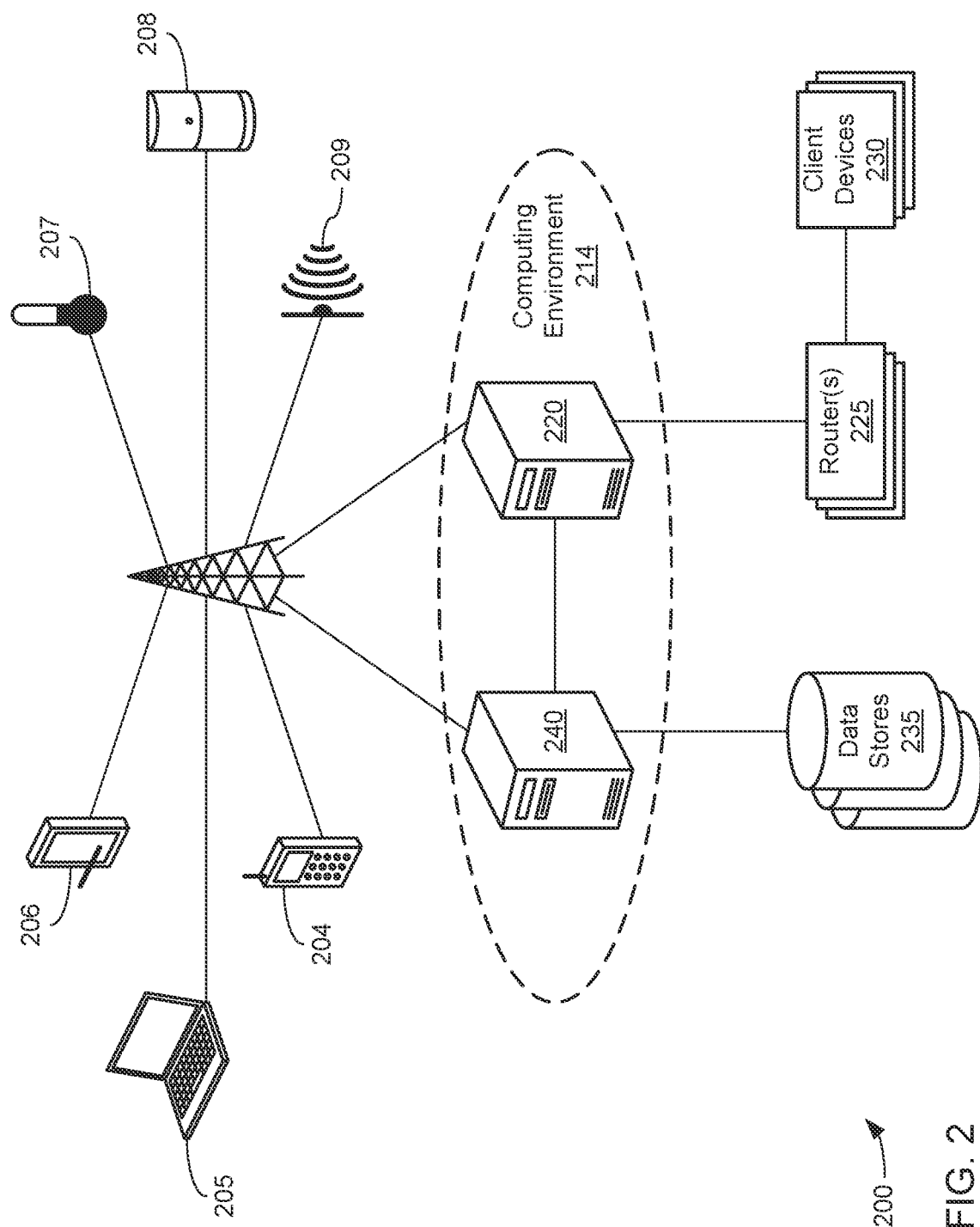
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
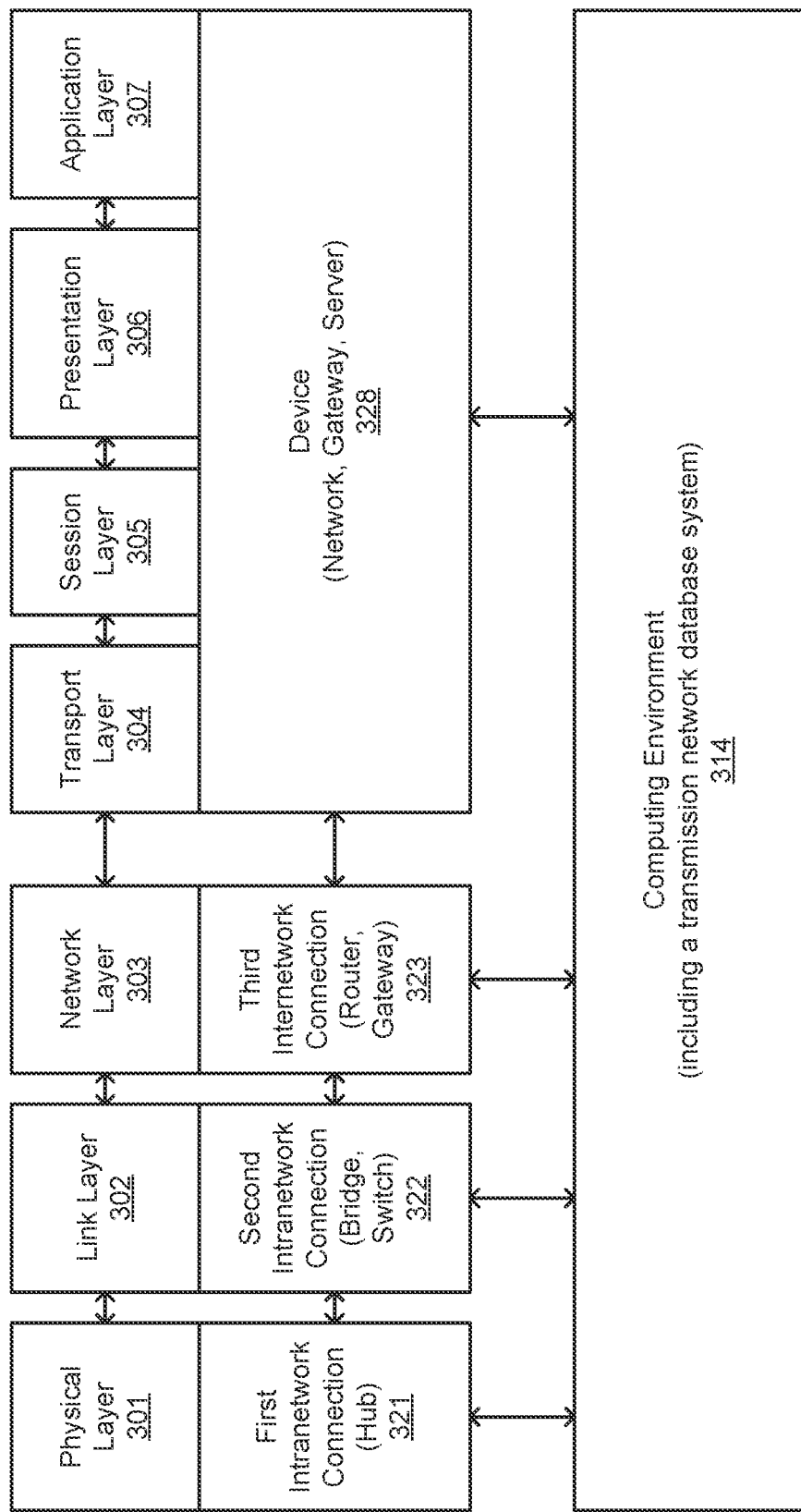
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
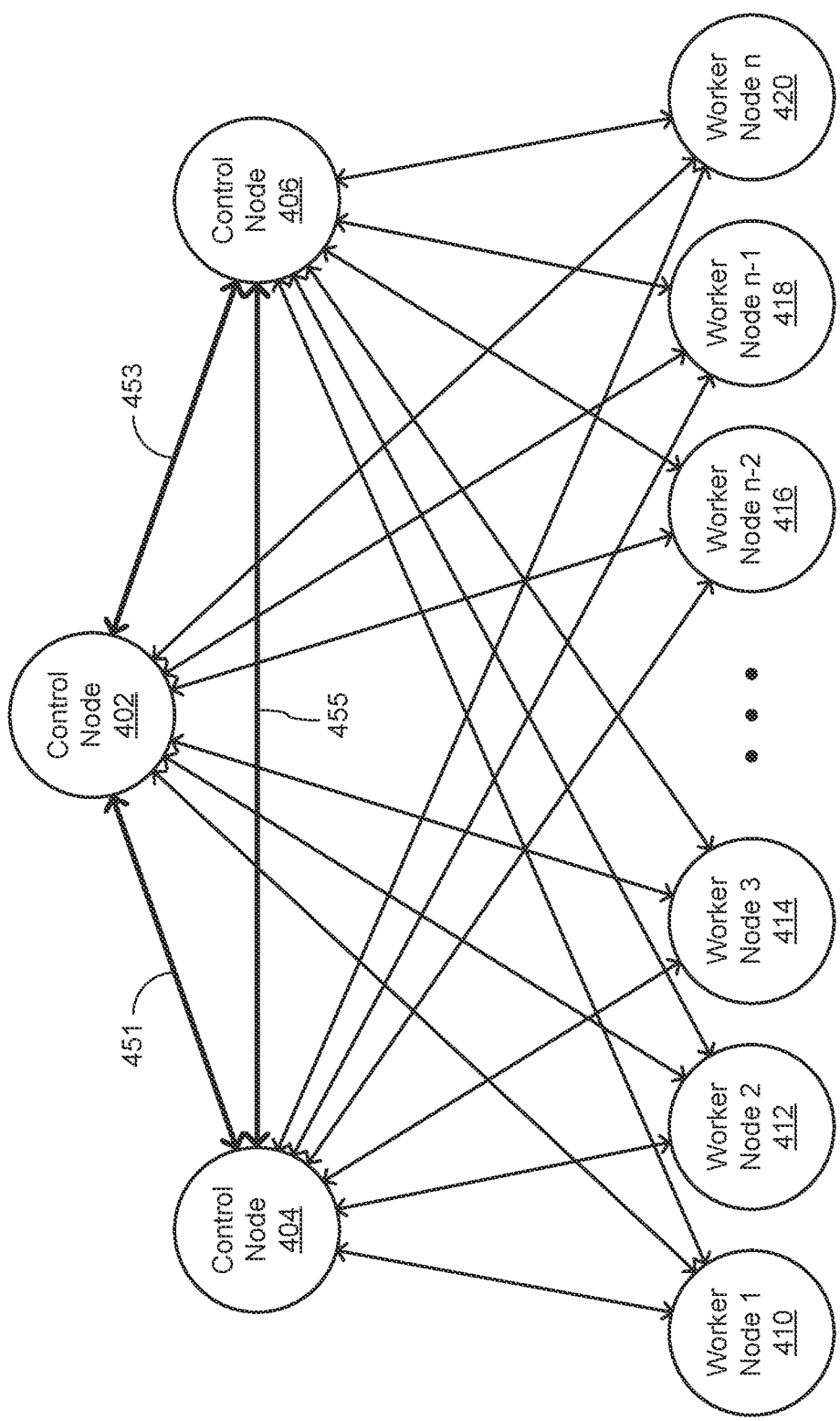
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
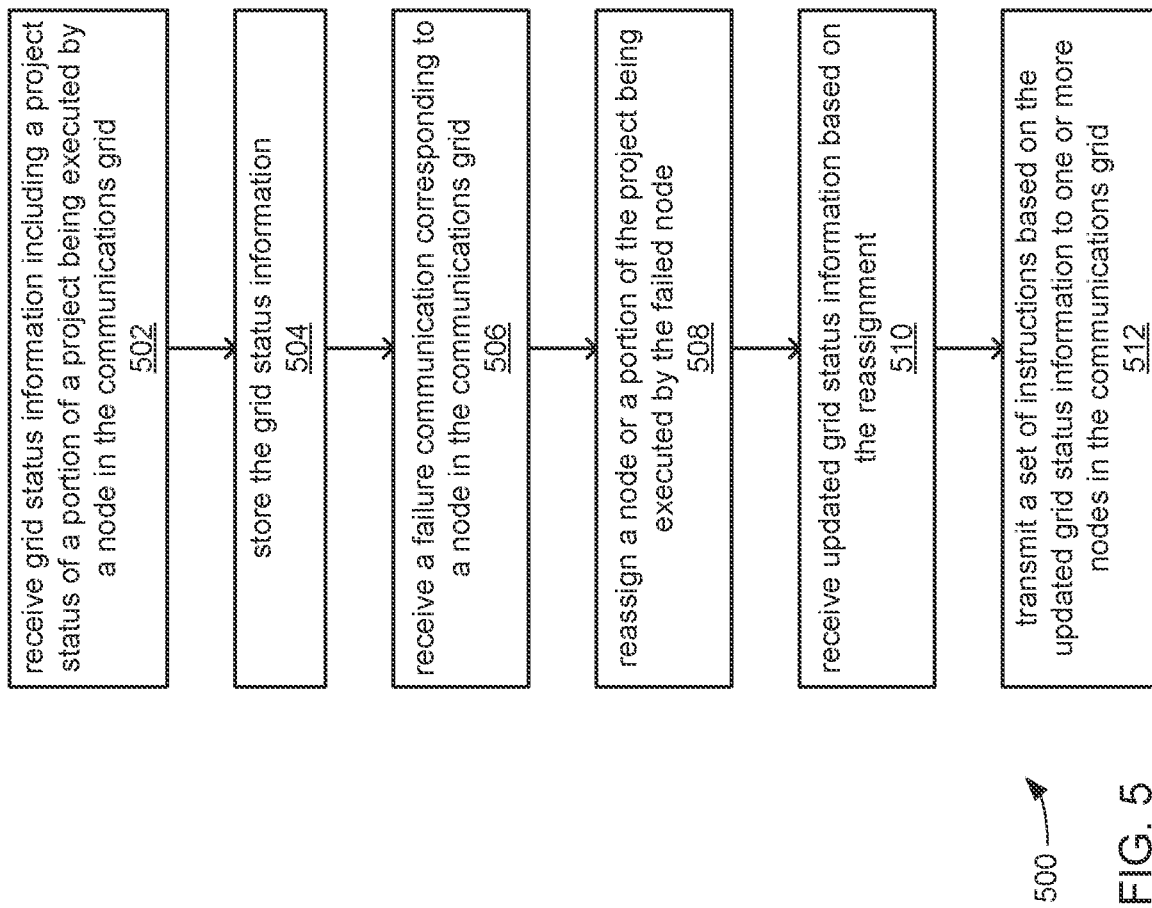
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
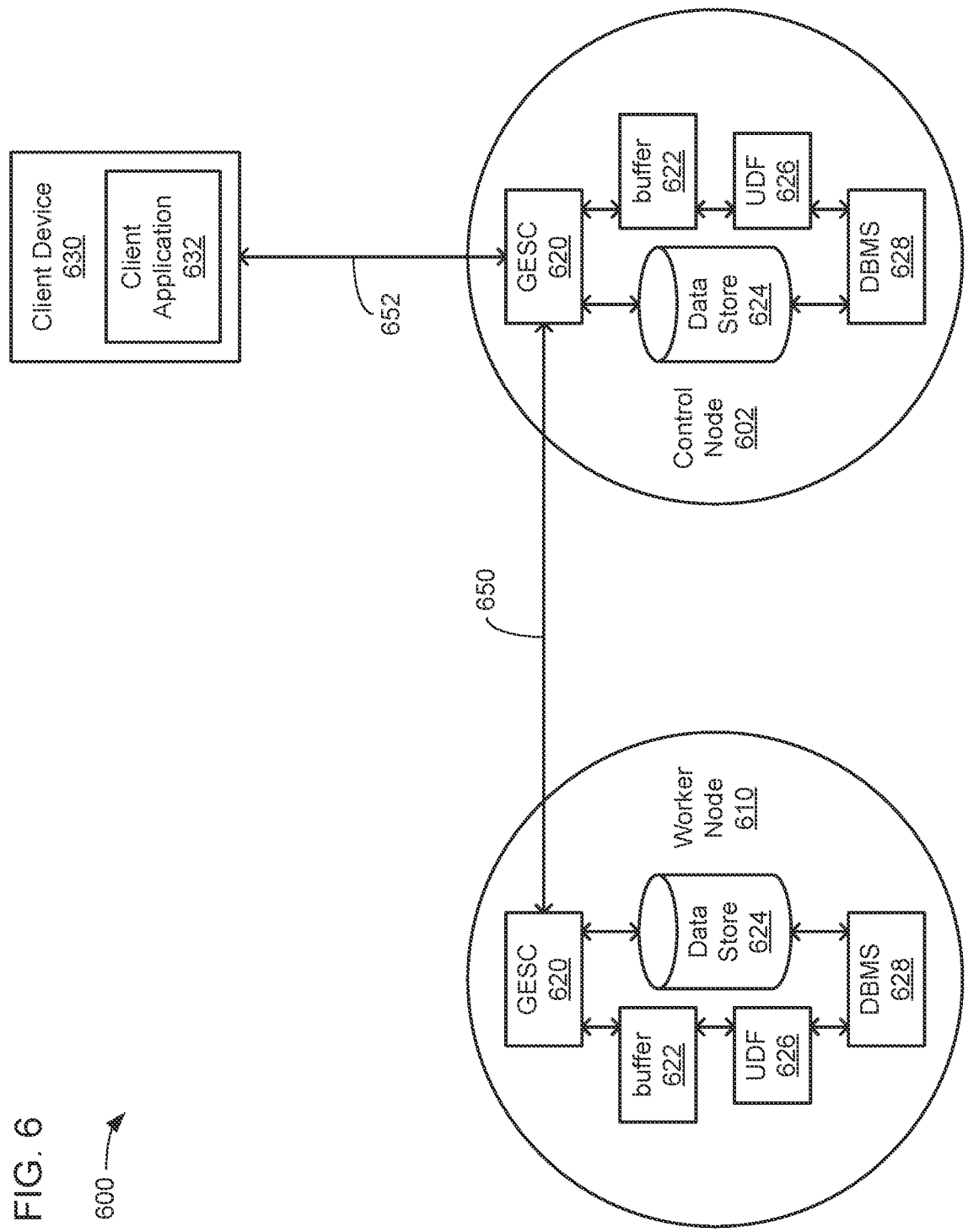
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
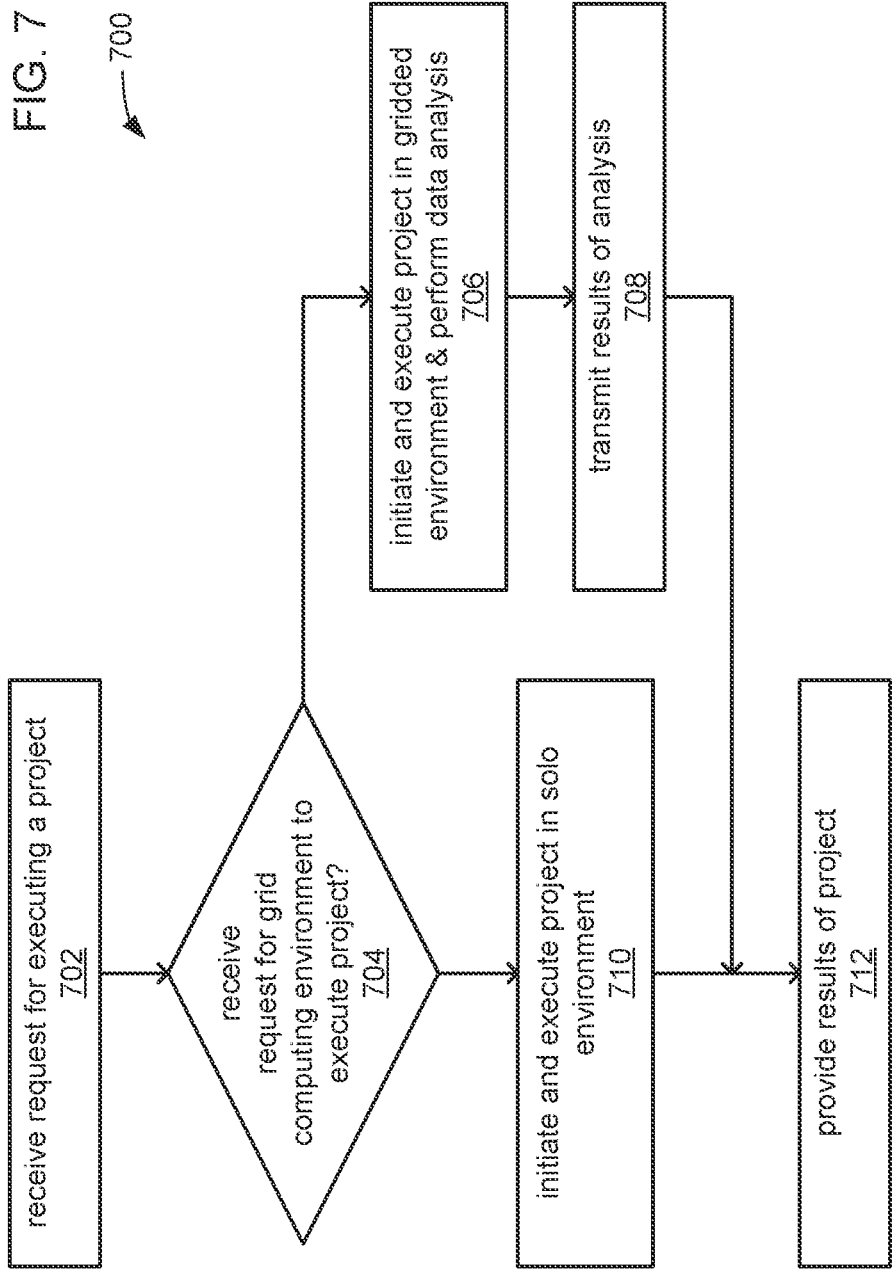
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
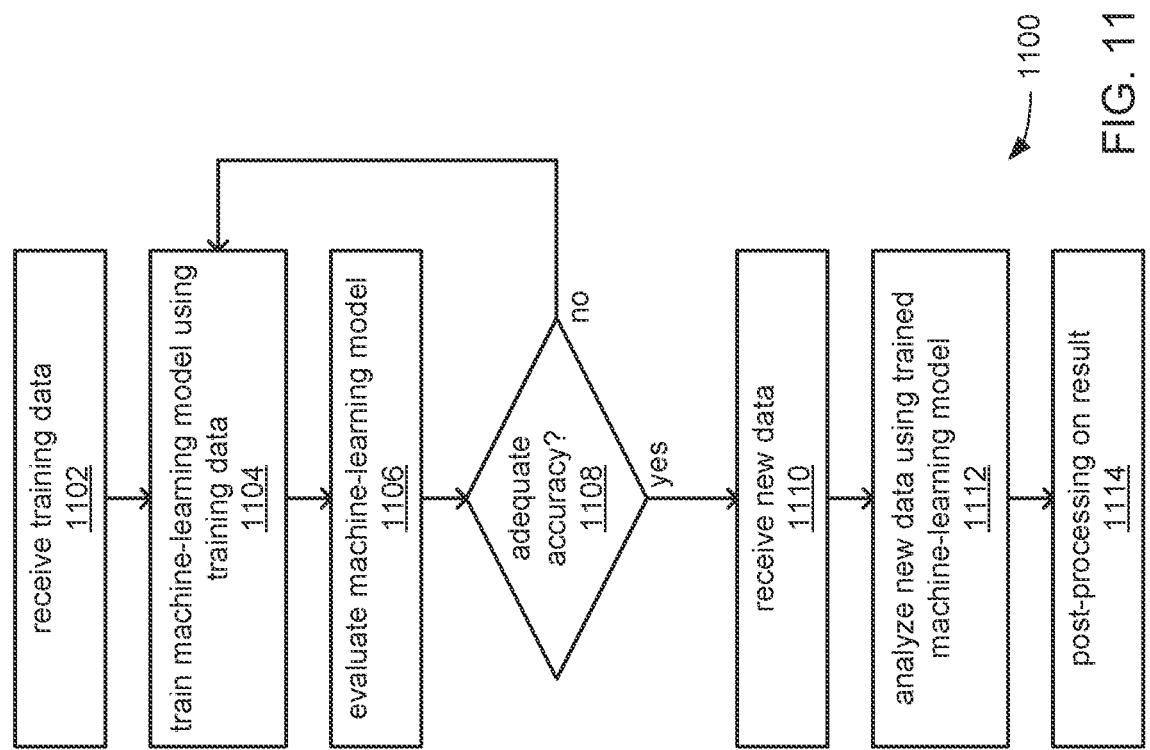
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
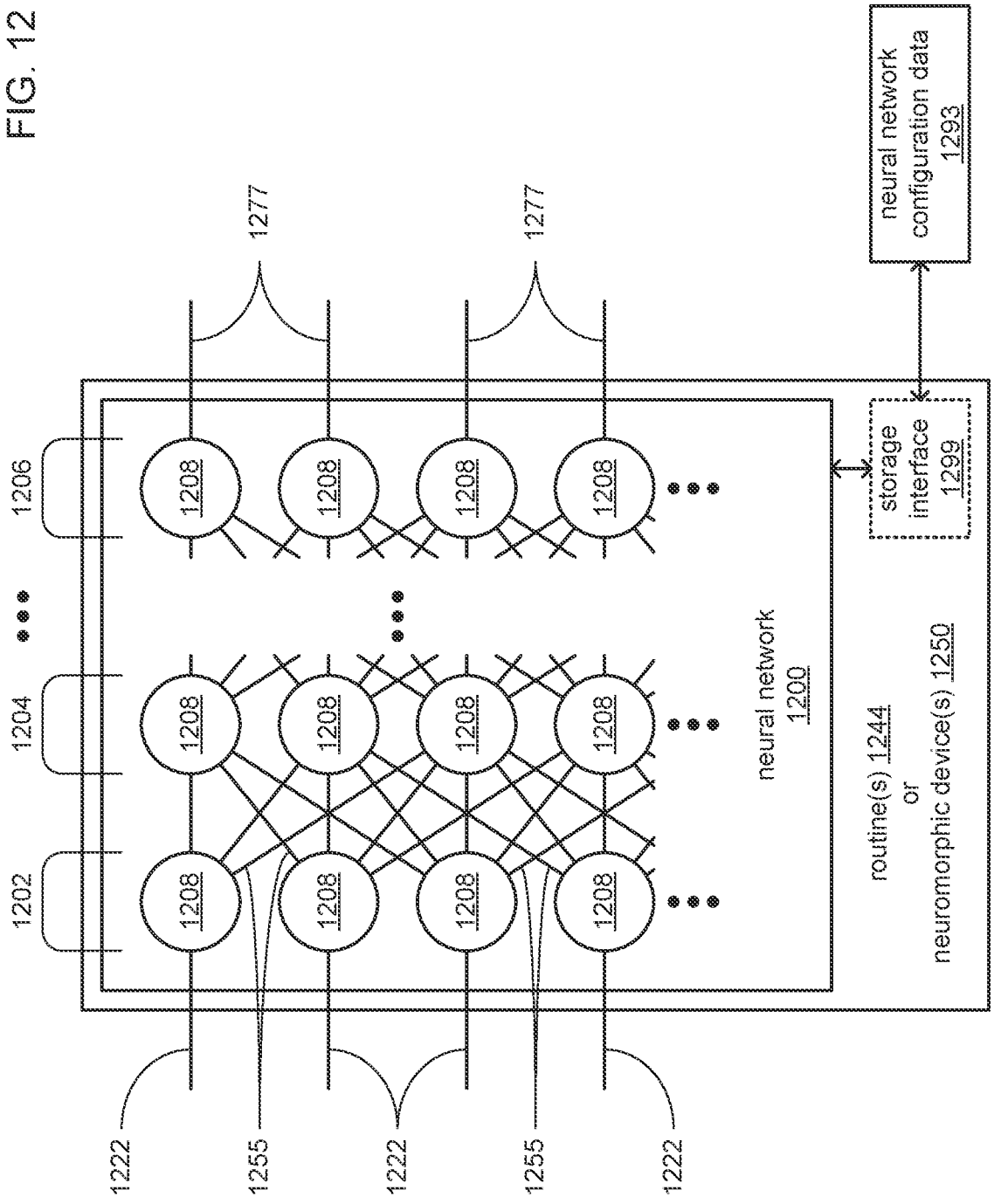
FIG. 12 illustrates an example machine-learning model based on a neural network.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
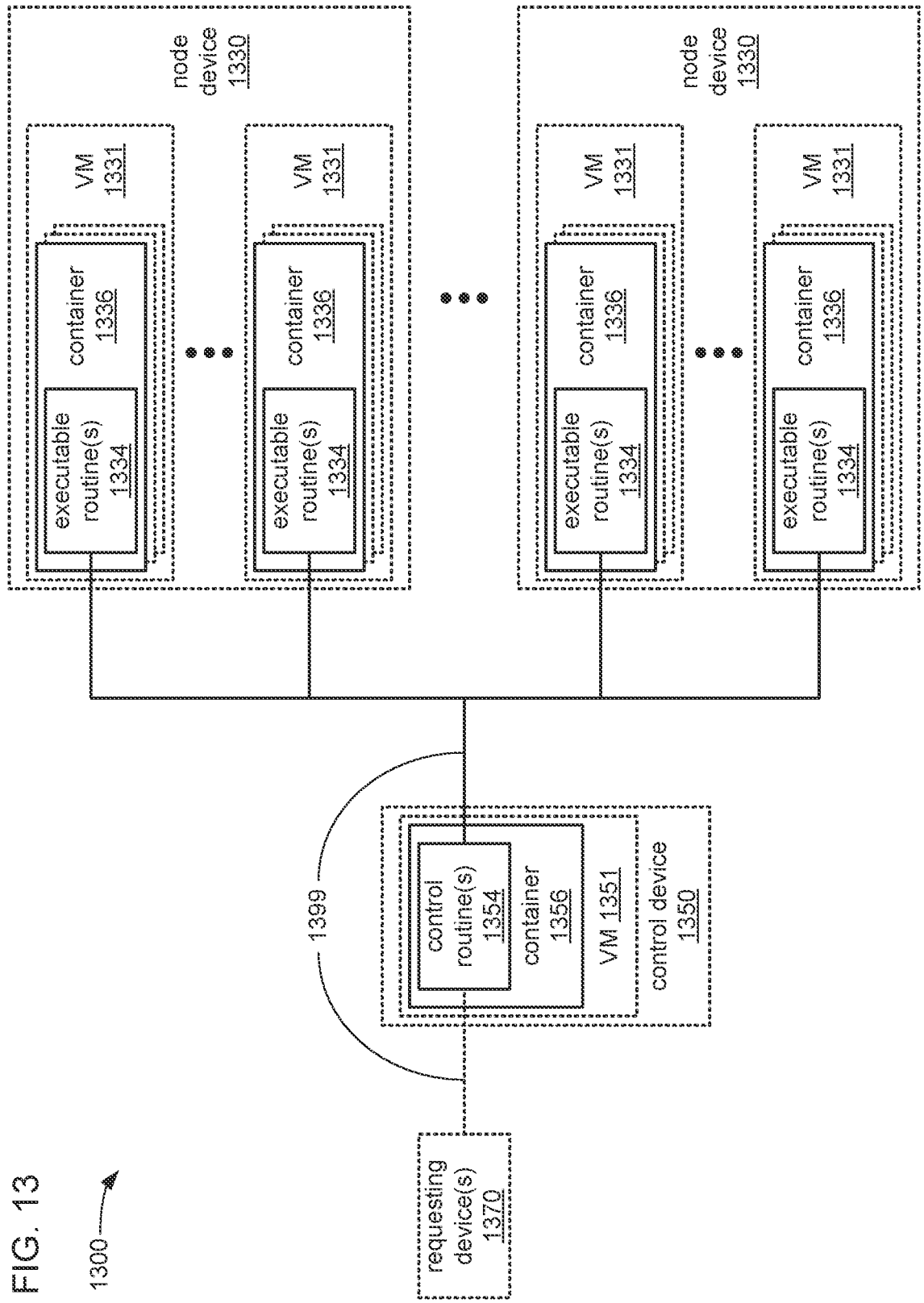
FIG. 13 illustrates an example of distributed execution of routines using multiple containers.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14A:
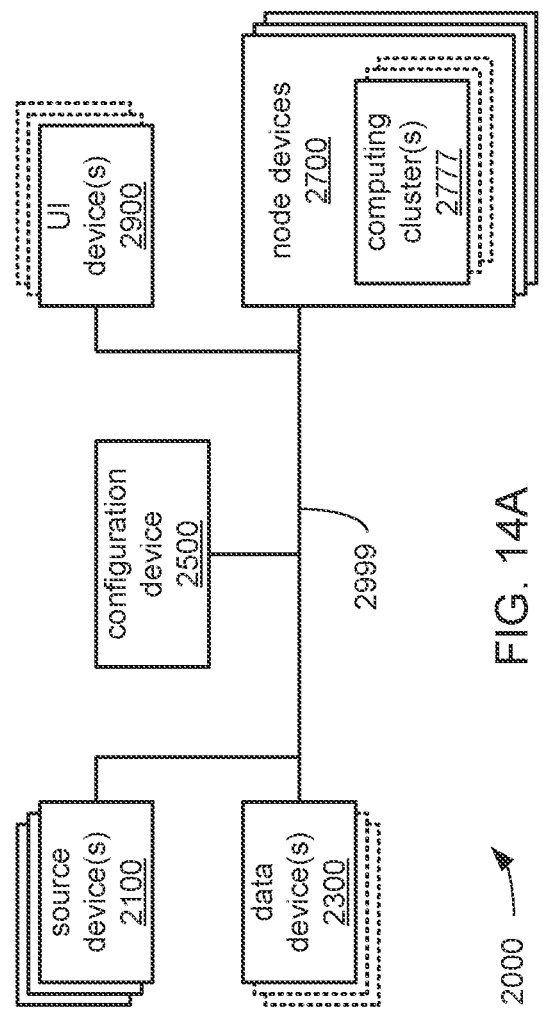
FIGS. 14A, 14B, 14C, 14D and 14E, together, illustrate differing example embodiments of a distributed processing system for creating and maintaining a computing cluster of physical or virtual computing devices.
Figure 14B:
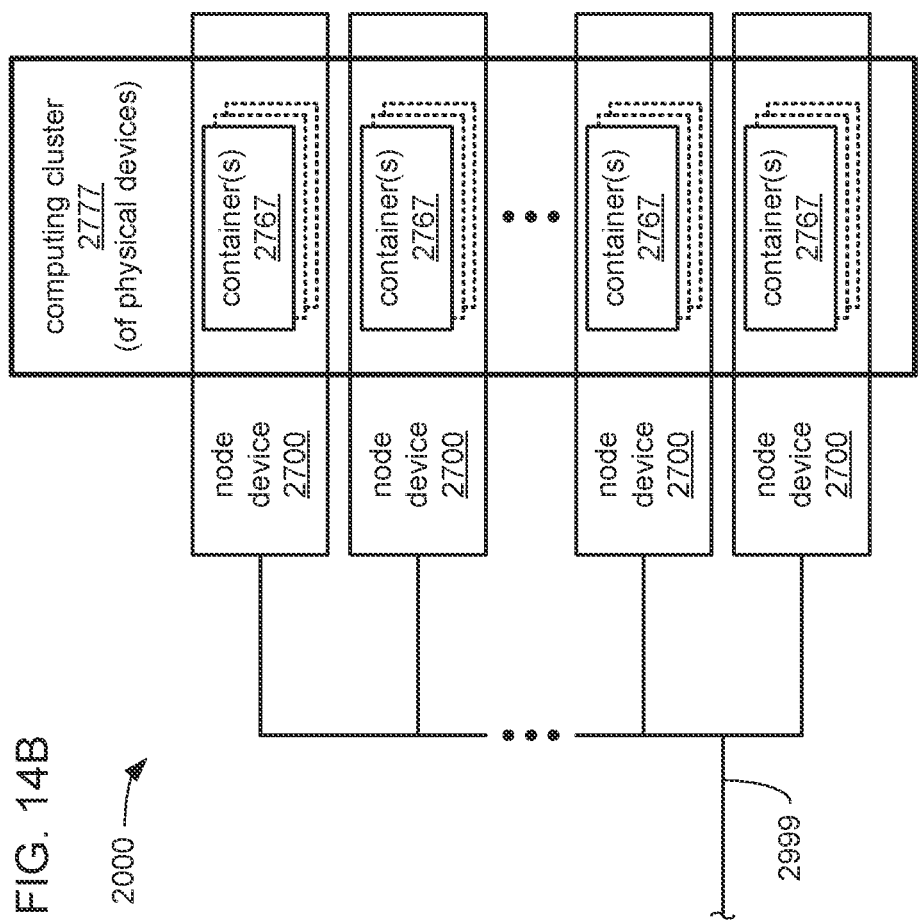
Figure 14C:
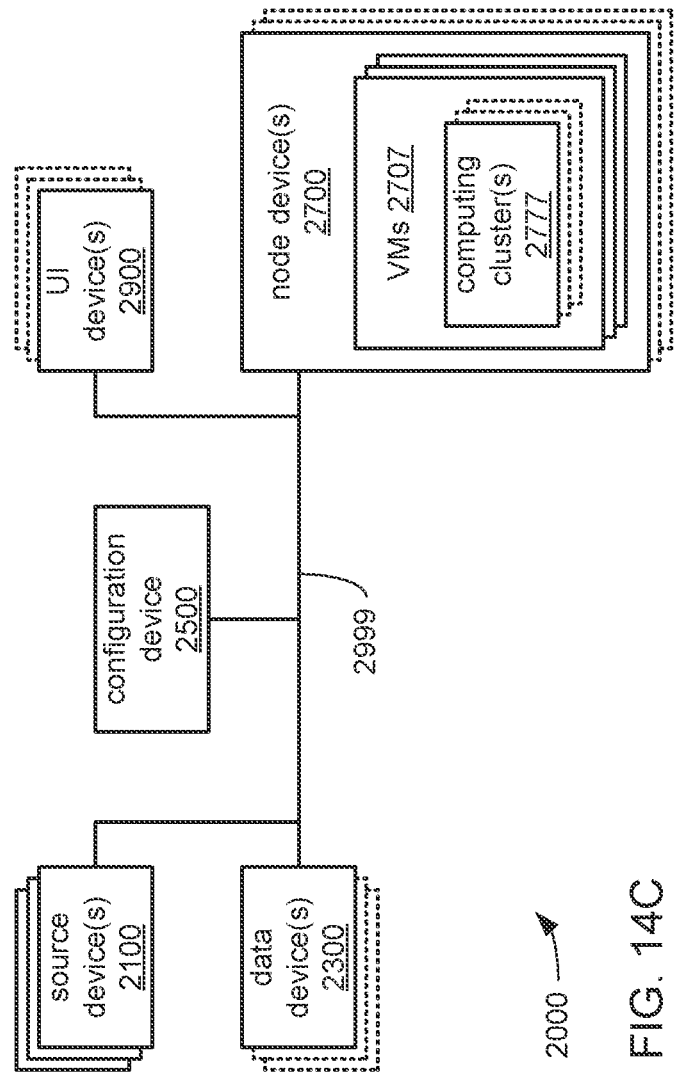
Figure 14D:
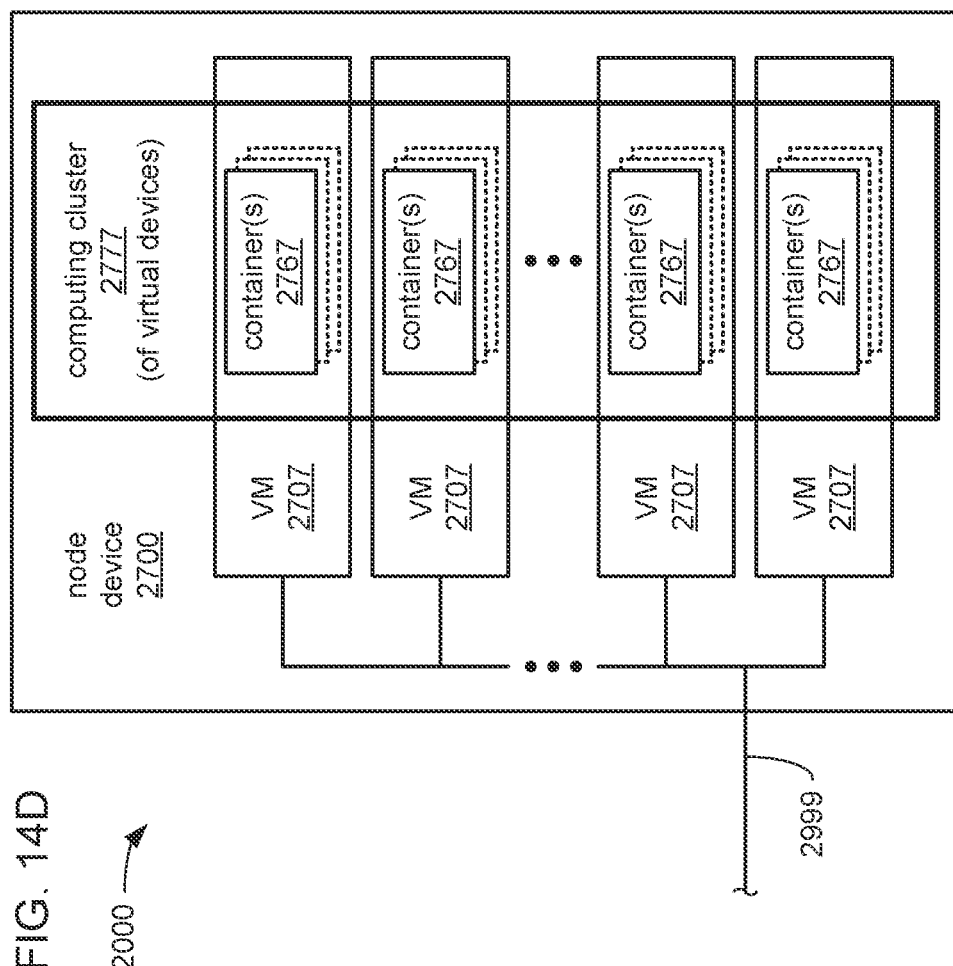
Figure 14E:
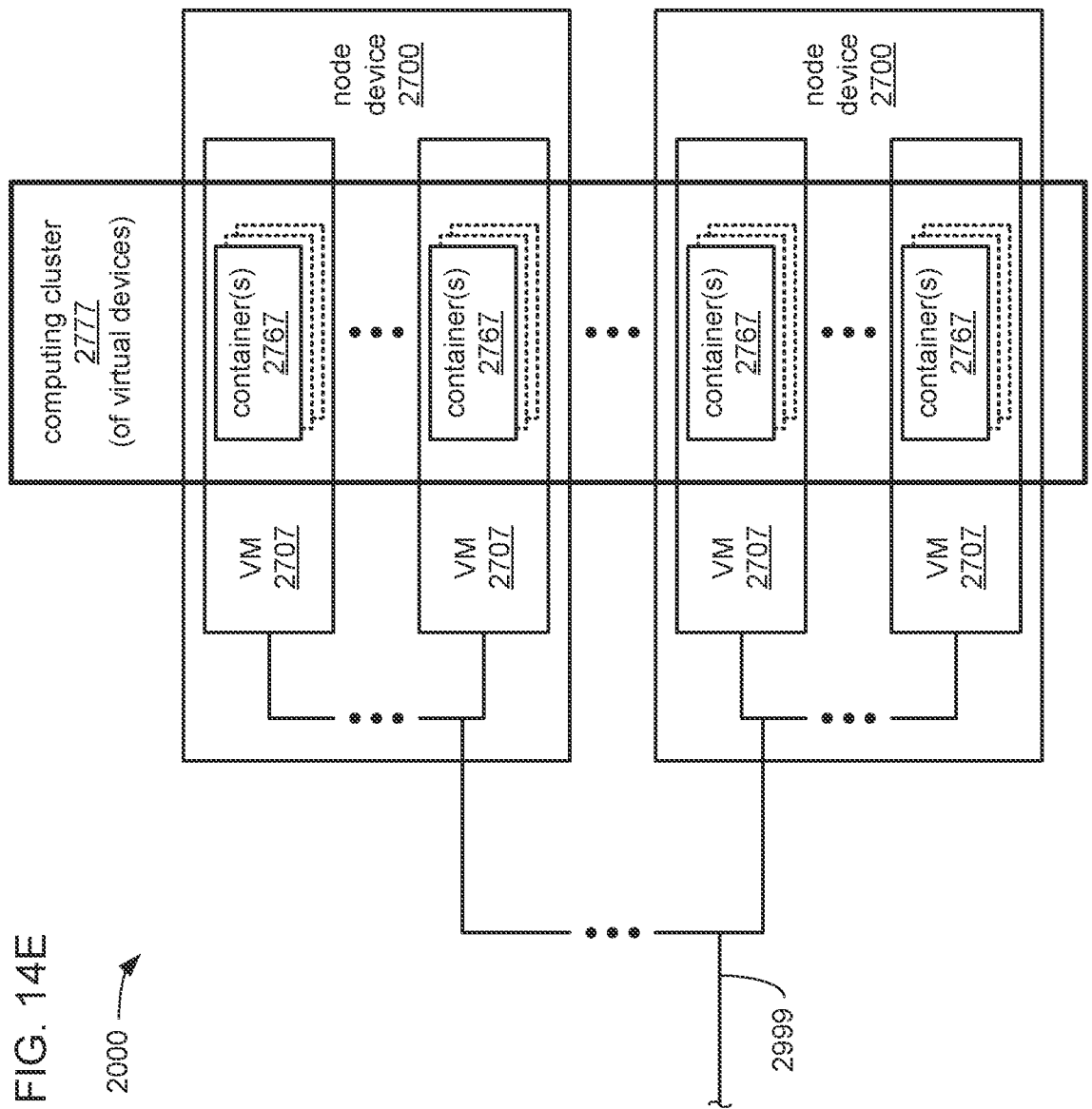

FIGS. 14A, 14B, 14C, 14D and 14E, taken together, illustrate two differing example embodiments of a distributed processing system 2000 in which one or more computing clusters 2777 are created and maintained. Each of these two embodiments of the distributed processing system 2000 incorporate multiple source devices 2100, one or more data devices 2300, a configuration device 2500, one or more node devices 2700, and/or one or more user interface (UI) devices 2900 coupled by a network 2999. FIGS. 14A-B provide a block diagrams of an example embodiment of the distributed processing system 2000 in which multiple node devices 2700 are used to implement one or more computing clusters 2777 of physical computing devices. FIGS. 14C-E provide a block diagrams of an example embodiment of the distributed processing system 2000 in which multiple virtual machines (VMs) 2707 instantiated within one or more node devices 2700 are used to implement one or more computing clusters 2777 of virtual computing devices.

Referring to all of FIGS. 14A through 14E, as will be explained in greater detail, the configuration device 2500 may be able to be operated either directly, or through a UI device 2900, to cooperate with the source device(s) 2100, the data device(s) 2300 and/or the node device(s) 2700 to configure, deploy and maintain, a computing cluster 2777. In so doing, the configuration device 2500 may retrieve, from the source device(s) 2100 and the data device(s) 2300, information concerning hosting resources that are available from a cloud provider owning and/or operating the node device(s) 2700. The configuration device 2500 may also retrieve, from the source device(s) 2100 and the data device(s) 2300, information concerning such software as resource allocation routine(s) and/or support routine(s) for supporting the creation and operation of computing cluster(s), as well as copies of the software, themselves. The configuration device 2500 may then use information and retrieved software to derive configuration settings for the computing cluster 2777, and to provision the node device(s) 2700 (or the VMs 2707 within the node device(s) 2700) to create the computing cluster 2777. The configuration device 2500 may then cooperate with the data device(s) 2300 to monitor and analyze aspects of the operation of the computing cluster 2777 to identify needed changes to the configuration settings.

In support of such operations, and as will be explained in greater detail, the devices 2100, 2300, 2500, 2700 and/or 2900 may exchange information concerning available hosting services and/or software, cluster configuration information, packages of software and/or configuration data, and/or pieces of observation data via the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Turning briefly to FIGS. 14A-B, as depicted, an example computing cluster 2777 of physical devices may be deployed to span multiple ones of the node devices 2700, each of which may be directly connected to the network 2999 to coordinate operations of the computing cluster 2777 and/or to exchange data thereamong. As will be explained in greater detail, as part of operating such a computing cluster 2777, multiple containers 2767 may be instantiated within each of the node devices 2700 to support the parallel execution of multiple executable routines to perform multiple tasks in parallel. As will also be explained in greater detail, an instance of a collection routine may be executed within each of the node devices 2700 to monitor various aspects of the performance of the computing cluster 2777, and to transmit indications of those observations to the one or more data devices 2300, via the network 2999, to be assembled into observation data concerning the computing cluster 2777.

Turning briefly to FIGS. 14C-E, as depicted, an example computing cluster 2777 of virtual devices may be deployed to span multiple ones of the VMs 2707. As depicted in FIG. 14D, such multiple VMs 2707 may be instantiated entirely within a single node device 2700, or as depicted in FIG. 14E, such multiple VMs 2707 may be instantiated across multiple node devices 2700. Regardless of the quantity of node devices 2700 within which the multiple VMs 2707 of the computing cluster 2777 are instantiated, each such node device 2700 may be directly connected to the network 2999, and each VM 2707 within each such node device 2700 may be provided with a virtual connection to the network 2999 such that the network 2999 is effectively extended to the VMs 2707 within each such node device 2700.

As will be explained in greater detail, as part of operating such a computing cluster 2777, multiple containers 2767 may be instantiated within each of the VMs 2707 to support the parallel execution of multiple executable routines to perform multiple tasks in parallel. As will also be explained in greater detail, an instance of a collection routine may be executed within each of the VMs 2707 to monitor various aspects of the performance of the computing cluster 2777, and to transmit indications of those observations to the one or more data devices 2300, via the network 2999, to be assembled into observation data concerning the computing cluster 2777.

FIGS. 15A, 15B, 15C, 15D, 15E, 15F, 15G, 15H, 15I and 15J, taken together, illustrate aspects of various ones of the devices 2100, 2300, 2500, 2700 and 2900 of each of the embodiments of the distributed processing system 2000 of FIGS. 14A-B and of FIGS. 14C-E in greater detail. Also illustrated in greater detail are various data structures and software routines that may be used by these devices in configuring, deploying and operating a computing cluster 2777 of either physical computing devices (e.g., a set of the node devices 2700, as depicted in FIGS. 14A-B) or virtual computing devices (e.g., a set of the VMs 2707, as depicted in FIGS. 14C-E).

Figure 15B:
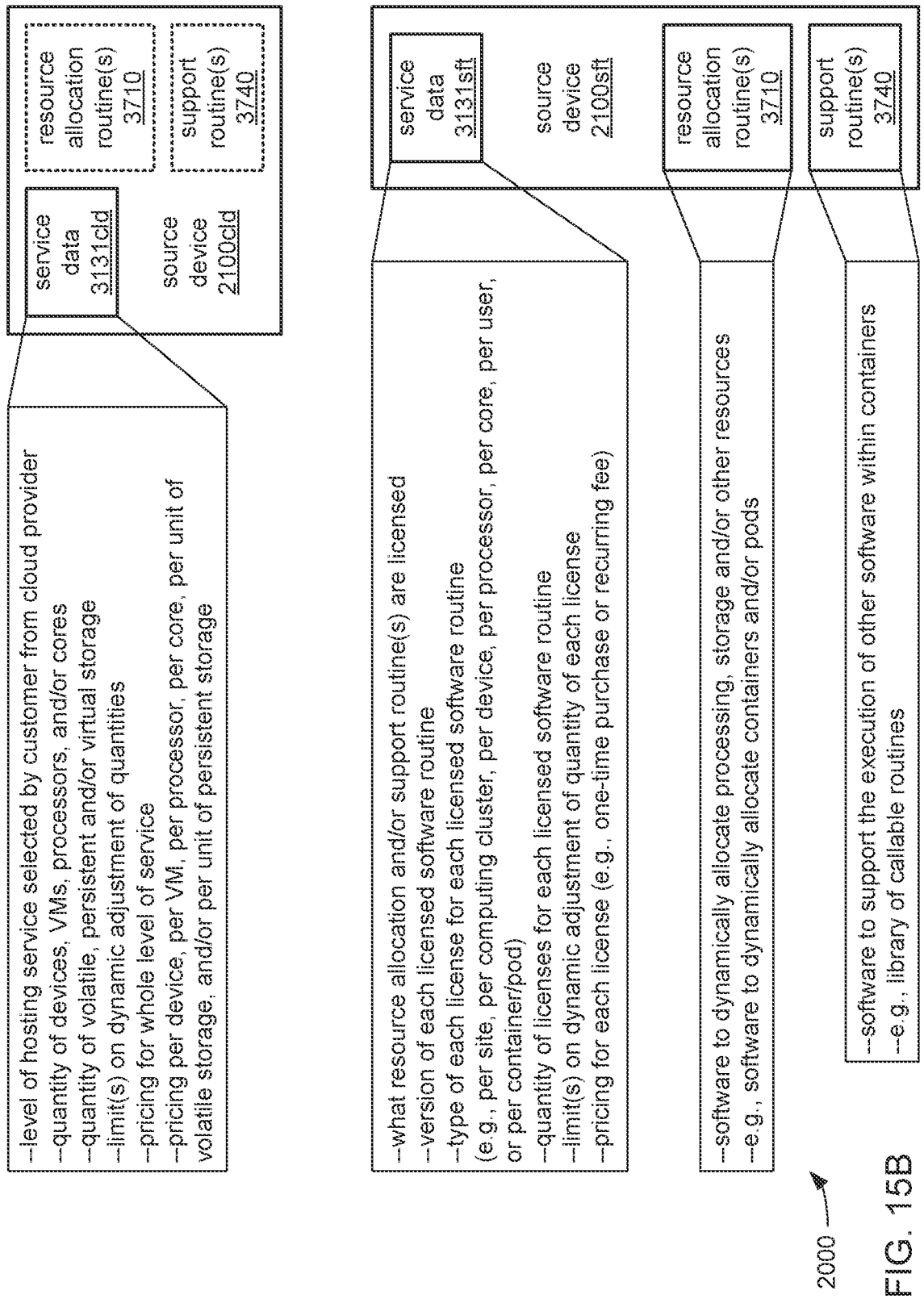

Turning to FIGS. 15A and 15B, in various embodiments, each of the source devices 2100 may incorporate one or more of a processor 2150, a storage 2160 and a network interface 2190 to couple each of the source devices 2100 to the network 2999. The storage 2160 may store one or more of a control routine 2140, service data 3131, resource allocation routine(s) 3710, and support routine(s) 3740.

At least one of the source devices 2100 may be owned and/or operated by a cloud provider (hence, the designation of 2100*cld*), and that cloud provider may own and/or operate the node device(s) 2700 to provide a hosting service within the node device(s) 2700, and/or within the VMs 2707 that may be instantiated therein, for a fee. Examples of such hosting services offered by such cloud providers include, and are not limited to, Amazon Web Services offered by Amazon.com, Inc., of Seattle, Washington, USA; Azure offered by Microsoft Corporation of Redmond, Washington, USA; and Google Cloud Platform offered by Google LLC of Mountain View, California, USA. Such a cloud provider may so own and/or operate a source device 2100*cld* to serve as a customer interaction device by which customers seeking to avail themselves of such a hosting service may obtain information concerning different levels of hosting service offered by that cloud provider under various leasing and/or other payment arrangements. It may also be that the source device 2100*cld* is able to be interacted with by a customer to establish an account, select a level of hosting service that the customer seeks to use for a computing cluster 2777, and then make arrangements for recurring leasing and/or other payments for that selected level of hosting service.

The service data 3131 (designated 3131*cld*) provided by the source device 2100*cld* may specify multiple aspects of at least one level of hosting service offered by the particular cloud provider, including and not limited to, which level may have already been selected by a customer; the quantity of physical devices, VMs, processors and/or cores included in one or more levels of service; the quantity of volatile, persistent and/or virtual storage included in one or more levels of service; the upper and/or lower limits on the degree to which either such quantity may be dynamically adjusted; the pricing for one or more whole levels of service where there is no variation in pricing; and/or the pricing per physical device, per VM, per processor, per core, per unit of volatile storage and/or per unit of persistent storage where there is flexibility provided to vary the pricing by varying one or more of such quantities. The service data 3131*cld* may be formatted in any of a variety of ways, depending on the cloud provider (e.g., formatted as a text file, a spreadsheet file, a database file, HTML code for a webpage, etc.). As will be explained in greater detail, information concerning how to interpret the service data 3131*cld* to enable the retrieval of information therefrom may be retrievable from the one or more data devices 2300.

Others of the source devices 2100 may be owned and/or operated by software providers (hence, the designation of 2100*sft*) that each provide software to support the creation and/or operation of a computing cluster of physical computing devices (e.g., a set of the node devices 2700, as depicted in FIGS. 14A-B) or a computing cluster of virtual computing devices (e.g., a set of the VMs 2707, as depicted in FIGS. 14C-E). Such software may include one or more resource allocation routines 3710 that are used to dynamically allocate processing, storage and/or other resources of physical and/or virtual devices through the dynamic allocation of execution environments, such as containers or pods. Examples of such software offered by such software providers include, and are not limited to, Kubernetes offered by the Cloud Native Computing Foundation of San Francisco, California, USA; and Docker offered by Docker, Inc. of Palo Alto, California, USA. Alternatively or additionally, such software may include one or more support routines 3740 that are used to provide callable routines that support the development and/or execution of various executable routines within such containers or pods. Examples of such software offered by such software providers include, and are not limited to, SAS Viya offered by SAS Institute of Cary, North Carolina, USA.

In a manner similar to cloud providers, such a software provider may own and/or operate one of the source devices 2100*sft* to serve as a customer interaction device by which customers seeking to lease or purchase licenses for software for a computing cluster may obtain information concerning different types of licensing offered by that software provider under various leasing or purchasing arrangements. It may also be that such a source device 2100*sft* is able to be interacted with by a customer to establish an account, select a type and/or quantity of license for one or more software routines for a computing cluster 2777, and then obtain those license(s). In addition to providing such information and/or being operable to place such orders, it may be that such a source device 2100*sft* may also serve as a repository from which copies of such software may be retrieved for provision to a set of the node devices 2700 or to a set of the VMs 2707 as part of deploying the computing cluster 2777.

It should be noted that, in some embodiments, a cloud provider may also serve as a software provider. As will be familiar to those skilled in the art, a cloud provider may seek to make it easier to deploy computing clusters on the physical and/or virtual computing devices that they own and/or operate by being a "one stop" source for obtaining both the hosting service and software needed for a computing cluster. Such software may be offered by such a cloud provider in combination with a hosting service. Thus, as additionally depicted in FIG. 15B with dotted lines, the source device 2100*cld* of a cloud provider may also serve as a repository from which copies of software, such as resource allocation routine(s) 3710 and/or support routine(s) 3740, may be retrieved.

Referring back more specifically to FIG. 15A, the control routine 2140 may incorporate a sequence of instructions operative on the processor(s) 2150 to implement logic to perform various functions. More specifically, in executing the control routine 2140, the processor(s) 2150 of each of the source devices 2100 may be caused to operate the network interface 2190 to provide a network portal on the network 2999 that employs any of a variety of network communications protocols to provide selective access to the data and/or software that may be stored within the storage 2160. As will be explained in greater detail, such selective access may be based on the provision of various access and/or security credentials that customers of the providers that own and/or operate each of the source devices 2100 may provide.

Figure 15C:
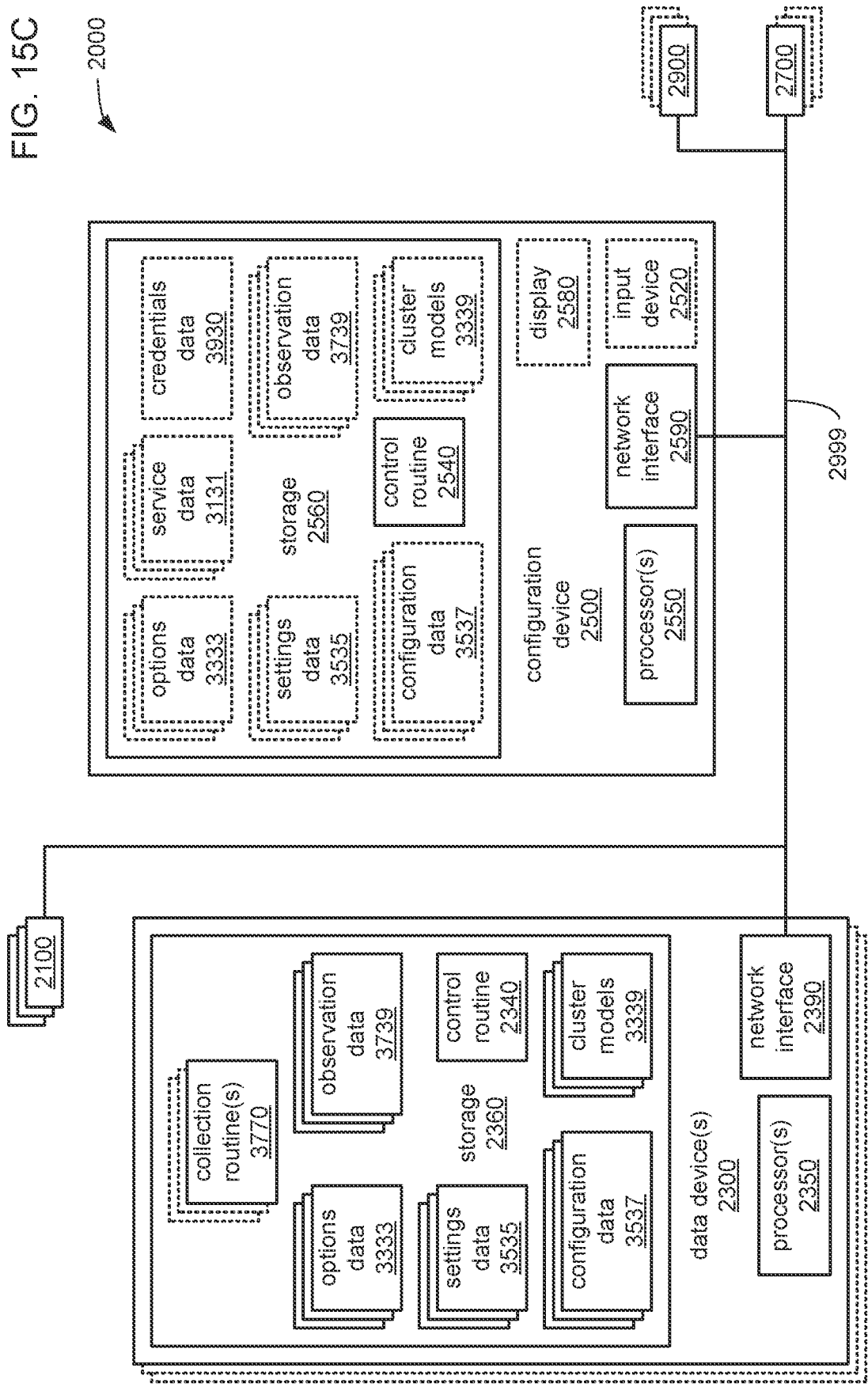

Turning to FIG. 15C, in various embodiments, each of the one or more data devices 2300 may incorporate one or more of a processor 2350, a storage 2360 and a network interface 2390 to couple each of the data devices 2300 to the network 2999. The storage 2360 may store one or more of a control routine 2340, options data 3333, cluster models 3339, settings data 3535, configuration data 3537, observation data 3739, collection routine(s) 3770, and monitoring routine(s) 3970.

Also, in various embodiments, the configuration device 2500 may incorporate one or more of a processor 2550, a storage 2560, an input device 2520, a display 2580, and a network interface 2590 to couple the configuration device 2500 to the network 2999. The storage 2560 may store one or more of a control routine 2540, a subset of the service data 3131, a subset of the options data 3333, a subset of the settings data 3535, a subset of the configuration data 3537, and credentials data 3930.

It should be noted that the one or more data devices 2300, and the configuration device 2500, may be owned and/or operated by either a cloud provider or a software provider of software that supports some aspect of the creation and/or operation of a computing cluster. It may be that such a provider of either hosting services or software for a computing cluster seeks to make it easier for a customer to use their hosting services and/or software in conjunction with the services and/or software offered by other providers. Thus, such a provider may use the data device(s) 2300 and the configuration device 2500 to provide their customers with a guided approach to configuring a combination of hosting service and software to enable the creation and operation of a computing cluster without requiring their customers to become immersed in the complexities of the numerous configuration options available for the hosting service and for each software routine that is used.

By way of example, it may be that a provider of hosting services based on the node device(s) 2700 seeks to make it easier for customers to select and configure software from one or more software providers to make it easier to successfully create a computing cluster 2777 to be hosted within multiple node devices 2700, or within multiple VMs 2707 instantiated within the node device(s) 2700. Alternatively, and by way of another example, it may be that a software provider of one or more software routines used in creating and/or operating a computing cluster seeks to make it easier to successfully configure their software along with software from other software providers, and/or along with multiple physical and/or virtual computing devices (e.g., the node device(s) 2700 and/or the VM(s) 2707), to make it easier to successfully create and operate a computing cluster.

As yet another alternative, it should again be noted that, in some embodiments, it may be that a cloud provider of a hosting service for a computing cluster 2777 based on the node device(s) 2700 also acts in the role of a software provider. Thus, it may be that such a cloud provider seeks to make it easier for customers to create and operate a computing cluster 2777 by providing a "one stop" source for both the hosting service and at least some of the needed software, and by additionally providing such a guided approach to configuring the hosting service and needed software.

Regardless of whether it is a cloud provider, a software provider or a provider serving in both roles that owns and/or operates the data device(s) 2300 and the configuration device 2500, as depicted, the data device(s) 2300 may provide persistent storage of much of the aforedescribed data and routines for use by the configuration device 2500 in providing the aforementioned guided approach to configuration. As will shortly be explained in greater detail, the data stored by the data device(s) 2300 serve to augment and build upon the service data 3131*cld* concerning the hosting services offered by cloud providers, and the service data 3131*sft* concerning software offered by software providers.

Figure 15D:
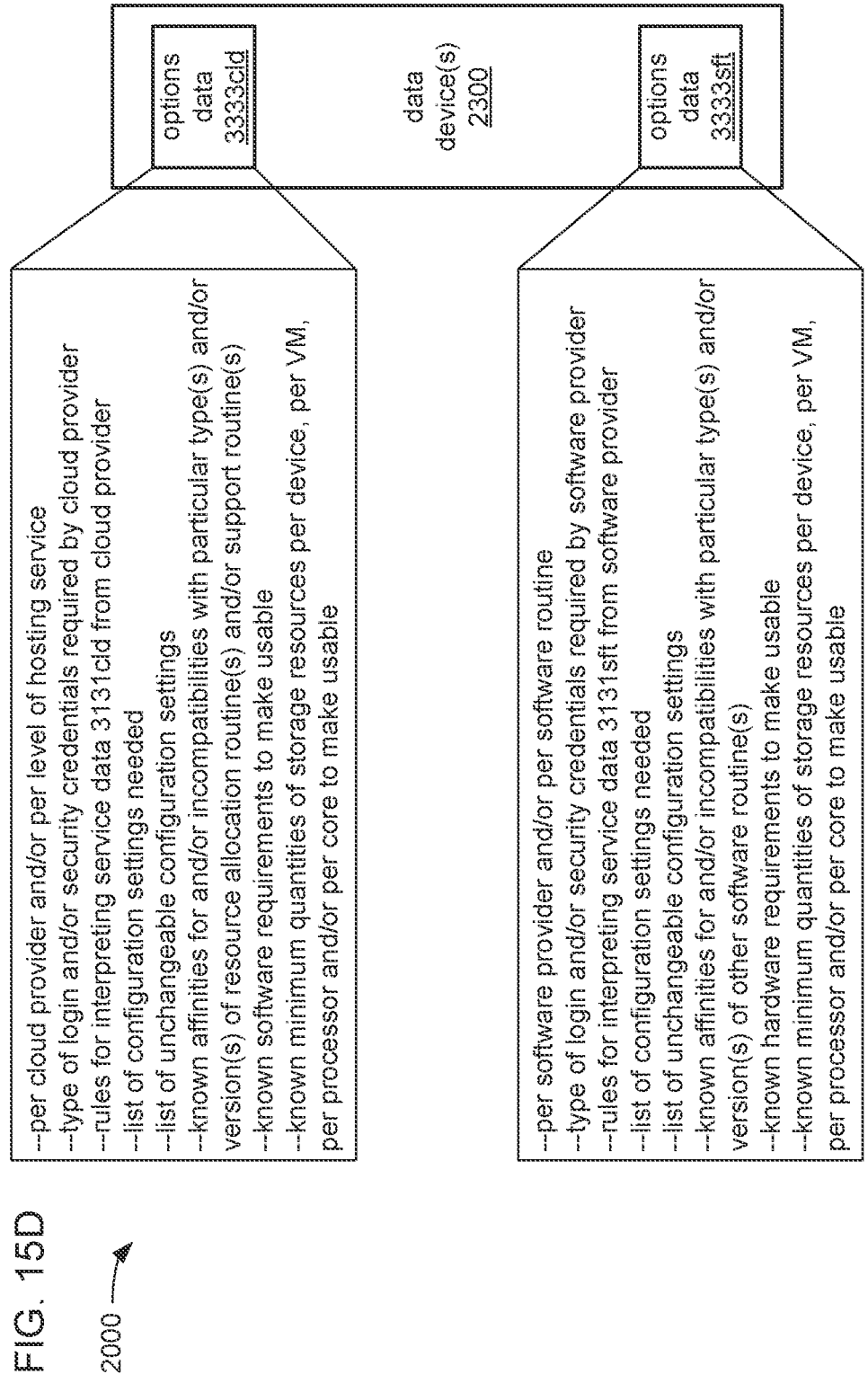

Turning to FIG. 15D, the data device(s) 2300 may store separate instances of the options data 3333*cld* for each cloud provider and/or for each level of hosting service offered by a cloud provider. Each instance of the options data 3333*cld* is intended to expand upon the information provided by a cloud provider in an instance of the service data 3131*cld* that they may provide from a source device 2100*cld* (see FIG. 15B) that they may own and/or operate. Each instance of the options data 3333*cld* serves to provide the information necessary to obtain access to the cloud provider's source device 2100*cld* (e.g., the type of login information and security credentials required), and/or a set of rules for interpreting the instance(s) of service data 3131*cld* that may be retrieved from that source device 2100*cld* (e.g., data format and/or syntax rules). Each instance of the options data 3333*cld* may also serve to provide information concerning the configuration settings associated with the one or more of the levels of hosting service that are offered, including indications of what configuration settings may present options that may be chosen by a customer, versus what configuration settings are set by the cloud provider such that they may be fixed. As also depicted, each instance of the options data 3333*cld* may additionally include information concerning various aspects of interoperability of one or more levels of hosting service, including and not limited to, known affinities for particular software (e.g., ways in which a level of hosting service may be specifically designed and/or otherwise configured to work with a particular resource allocation routine 3710 and/or with a particular support routine 3740), known incompatibilities with particular software routines (e.g., known combinations of a particular level of hosting service with a particular resource allocation routine 3710 and/or a particular support routine 3740 discovered by past experience to cause crashes and/or other malfunctions), and known minimum hardware allocation requirements to make particular software routines useable within one or more levels of hosting service (e.g., a minimum processing and/or storage resource requirement discovered by past experience).

Similarly, the data device(s) 2300 may store separate instances of the options data 3333*sft* for each software provider (including for each cloud provider that offers software in addition to hosting services) and/or for each software routine that is offered by a software provider (e.g., each resource allocation routine 3710 and/or each support routine 3740 that is offered). Each instance of the options data 3333*sft* is intended to expand upon the information provided by a software provider in an instance of the service data 3131*sft* that they may provide from a source device 2100*sft* (see FIG. 15B) that they may own and/or operate. Each instance of the options data 3333*sft* serves to provide the information necessary to obtain access to the software provider's source device 2100*sft* (e.g., the type of login information and security credentials required), and/or a set of rules for interpreting the instance(s) of service data 3131*sft* that may be retrieved from that source device 2100*sft* (e.g., data format and/or syntax rules). Each instance of the options data 3333*sft* may also serve to provide information concerning the configuration settings associated with the software routine(s) that are provided, including indications of what configuration settings may present options that may be chosen by a customer, versus what configuration settings are set by the software provider such that they may be fixed. As also depicted, each instance of the options data 3333*sft* may additionally include information concerning various aspects of interoperability of one or more of the software routine(s) offered by the software provider, including and not limited to, known affinities for other particular software routines (e.g., ways in which a particular resource allocation routine 3710 or particular support routine 3740 may be specifically designed and/or otherwise configured to work with another particular software routine), known incompatibilities with other particular software routines (e.g., known combinations of a particular resource allocation routine 3710 and/or a particular support routine 3740 with a particular level of hosting service discovered by past experience to cause crashes and/or other malfunctions), and known minimum hardware allocation requirements to make the particular software routine offered by the software provider useable (e.g., a minimum processing and/or storage resource requirement discovered by past experience).

As will be explained in greater detail, instances of options data 3333*cld* and/or 3333*sft* may be used to confirm interoperability within a particular combination of hosting service and/or software selected by a customer for creating and operating a computing cluster, and/or to provide warning(s) to a customer of potential risk(s) of lack of interoperability within such a particular combination. As those skilled in the art will readily recognize, coding errors and/or various unforeseen errant interactions occurring at runtime between software routines, and/or between software and hardware resources, may create difficulties in using particular combinations of hardware and/or software together.

Figure 15E:
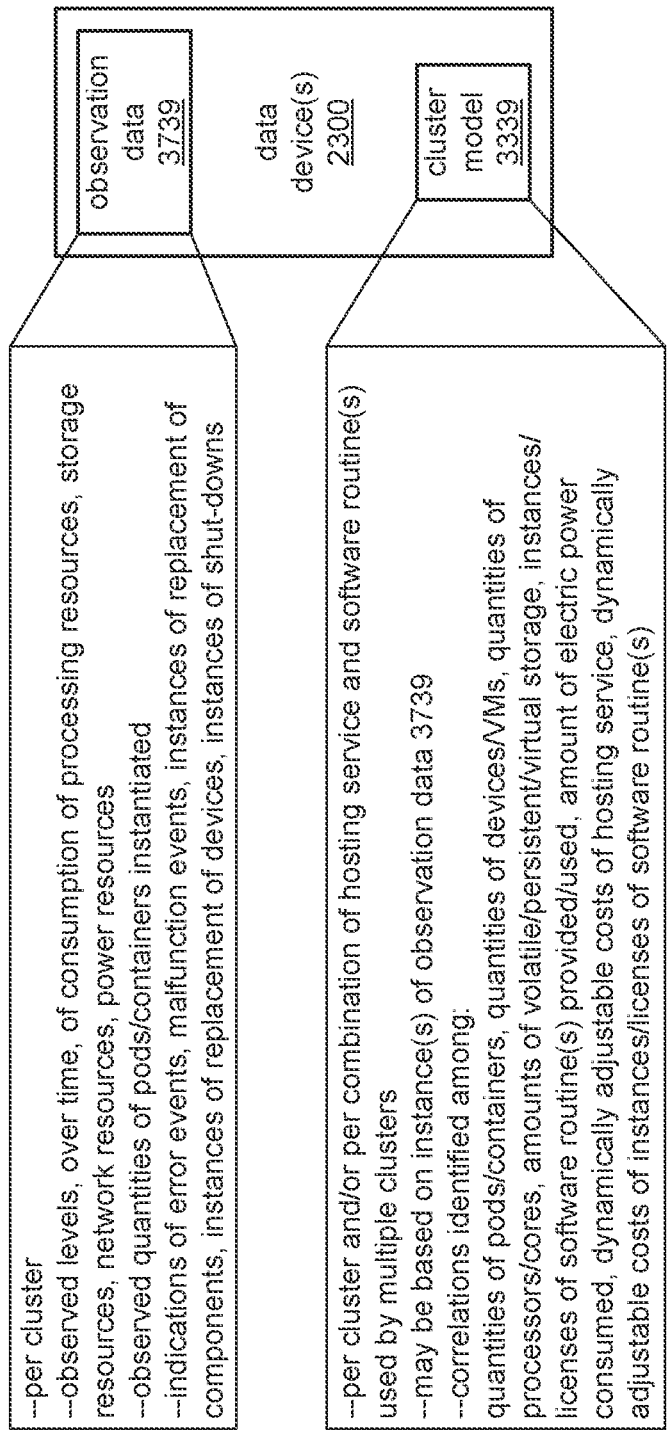

Turning to FIG. 15E, for each computing cluster that is created through use of the distributed processing system 2000 of either of FIG. 14A-B or 14C-E, and that is subsequently put into operation such that data concerning its operation is able to be collected, the one or more data devices 2300 may store at least one instance of the observation data 3739. As will be explained in greater detail, during operation of a computing cluster, instances of a collection routine 3770 (see FIG. 15C) within each physical computing device and/or within each virtual computing device that is used to host that computing cluster may cooperate with the data device(s) 2300 to generate and store instance(s) of the observation data 3739 to serve as a log of observations of various aspects of the computing cluster.

The one or more data devices 2300 may also store a separate cluster model 3339 for each computing cluster that was created through use of the distributed processing system 2000, and then put into operation such that some amount of observation data was collected from which to generate a cluster model 3339. Alternatively or additionally, the one or more storage devices 2300 may store a separate cluster model 3339 for each set of computing clusters that employ an identical combination of hosting service and software routines, that were all created through use of the distributed processing system 2000, and that were all then put into operation such that some amount of observation data was collected from which to generate the cluster model 3339.

More precisely, and as will be explained in greater detail, during a performance of an initial configuration of a computing cluster that is entirely new such that there has been no opportunity to observe its performance during operation, a cluster model 3339 associated with another computing cluster, or associated with a set of other computing clusters, that employ the same combination of hosting service and software may be automatically selected for use in providing guidance to a customer in creating that new cluster. As part of providing such guidance to the customer, the cluster model 3339 may be used to assist in analyzing each choice of a configuration setting made by the customer to determine whether it conflicts with other configuration settings, and the customer may be presented with warnings about any such conflicts that are identified.

However, after the new computing cluster has been in operation for some amount of time that enables the generation of a corresponding instance of observation data 3739 of sufficient detail over a sufficient period of time, it may be possible to either update and/or generate a cluster model 3339 based on those newly collected observations. Such an updated or new cluster model 3339 may then be used in a repeat performance of configuration of the new computing cluster to take advantage of observations that may be unique to the new computing cluster such that it may be at least slightly reconfigured to improve its functionality.

Each cluster model 3339 may include correlations among various aspects of the operation of one or more computing clusters employing a particular combination of hosting service and software routine(s), wherein each such correlation is derived from observations of the performances of those one or more computing clusters. Such correlations may be among one or more of: quantities of pods and/or containers; quantities of physical computing devices and/or VMs; quantities of processors and/or processor cores; amounts of volatile, persistent and/or virtual storage; quantities of instances and/or licenses of individual software routine(s) (e.g., resource allocation routine(s) and/or support routine(s)) that are provided and/or actually used; amount of electric power that is consumed; dynamically adjustable costs of the hosting service used; and/or dynamically adjustable costs of the instances and/or licenses of each software routine that is used.

Figure 15F:
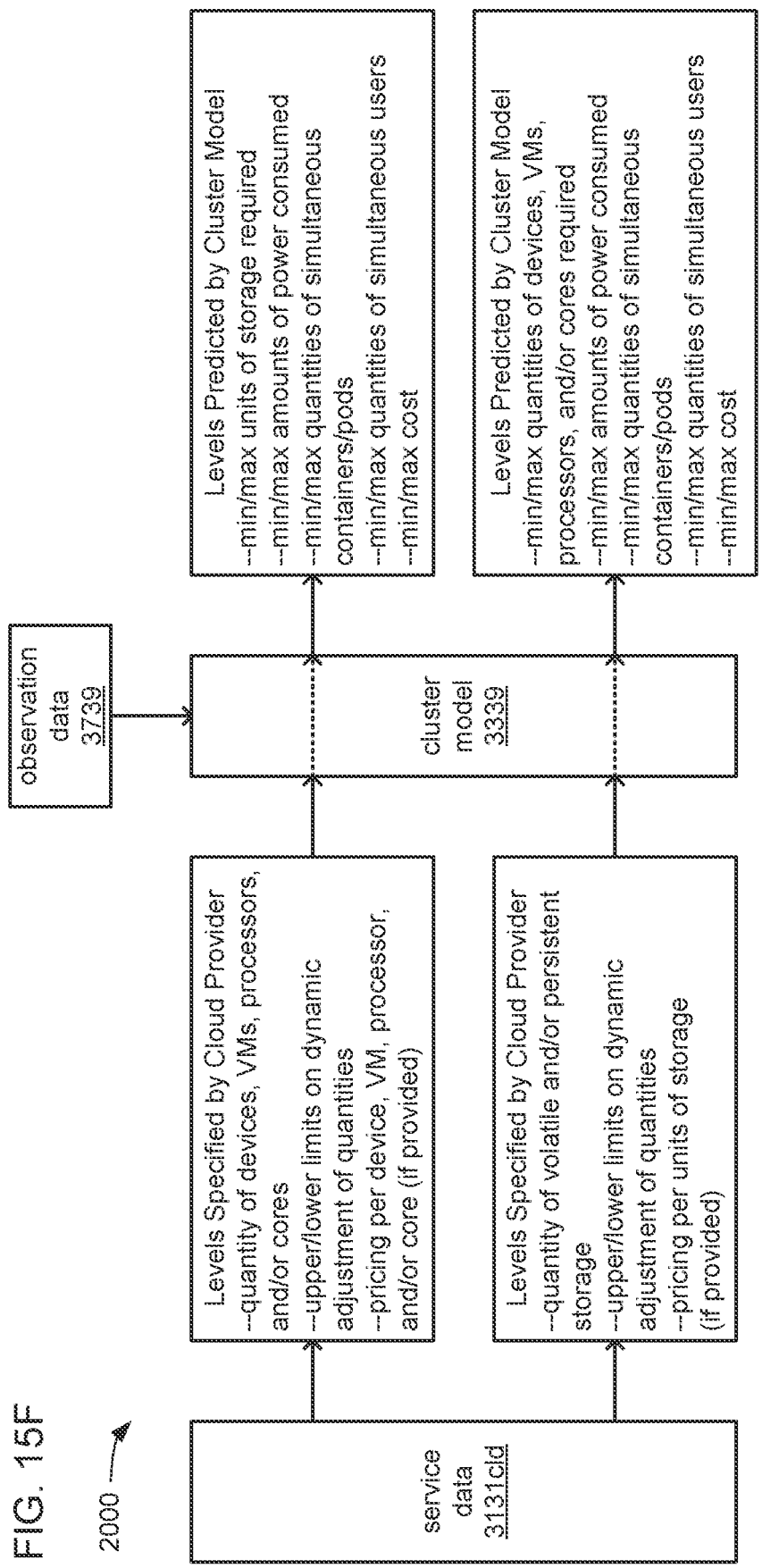

Turning to FIG. 15F, and by way of example during an initial performance of configuration of a new computing cluster (such that there are no observations of its performance, as yet) it may be that an instance of service data 3131*cld* from a cloud provider specifies one or more levels of processing resources, and/or of storage resources, that are provided by the selected level of hosting service (e.g., quantities of devices, VMs, processors and/or processor cores that are provided), along with limits of the degree to which such levels may be dynamically varied as part of controlling costs. The cluster model 3339 that is used in such an initial configuration may include correlations between such levels specified by the cloud provider, and levels of other aspects of performance that are based on observations of the performance of other computing cluster(s) of similar configuration (i.e., an identical combination of level of hosting service and software routine(s)) such that those correlations are able to be used during the initial configuration to make predictions about other levels of performance for the new computing cluster. Those predictions may then be used in providing guidance in configuring the new computing cluster.

Figure 15G:
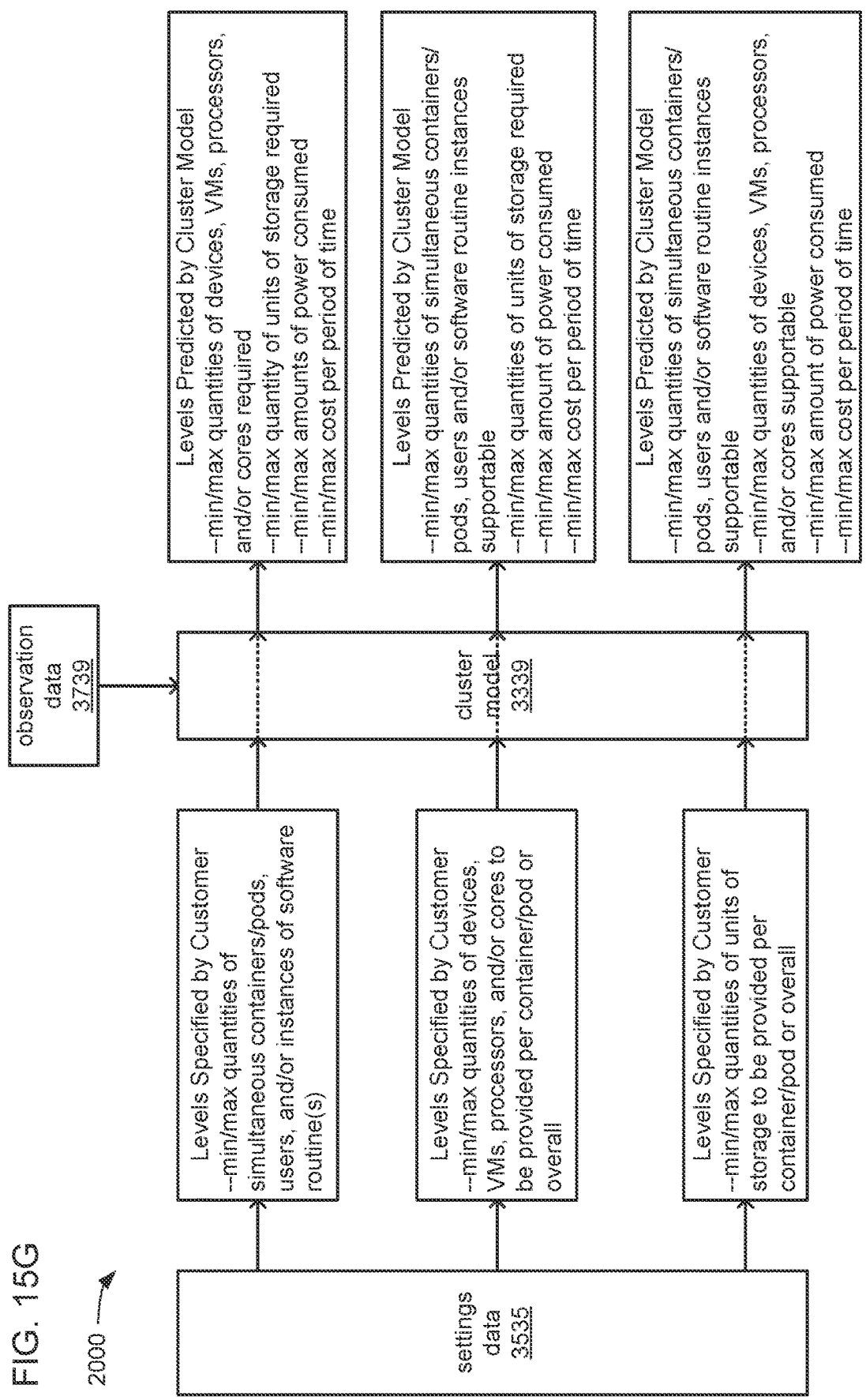
Figure 15H:
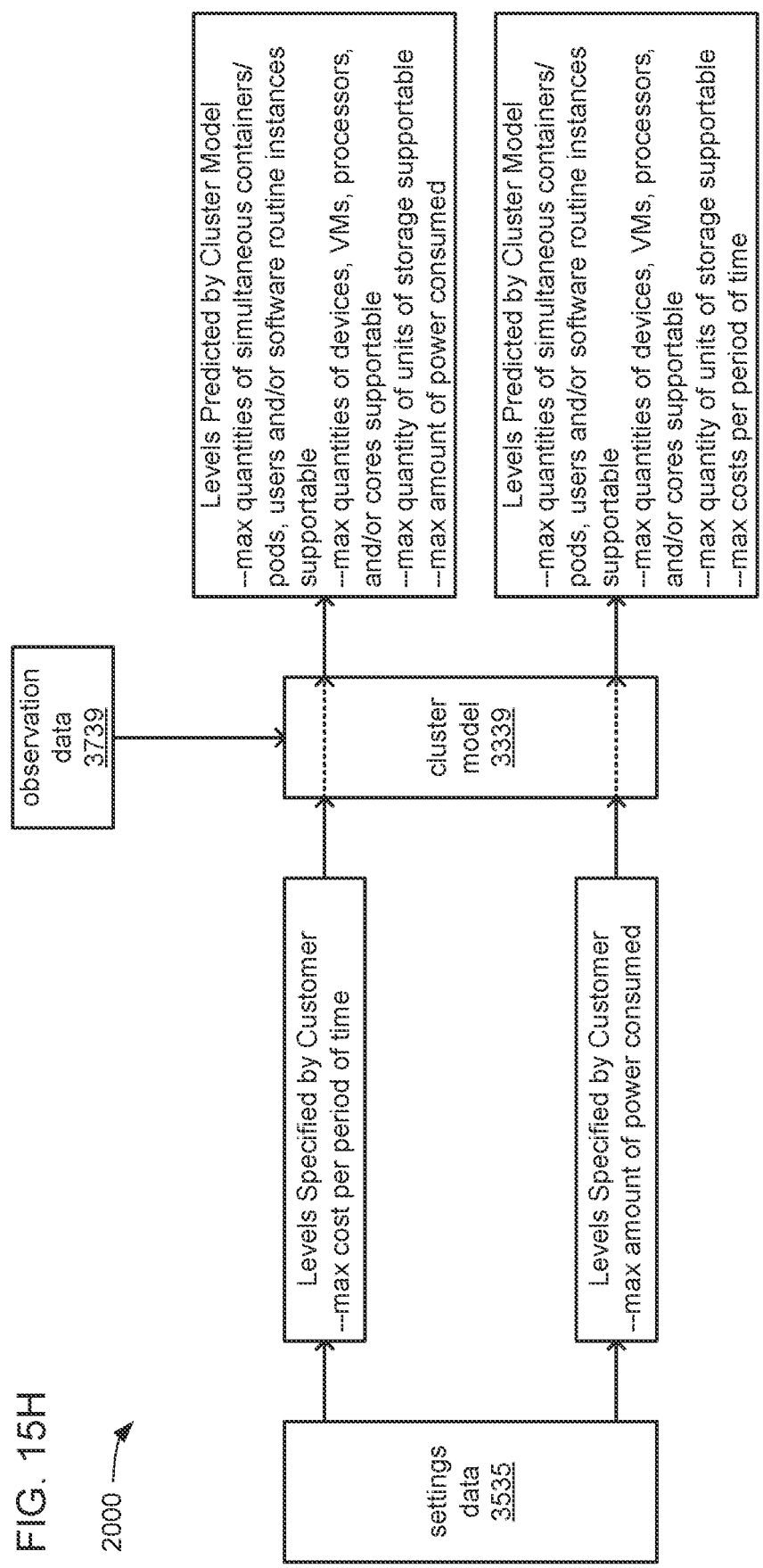

Turning to FIGS. 15G and 15H, also by way of example during either an initial performance of configuration of a new computing cluster, or a repeat performance of configuration of a computing cluster that has already been in operation for some amount of time, it may be that a customer directly specifies one or more minimum and/or maximum levels of performance to be achieved, and/or the customer employs one or more minimum and/or maximum levels of performance already specified in an instance of settings data 3535 that may be selected for use as a template. During an initial performance of configuration of a new computing cluster, the cluster model 3339 that is used may include correlations between such specified levels, and levels of other aspects of the performance that are based on observations of the performance of other computing cluster(s) of similar configuration (i.e., an identical combination of level of hosting service and software routine(s)). During a repeated performance of configuration of an existing computing cluster, the cluster model 3339 that is used may include such correlations that are based on observations of the performance of that same computing cluster. Either way, such correlations are able to be used during initial configuration, or during a repeat of configuration, to make predictions about other levels of performance. Those predictions may then be used in providing guidance during such configuration.

Figure 15I:
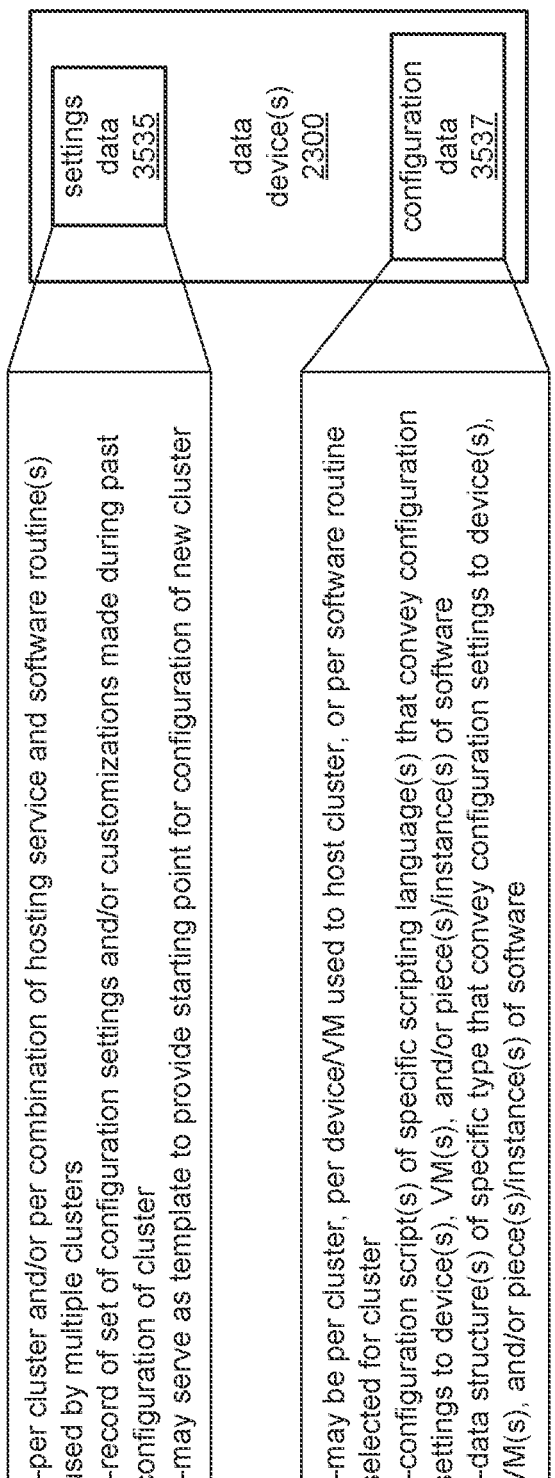

Turning to FIG. 15I, the one or more storage devices may store a separate instance of settings data 3535 for each computing cluster that is created through use of the distributed processing system 2000. Alternatively or additionally, the one or more storage devices 2300 may store a separate instance of settings data 3535 for each set of computing clusters that all employ an identical combination of level of hosting service and software routine(s) and the same set of configuration settings, and where all of the computing clusters therein are created through use of the distributed processing system 2000.

As will be explained in greater detail, each instance of settings data 3535 may serve as a record of the set of configuration settings and/or customizations made by a customer during the configuration of at least one computing cluster. Also, it may be that at least a subset of instances of the settings data 3535 are used as templates that may each serve as a starting point for the configuration of a new computing cluster.

For each computing cluster that is created through use of the distributed processing system 2000, the data device(s) 2300 may store multiple instances of the configuration data 3537. Each instance of the configuration data 3537 may contain one or more configuration scripts that each convey configuration settings for the hosting service or one of the selected software routines. Also, each instance of the configuration data 3537 may contain one or more data structures that each convey configuration settings for the hosting service or one of the selected software routines. As will be explained in greater detail, the multiple instances of the configuration data 3537 for a computing cluster may be generated from the configuration settings for the hosting service and selected software routine(s) that are stored within the single instance of settings data 3535 for that computing cluster.

As will be familiar to those skilled in the art, each physical computing device and/or virtual computing device that is used to host a portion of a computing cluster may need to be provided with information needed to enable communications with the other physical and/or virtual computing devices. Thus, even where multiple identical physical or virtual devices are used to host a computing cluster with identical software installed on each of those devices, it may be that each of those devices is to provided with a different instance of the configuration data 3537 where the differences thereamong may be just the identifiers and/or security credentials needed to communicate with the other devices.

Referring back more specifically to FIG. 15C, the control routine 2340 may incorporate a sequence of instructions operative on the processor(s) 2350 to implement logic to perform various functions. More specifically, in executing the control routine 2340, the processor(s) 2350 of each of the data devices 2300 may be caused to operate the network interface 2390 to provide a network portal on the network 2999, which may employ any of a variety of network communications protocols, to provide selective access to the data and/or to software routine(s) that may be stored within the storage 2360. Alternatively or additionally, and as will be explained in greater detail, execution of the control routine 2340 may cause the processor(s) 2350 of each of the data devices 2300 to receive pieces of data conveying observations of various aspects of the operation of computing clusters hosted by physical and/or virtual devices, and may assemble those pieces of data to generate separate instances of the observation data 3739 for each of those computing clusters.

Also, the control routine 2540 may incorporate a sequence of instructions operative on the processor(s) 2550 to implement logic to perform various functions. More specifically, and as will be explained in greater detail, in executing the control routine 2540, processor(s) 2550 of the control device 2500 may be caused to operate the display 2580 and the input device 2520 to directly provide a UI by which a customer may be guided through configuring, deploying and maintaining a new computing cluster 2777. Alternatively, execution of the control routine 2540 may cause operation of the network interface 2590 by the processor(s) 2550 to provide such a UI remotely via the network 2999, and in cooperation with a remote computing device, such as the one or more UI devices 2900.

Figure 15J:
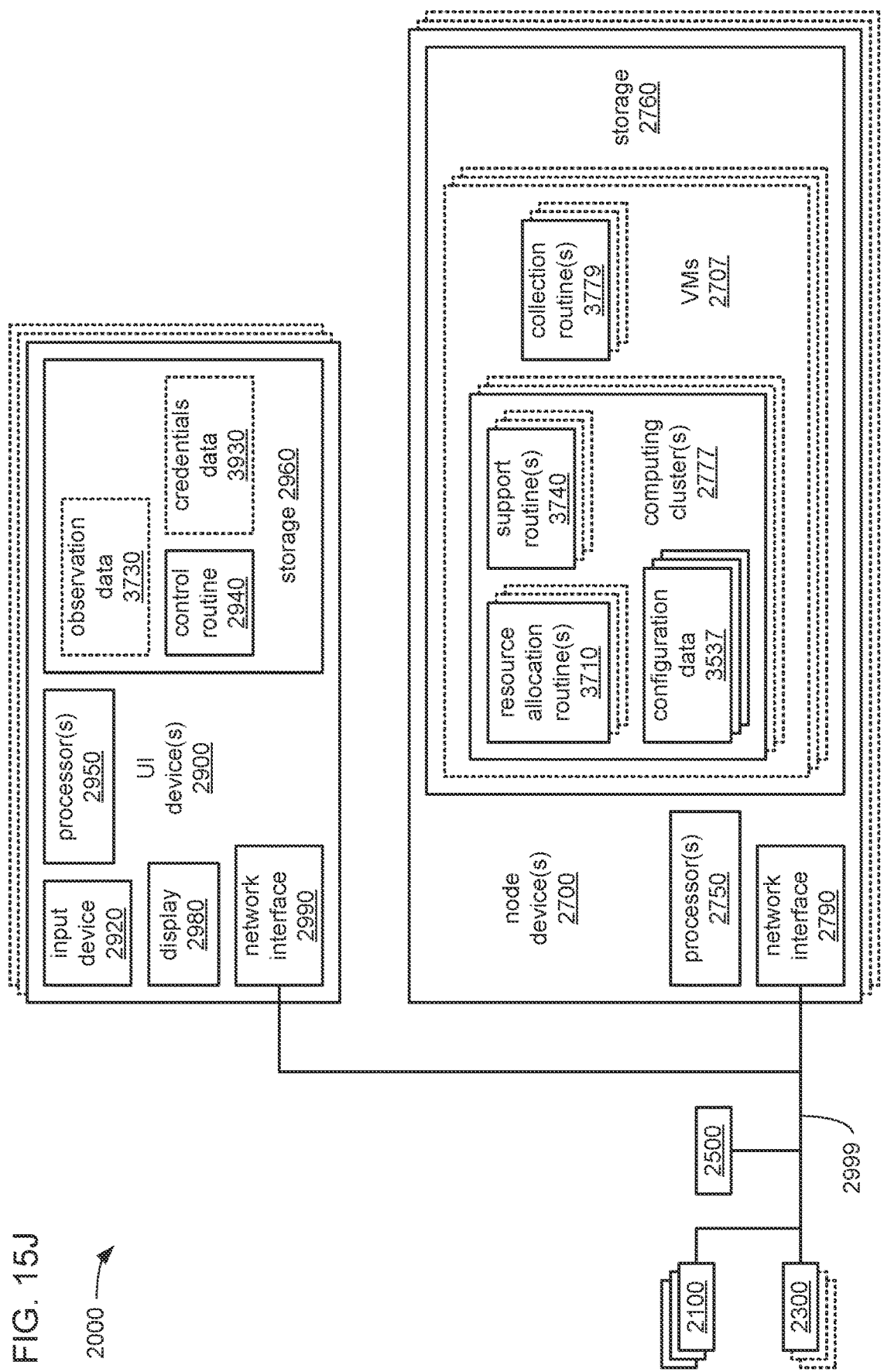
Figure 15K:
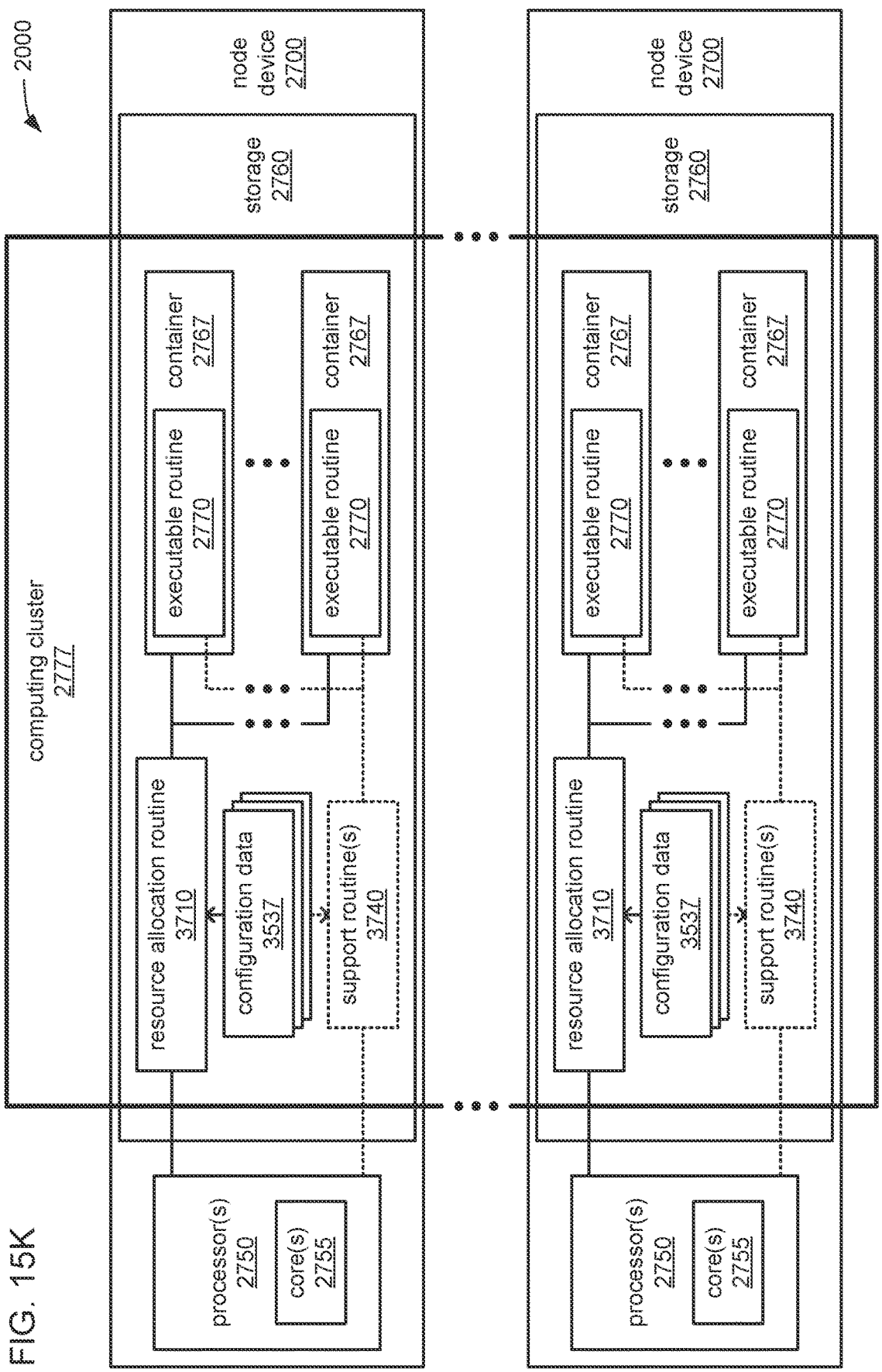
Figure 15L:
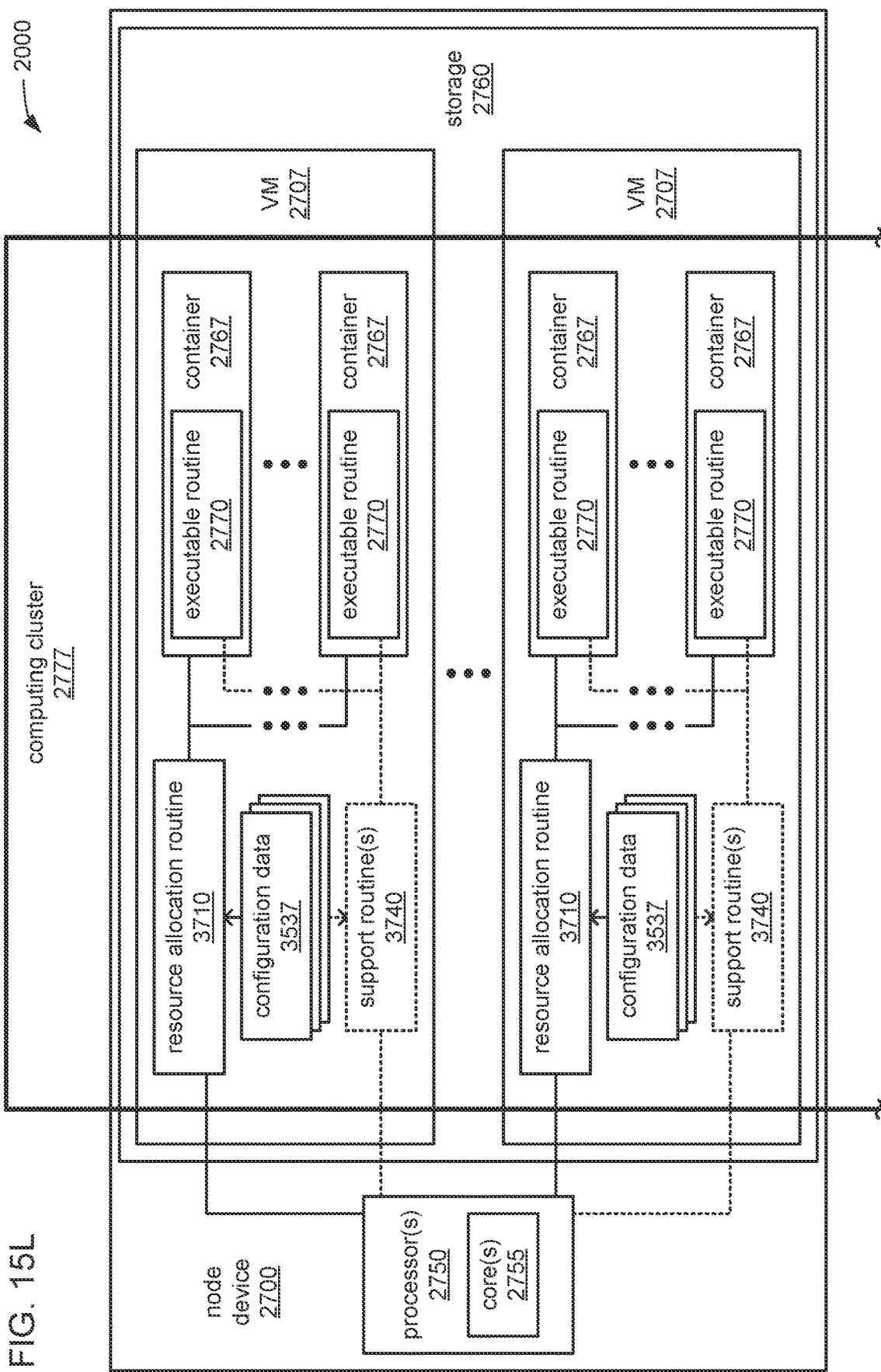

Turning to FIGS. 15J, 15K and 15L, in various embodiments, each of the one or more node devices 2700 may incorporate one or more of a processor 2750, a storage 2760 and a network interface 2790 to couple each of the node devices 2700 to the network 2999. The storage 2760 may store one or more of instance(s) of configuration data 3537, resource allocation routine(s) 3710, support routine(s) 3740, and collection routine(s) 3770.

As depicted more specifically in FIG. 15K, in embodiments in which a computing cluster 2777 is hosted across multiple node devices 2700 (e.g., the embodiment of FIGS. 14A-B), portions of such a computing cluster 2777 may be stored within the storages 2760 of multiple node devices 2700. Thus, instances of a resource allocation routine 3710, one or more support routines 3740 and/or configuration data 3537 may be stored within the portion of the storage 2760 of each of such node devices 2700. Also stored within the same portion of the storage 2760 of each of such node devices 2700 may be the containers 2767 that are instantiated and maintained as a result of the execution of the corresponding instance of the resource allocation routine 3710 to provide multiple separate execution environments for the execution of various executable routines 2770 in parallel to cause the performance of various tasks in parallel. Additionally, from within each such execution environment, the executable routine 2770 that is executed therein may be provided with access to the library(ies) of callable routines within one or more support routines 3740.

As depicted more specifically in FIG. 15L, in embodiments in which a computing cluster 2777 is hosted across multiple VMs 2707 (e.g., the embodiment of FIGS. 14C-E), portions of such a computing cluster 2777 may be hosted within multiple VMs 2707 that may be instantiated within the storages 2760 of multiple node devices 2700, or may be instantiated within the storage 2760 of a single node device 2700. Thus, portions of such a computing cluster 2777 may be stored within the portions of the storage(s) 2760 of the one or more node devices 2700 that are allocated to each one of those multiple VMs 2707. Thus, instances of a resource allocation routine 3710, one or more support routines 3740 and/or configuration data 3537 may be stored within each of such portions of the storage(s) 2760 of those one or more node devices 2700. Also stored within the same portion of a storage 2760 allocated to each of those multiple VMs 2707 may be the containers 2767 that are instantiated and maintained as a result of the execution of the corresponding instance of the resource allocation routine 3710. Additionally, from within each such execution environment, the executable routine 2770 that is executed therein may be provided with access to the library(ies) of callable routines within one or more support routines 3740.

Also in various embodiments, each of the one or more UI devices 2900 may incorporate one or more of a processor 2950, a storage 2960, an input device 2920, a display 2980, and a network interface 2990 to couple each of the UI devices 2900 to the network 2999. The storage 2960 may store one or more of a control routine 2940, one or more instances of observation data 3739, the credentials data 3930, and an instance of a monitoring routine 3970.

It should be noted that each UI device 2900 may be owned by a customer seeking to create and operate a computing cluster 2777 of physical computing devices hosted within multiple node devices 2700, or a computing cluster 2777 of virtual computing devices hosted within multiple VMs 2707. Again, such use of one of UI device(s) 2900 may enable the customer to interact with the control device 2500 remotely through the display 2980 and/or input device 2920 thereof, instead of interacting more directly with the control device 2500 via the display 2580 and/or input device 2520 thereof.

The control routine 2940 may incorporate a sequence of instructions operative on the processor(s) 2950 to implement logic to perform various functions. More specifically, in executing the control routine 2940, the processor(s) 2950 of each of the UI devices 2900 may be caused to operate the network interface 2990 to cooperate with the control device 2500, via the network 2999, to use the display 2980 and the input device 2920 to serve as a remote device that provides the UI originating from the control device 2500 for configuration, deploying and maintaining a new computing cluster 2777.

Figure 16B:
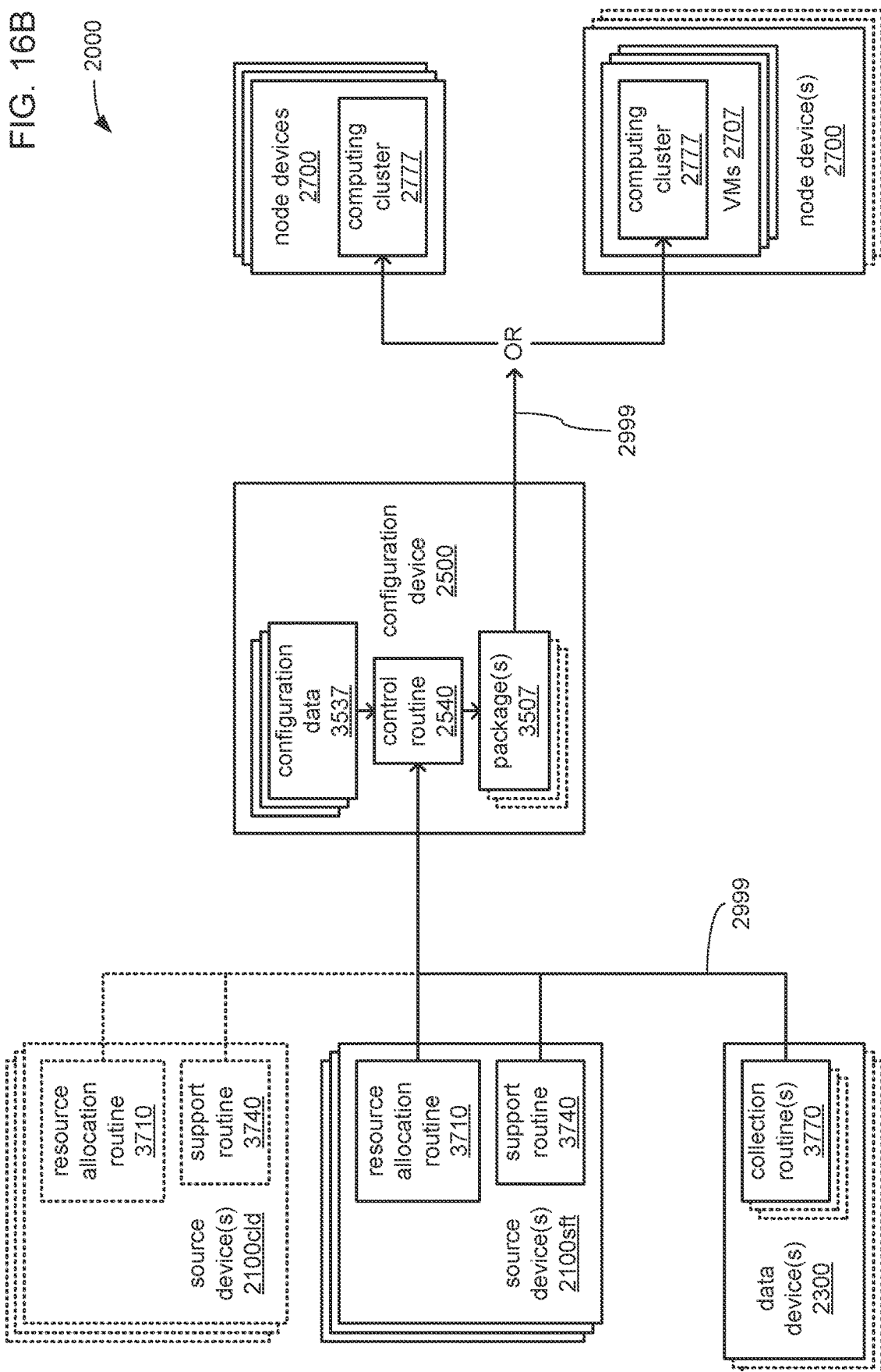
Figure 16C:
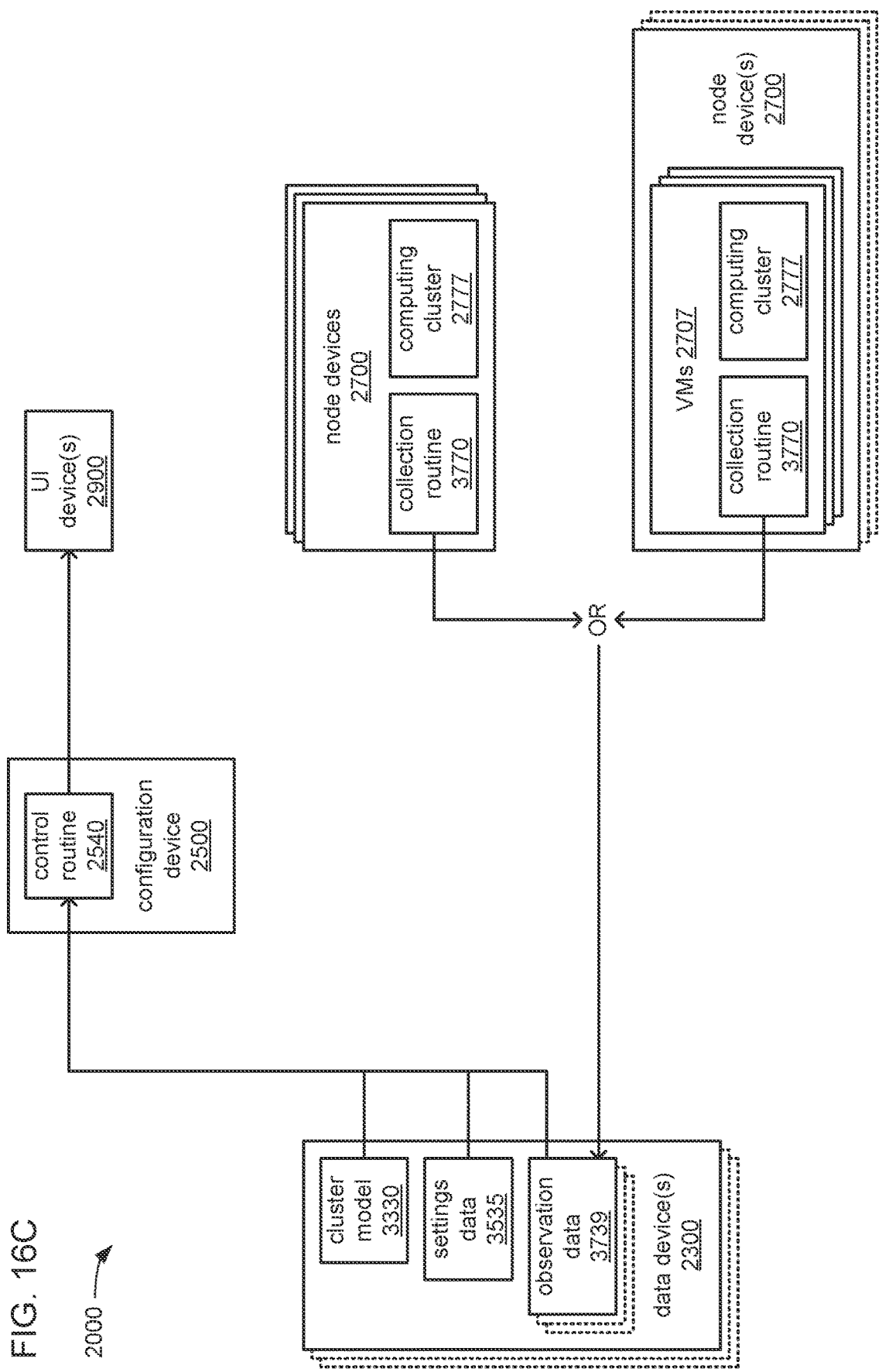

FIGS. 16A-C, taken together, set forth an overview of an example of configuring, provisioning and maintaining a new computing cluster 2777. It should be noted that, for purposes of ease of understanding and to avoid the presentation of unnecessary visual clutter in these figures, this is a deliberately highly simplified example of performing such operations, and should not be taken as limiting the scope of the claims.

Turning to FIG. 16A, during configuration, a customer seeking to create and operate a new computing cluster 2777 may use the depicted UI device 2900 of an embodiment of the distributed processing system 2000 of either of FIG. 14A-B or 14C-E to remotely interact with the configuration device 2500 to do so. As will be explained in greater detail, through such interaction with the configuration device 2500, the customer may be guided through providing various details and making choices of various configuration settings concerning various aspects pertinent to generating and operating the new computing cluster 2777, including configuration choices for the particular level of hosting service and/or software routine(s) that are selected and used.

As previously discussed, each source device 2100 of the distributed processing system 2000 may be operated by a different cloud provider or software provider. In this depicted example, each of one or more cloud providers of hosting services may own and/or operate a source device 2100*cld*, including at least one source device 2100*cld* operated by a cloud provider that owns and/or operates the one or more node devices 2700. Similarly, each of one or more software providers may own and/or operate a source device 2100*sft*. Within each of the source devices 2100*cld* and/or 2100*sft*, execution of the control routine 2140 by the processor(s) 2150 thereof may cause the processor(s) 2150 therein to provide, on the network 2999, a network portal for the customer to remotely interact with the configuration device 2500 via another computing device (e.g., one of the UI devices 2900).

At an earlier time, the customer may have already interacted with the source device 2100*cld* of the cloud provider that owns and/or operates the node device(s) 2700, may have already selected a level of hosting service to be provided by that cloud provider for hosting the new computing cluster 2777, and may have already arranged a form of recurring payment of fees to that cloud provider for that selected level of hosting service. Similarly, the customer may have also already interacted with one or more of the source device(s) 2100*sft* of one or more software providers offering software routines (e.g., one or more resource allocation routines 3710, and/or one or more support routines 3740) that the customer seeks to use in creating and/or operating the new computing cluster 2777, may have already selected quantities and/or types of licenses to the selected software routine(s), and may have already arranged a form of recurring payment of fees to each of those software providers for those license(s) for those selected software routine(s).

With such orders for the provision of a level of a hosting service and/or software license(s), the customer may then interact with the configuration device 2500 to be assisted in configuring and deploying the new computing cluster 2777 within multiple node devices 2700 as a computing cluster of physical computing devices, or within multiple VMs 2707 as a computing cluster of virtual computing devices. In some embodiments, such interaction may be directly through the configuration device 2500 via the display 2580 and the input device 2520 thereof. In such embodiments, execution of the control routine 2540 by the processor(s) 2550 of the control device 2500 may cause the processor(s) 2550 thereof to operate the display 2580 and the input device 2520 to directly provide a user interface (UI) by which the customer is guided through such configuration and deployment. Alternatively, and similar to the earlier interactions with the source devices 2100*cld* and/or 2100*sft*, the processor(s) 2550 of the control device 2500 may be caused to remotely provide such a UI through the network 2999, and through a display and input device of another computing device (e.g., one of the UI devices 2900).

The processor(s) 2550 of the configuration device 2500 may begin the interaction with the customer by prompting the customer, via the user interface (UI) generated by processor(s) 2550, to provide credentials data 3930*cld* and/or 3930*sft* through 3930*sx*. The credentials data 3930*cld* may include account identifier(s), security credential(s) and/or transaction identifier(s) needed to communicate with the source device 2100*cld* of the cloud provider selected by the customer to gain access to the customer's account therewith to retrieve the service data 3131*cld* containing information concerning the level of hosting service ordered by the customer from the selected cloud provider. Similarly, for each software provider the customer selected to provide one or more software routines, a corresponding instance of the credentials data 3930*sft* may include similar information needed to communicate with the corresponding source device 2100*sft* to similarly retrieve the corresponding service data 3131*sft* containing information concerning the each software routine for which a corresponding license was ordered by the customer from a software provider.

As previously discussed, it may be that the configuration device 2500 and the one or more data device(s) 2300 may be owned and/or operated by the cloud provider or one of the software providers that the customer has selected. Again, this may be part of an effort to provide the customer with guidance through at least the configuration of the combination of hosting service and software that the customer has selected for the new computing cluster 2777, thereby reducing and simplifying the customer effort in using that combination of hosting service and software to create and operate the new computing cluster 2777. Additionally, as such guidance is provided, and as will be explained in greater detail, the configuration device 2500 may use the information received from the selected providers, the various inputs provided by the customer, and/or a cluster model based on past observations of similar computing cluster(s), to perform one or more checks of whether the configuration being created for the new computing cluster 2777 will cause the new computing cluster 2777 to function as specified by the customer. Still further, as the provision of guidance through various choices of configuration settings is completed, a draft version of one or more configuration scripts may be generated that the customer may be given an opportunity to edit in order to add various customizations, and it may be that such customizations are also subjected to further checks to confirm functionality for the new computing cluster 2777.

Upon being provided with the prompted-for instances of the credentials data 3930*cld* and/or 3930*sft* by the customer, the processor(s) 2550 of the configuration device 2500 may be caused by further execution of the control routine 2540 to use such information to access corresponding ones of the source devices 2100*cld* and/or 2100*sft* to retrieve the corresponding instances of the service data 3131*cld* and/or 3131*sft*. With those instances of the service data 3131*cld* and/or 3131*sft* having been retrieved, the processor(s) 2550 may use the information therein concerning what level of hosting service was ordered by the customer, and/or what particular software routine(s) were licensed by the customer, to identify corresponding instances of the options data 3333*cld* and/or 3333*sft* to be retrieved from the data device(s) 2300.

Within each of the one or more data devices 2300, processor(s) 2350 may be caused by execution of the control routine 2340 to provide a network portal on the network 2999 that is to be interacted with by the control device 2500 to obtain access to data stored within the storage 2360. At an earlier time, the configuration device 2500 may have been provided with various access and/or security credentials required in such interactions with such a network portal of the data device(s) 2300 to be successfully granted such access.

Upon the retrieval of those instances of options data 3333*cld* and/or 3333*sft*, the processor(s) 2550 of the configuration device 2500 may use the information therein, along with the information within the retrieved instances of service data 3131*cld* and/or 3131*sft*, to perform various checks of the interoperability among the selected level of hosting service and the selected software routine(s). Among such interoperability checks may be checks for known incompatibilities thereamong and/or checks for confirmed affinity thereamong. Such interoperability checks may be useful in providing the customer with relatively quick notice of whether there is a known incompatibility or other issue that may preclude the particular combination of hosting service and software routines that was selected by the customer from functioning correctly.

If the interoperability checks do not reveal an incompatibility or other similar issue, the processor(s) 2550 of the configuration device 2500 may present the customer with a recommendation of a template of configuration settings to use as a starting point for configuring various aspects of the new computing cluster 2777. In so doing, the processor(s) 2550 may be caused by further execution of the control routine 2540 to determine which template(s) of multiple templates are to be offered for selection by the customer, and/or which single template to recommend to the customer, based on a combination of the level(s) of resources provided by the combination of the selected level of hosting service and the selected software routine(s).

As previously discussed, one or more instances of the settings data 3535 stored within the one or more data devices 2300 may be used as templates. Again, each instance of the settings data 3535 stores a set of the configuration settings for one or more previously configured computing clusters. The set of configuration settings within each instance of the settings data 3535 may include indications of the selected cloud provider, the selected level of hosting service, the selected software provider(s), the selected software routine(s), and/or the selected quantity(ies) of license(s) of each selected software routine. The set of configuration settings may also include minimum level(s) of performance and/or maximum level(s) of resources to be consumed, as specified by a customer, along with indications of still other configuration settings chosen by a customer, as will shortly be discussed in greater detail. Alternatively or additionally, the configuration settings may also include indications of customizations made by a customer to one or more configuration scripts that may be generated as part of configuring a computing cluster, as will also shortly be explained in greater detail. Thus, it may be that a single instance of the settings data 3535 that is generated as a record of configuration settings for one computing cluster may then be used as a template to configure one or more other computing clusters to have the same configuration settings, and/or as a template that serves as a starting point that presents a set of default configuration settings that may be changed to a greater or lesser degree to configure another computing cluster to have a more or less different configuration.

Thus, to identify one or more instances of the settings data 3535 to offer as part of a range of templates from which the customer may choose, and/or to identify a single instance of the settings data 3535 to recommend to the customer, the processor(s) 2550 of the configuration device 2500 may compare the various pieces of the information provided for the new computing cluster 2777, so far, to the corresponding pieces of information specified within each instance of the settings data 3535 among multiple instances being considered for use as templates to identify one or more of those multiple instances of the settings data 3535 that are determined to be matches that are close enough to within a predetermined degree. In some embodiments, the multiple instances of the settings data 3535 that are designated for use as templates may be relatively few in number, and each such instance of the settings data 3535 may be selected for use as a template as a result of having a set of configuration settings that has been found to result in computing clusters that have been observed to function reliably. It may be that the multiple instances of the settings data 3535 that are so designated form a range of sizes of computing clusters from relatively small and simple computing clusters to relatively large computing clusters with one or more particular additional features that may be of use for computing clusters that may be specialized for various purposes.

Following the presentation of one or more templates from which the customer may choose and/or the presentation of a recommended choice of template, and following the selection of a template by the customer, the processor(s) 2550 of the configuration device 2500 may then be caused by further execution of the control routine 2540 to generate further portions of the UI to guide the customer through making choices of various configuration settings. Among such configuration choices may be choices for aspects of the selected level of hosting service, and/or for aspects of one or more of the selected software routine(s). Also among such configuration choices may be configuration settings to configure aspects of the manner in which the new computing cluster 2777 may be used, and/or configuration settings to configure the provision of notifications to the customer about various events that may occur during operation of the new computing cluster 2777. Also among such configuration choices may be the specification of one or more minimum performance levels that are to be achieved by the computing cluster (e.g., a minimum level of multiprocessing and/or storage resources that are to always be provided to users of the new computing cluster 2777), and/or one or more maximum levels of resource consumption (e.g., a maximum level of processor cores to be simultaneously allocated to a single user). As part of guiding the customer, configuration settings specified in the selected template may be presented as defaults that the customer may choose to accept or change.

In some embodiments, as the customer is guided through each of such configuration choice, the processor(s) 2550 may use each new choice of a configuration setting made by the customer as an input to performances of checks of whether the configuration settings provided, so far, cause a conflict among levels of resources and/or performance to be provided versus levels of resources to be consumed. In preparation for the performance of such checks, the processor(s) 2550 may be caused to retrieve, from the one or more data devices 2300, a cluster model 3339 that models various aspects of the observed performance of one or more other computing clusters that employ the same combination of level of hosting service and software routine(s) as have been selected by the customer for the new computing cluster 2777. Thus, in performing such checks, comparisons and/or other analyses based on the cluster model 3339 may be performed to identify instances in which one or more recent choices of configuration settings create a conflict among the configuration settings where specified minimum performance requirement(s) are unable to be met in view of specified maximum resource consumption limit(s) and/or maximum expected resource provision(s).

By way of example, it may be that a specification of a minimum performance level specified by the customer (e.g., a minimum quantity of simultaneous users, a minimum quantity of containers/pods to be provided, a minimum quantity of storage per container/pod, etc.) is used as an input to the cluster model 3339 to derive the corresponding level(s) of consumption of one or more processing, storage, and/or other resources. Then, such level(s) of resource consumption derived from the cluster model 3339 may be compared to a specification of a maximum level of resource consumption specified by the customer, and/or to a maximum level of a resource that is able to be provided by the selected cloud provider at the selected level of hosting service, to determine whether the minimum performance level specified by the customer is able to be met.

By way of another example, it may be that a maximum quantity of simultaneous instances of a selected software routine and/or a maximum quantity of containers/pods able to be supported by a selected software routine is used as an input to the cluster model 3339 to determine what corresponding quantity(ies) of processors, processor cores, computing devices and/or storage is required to support that maximum quantity. Then, such quantity(ies) of processors, processor cores, computing devices, and/or storage may be compared to the quantities of such resource(s) that are able to be provided by the selected cloud provider at the selected level of hosting service to determine whether such a maximum quantity of simultaneous instances and/or such a maximum quantity of containers is able to be supported.

By way of still another example, it may be that the cluster model 3339 is used to determine whether a maximum amount of cost to operate the new computing cluster 2777 per week, per month, per quarter, etc. will be exceeded if the new computing cluster 2777 is configured to meet one or more minimum requirements for performance that may be specified by the customer. Again, and as will be explained in greater detail, the cluster model 3339 may correlate levels of consumption of resources to levels of cost.

Regardless of whether each such check includes such use of the cluster model 3339, if such a check reveals that a specified level of performance is unable to be met due to one or more upper limits on specified level(s) of resources to be provided, then the processor(s) 2550 of the configuration device 2500 may provide the customer with a visual indication of such a conflict between configuration settings. As will be explained in greater detail, it may be that such a visual indication may specify which level(s) of resources consumed and which level(s) of minimum performance are determined by the check to be in conflict. In this way, the customer may be prompted to modify one or more of such conflicting specifications of levels to remove the conflict.

Alternatively or additionally, it may be that such a check is used to reveal a situation in which an amount of one or more resources required to enable the meeting of the specified level(s) of performance has actually been exceeded by the amount of those one or more resources that has been ordered from the cloud provider and/or from the one or more software providers. By way of example, it may be that the amount of storage that is provided at the selected level of hosting service is far greater than what is needed to support the specified upper limit(s) for the quantity of simultaneous users, for the quantity of simultaneously instantiated containers/pods, and/or for the simultaneously provided quantity of licensed instances of a software routine. Again, the processor(s) 2550 of the configuration device 2500 may provide the customer with a visual indication that far more storage than necessary will be provided at the level of hosting service ordered by the customer. Again, in this way, the customer may be prompted to change what level of hosting service has been ordered from the cloud provider, and/or to change the minimum quantity of simultaneous users, simultaneous containers/pods and/or simultaneously provided quantity of licensed instances of the software routine to better utilize the available quantity of storage.

Following the guidance of the customer through various choices of configuration settings, the processor(s) 2550 of the configuration device 2500 may be caused, by further execution of the control routine 2540, to record the configuration settings selected by the customer for the new computing cluster 2777 in a corresponding instance of the settings data 3535. Alternatively or additionally, the processor(s) 2550 may generate one or more instances of the configuration data 3537. As previously discussed, each instance of the configuration data 3537 may include either a configuration script or a configuration data structure that includes configuration settings for the selecting hosting service, and/or for one of the selected software routine(s) for the new computing cluster 2777.

In some embodiments, where at least one of the generated instances of the configuration data 3537 includes a configuration script, the processor(s) 2550 of the configuration device 2500 may at least provide the customer with option of being presented, via the UI, with a view of the configuration script that enables manual editing by the customer. Such an option may be provided to allow a customer to edit such a configuration script to manually introduce one or more customizations into the configuration script. In such embodiments, following such editing, by the customer, of a configuration script of one of the generated instances of the configuration data 3537, it may be that the processor(s) 2550 interpret the now-customized configuration script to retrieve the customized configuration setting(s) that it now includes. The processor(s) 2550 may then perform another check of levels of resources and/or of performance to be provided, versus levels of resources to be consumed, to determine if the customizations introduced by the customer create a conflict among the configuration settings. Where such a conflict between the customizations and one or more of the other configuration settings is identified, the customer may be provided with an indication of which of the customized lines of text in the configuration script specify configuration settings that conflict with other configuration settings, thereby prompting the customer to change one or more of the customizations and/or one or more of the other configuration settings to alleviate the conflict.

Turning to FIG. 16B, following completion of configuration of the new computing cluster 2777, including the generation of, and/or successful customization of, one or more instances of the configuration data 3537, the processor(s) 2550 of the configuration device 2500 may be caused, by further execution of the control routine 2540, to deploy the new computing cluster 2777. Such deployment may commence with the generation of packages 3507 that are each to be provided to one of the multiple node devices 2700 (as in the case of a computing cluster of physical computing devices, as depicted in FIG. 15K), or to one of the multiple VMs 2707 (as in the case of a computing cluster of virtual computing devices, as depicted in FIG. 15L), that are to host the new computing cluster 2777. As those skilled in the art will readily recognize, among the multiple physical computing devices or multiple virtual computing devices that may be used to host a computing cluster, there may be some differences among those devices in the specific software routines that are installed on each device and/or in the configuration of software routine(s) within each device. By way of example, it may be that particular resource allocation routine 3710 to control and/or coordinate various aspects of a computing cluster is installed on just one of the multiple devices, while another particular resource allocation routine 3710 to support the instantiation of the containers and/or pods of that computing cluster may be installed on all of the devices of the multiple devices. Also by way of example, even where identical software is installed on all of the multiple devices hosting a computing cluster, it may be that each device is assigned a different identifier and/or network address for purposes of communications among the multiple devices, and this may result in the software configuration for each device necessarily being at least different enough to assign each device its unique identifier, and/or to provide each device with the unique identifiers of each of the others of the multiple devices.

Thus, in some embodiments, a separate package 3507 may be generated for each node device 2700 that serves as a physical computing device for hosting the new computing cluster 2777, or for each VM 2707 that serves as a virtual computing device for hosting the new computing cluster 2777. Each one of the separate packages 3507 may contain a copy of each software routine that is to be installed within a particular node device 2700 or within a particular VM 2707. Accordingly, as part of generating each package 3507, the configuration device 2500 may retrieve a copy of each of resource allocation routine 3710 and/or of each support routine 3740 that is to be installed on a particular node device 2700 or VM 2707 from the source device(s) 2100*sft* and/or 2100*cld* that are owned and/or operated by corresponding one(s) of the selected software providers and/or the selected cloud provider. In addition to such software routine(s), each one of the separate packages 3507 may also contain one or more instances of configuration data 3537 needed to configure the portion of the selected level of hosting service to be provided by a particular node device 2700 or VM 2707, and/or to configure each of the software routine(s) to be installed within that particular node device 2700 or VM 2707.

In some embodiments, in addition to the software routine(s) licensed from the one or more software providers, each package 3507 may additionally include a copy of a collection routine 3770. Thus, as part of generating each package 3507, the configuration device 2500 may also retrieve a copy of one or more versions of a collection routine 3770 from the one or more source devices 2300 for inclusion within the packages 3507. It should be noted that there may be different versions of a collection routine 3770 to accommodate different processors, different operating systems, and/or other differences among the node devices 2700, and/or among the VMs 2707.

Following the generation of the package(s) 3507 for the new computing cluster 2777, the configuration device 2500 may then transmit each of the package(s) 3507 to its corresponding node device 2700 or VM 2707.

Turning to FIG. 16C, with the new computing cluster 2777 having been deployed, operation of the new computing cluster 2777 may begin. Upon commencement of operation of the new computing cluster 2777, the copies of the collection routine 3770 installed within each node device 2700, or within each VM 2707, may monitor aspects of the operation of the portion of the new computing cluster 2777 within individual ones of the node devices 2700, or within individual ones of the VMs 2707, respectively. Each copy of the collection routine 3770 may transmit indications of the observed aspects of the operation of each such portion of the new computing cluster 2777 to the one or more data device(s) 2300. Within the data device(s) 2300, for each computing cluster (including the new computing cluster 2777), the received observations may be assembled to form an instance of the observation data 3739 as part of buffering such observations for up to a preselected span of time (e.g., one or more weeks, one or more months, etc.).

In some embodiments, it may be that the configuration device 2500 retrieves a portion of the instance of the observation data 3739 that contains observations of the operation of the new computing cluster 2777 for analysis. Such retrievals may occur on a relatively frequent interval of time (e.g., one or more minutes, one or more hours, etc.).

Along with such portions of the observation data 3739, the configuration device 2500 may also retrieve the instance of the settings data 3535 that contains a record of the configuration settings for the new computing cluster 2777, and/or the cluster model 3339 that was last used in performing some of the aforedescribed checks during configuration of the new computing cluster 2777.

The analyses performed by the configuration device 2500 of the retrieved portions of the observation data 3739 associated with the new computing cluster 2777 may include, by way of example, comparisons of observed levels of performance (e.g., quantity of simultaneously instantiated containers and/or pods, quantity of simultaneous users accommodated, quantity of instances of a particular software routine simultaneously provided, etc.) to the specified minimum levels of performance, and/or comparisons of observed levels of resource consumption (e.g., amounts of storage resources actually used within each node device 2700 or VM 2707, quantity of processors and/or processor cores actually used, etc.) to the specified maximum levels of resource consumption. Alternatively or additionally, it may be that one or more of the observed levels of performance and/or of resource consumption is used as an input to the cluster model 3339 last used in the configuration of the new computing cluster 2777 to derive one or more other levels of performance and/or of resource consumption that may then also be compared to specified minimum and/or maximum levels.

Among the configuration settings recorded within the instance of settings data 3535 for the new computing cluster 2777, there may be specifications of various events where the customer is to be informed that one or more aspects of the new computing cluster 2777 may not be functioning properly. Among such specified events may be instances of a level of performance failing to meet a specified minimum level, instances of a level of performance decreasing to within a specified degree of a specified minimum level, instances of a level of resource consumption exceeding a specified maximum level, and/or instances of a level of resource consumption increasing to within a specified degree of a specified maximum level. Also among the configuration settings may be specified selections of what personnel are to be provided with notices of such events and/or by what form of communication.

In some embodiments, it may be that the receipt of such notices concerning such specified events causes the customer to interact with the configuration device 2500 (either directly, or through a UI device 2900, as depicted) to be provided with a view of observed aspects of the operation of the new computing cluster 2777 that are associated with the event(s) about which they were provided notice. As will be discussed in greater detail, the customer may be presented with various graphs of levels of performance and/or resource consumption over a span of time that includes the time(s) at which such event(s) occurred. Alternatively or additionally, it may be that the customer is presented with indications of which configuration setting(s), and/or what customization(s) made by the customer, are in some way associated with such event(s). In this way, the customer may be prompted to at least consider making configuration changes to prevent reoccurrences.

In some embodiments, it may be that portions of the observation data 3739 concerning the new computing cluster 2777 are used by the configuration device 2500 to update or replace the cluster model 3339 that was last used in configuring the new computing cluster 2777. Such updating and/or replacement may be triggered by instances of one or more observed levels of performance and/or observed resource consumption varying from what was predicted or would be predicted by the cluster model 3339 by at least a preselected degree. As will be explained in greater detail, where the cluster model 3339 is meant to be representative of the operation of multiple computing clusters, then the cluster model 3339 may be updated to take into account observations made of the new computing cluster 2777. Alternatively, where the cluster model 3339 is representative of observations of a single other computing cluster, and was used in the initial configuration of the new computing cluster 2777 due to similarities between the other computing cluster and the new computing cluster 2777 (e.g., employing identical combinations of level of hosting service and software routine(s)), then the observations of the operation of the new computing cluster 2777 may be used to generate an entirely new cluster model 3339 that reflects the observations of just the new computing cluster 2777.

In some of such embodiments in which the cluster model 3339 last used in configuring the new computing cluster 2777 is either updated or replaced, it may be that such updating or replacement triggers the configuration device 2500 to transmit a notice to the customer that recommends that the configuration of the new computing cluster 2777 be repeated. This may provide a mechanism by which at least various ones of the checks of the configuration settings for the new computing cluster 2777 are repeated using the now updated or replaced cluster model 3339 to determine whether one or more of those configuration settings should be changed such that the new computing cluster 2777 needs to be redeployed to be given the benefit of improved configuration settings.

Figure 17A:
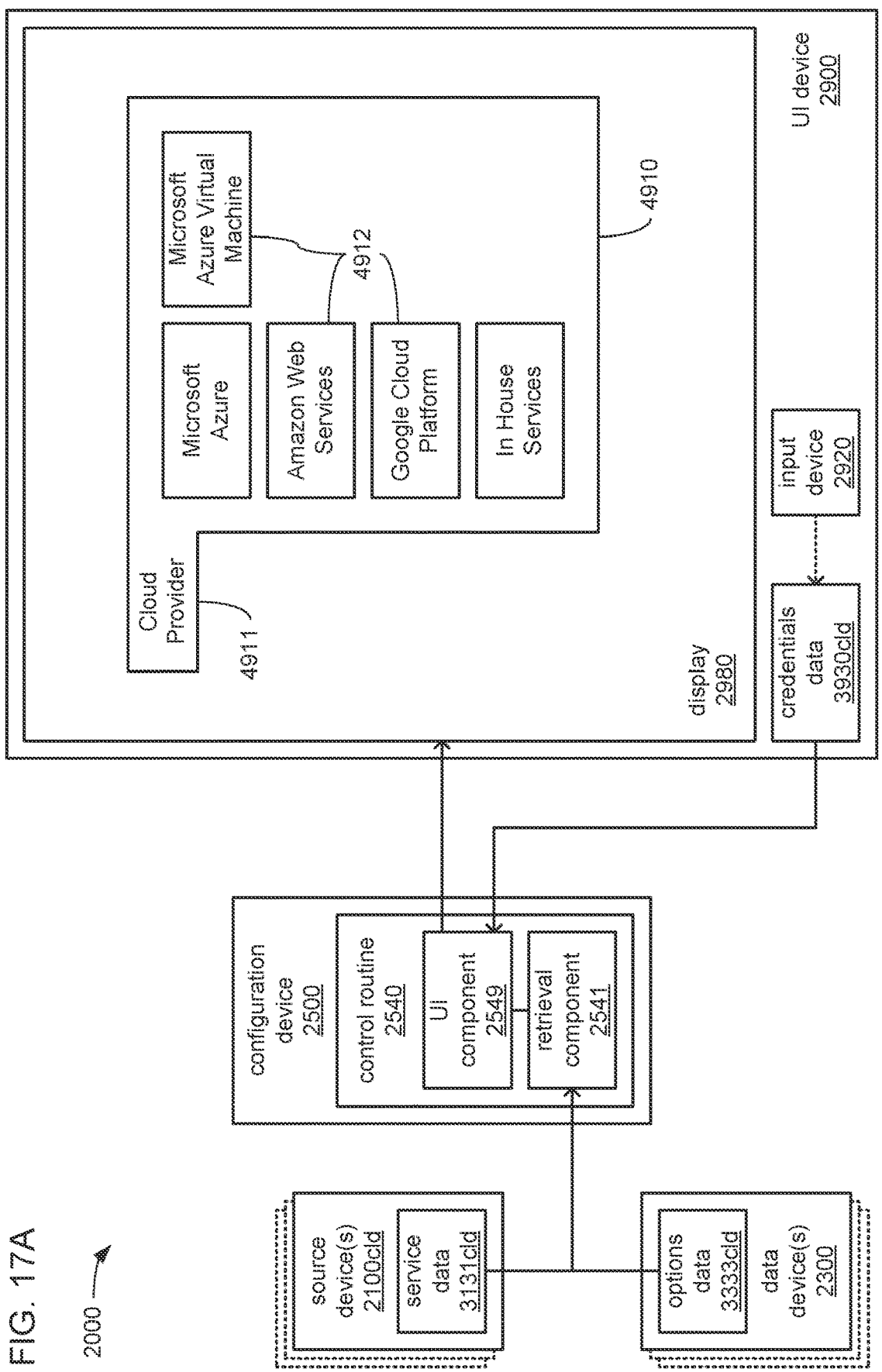
Figure 17B:
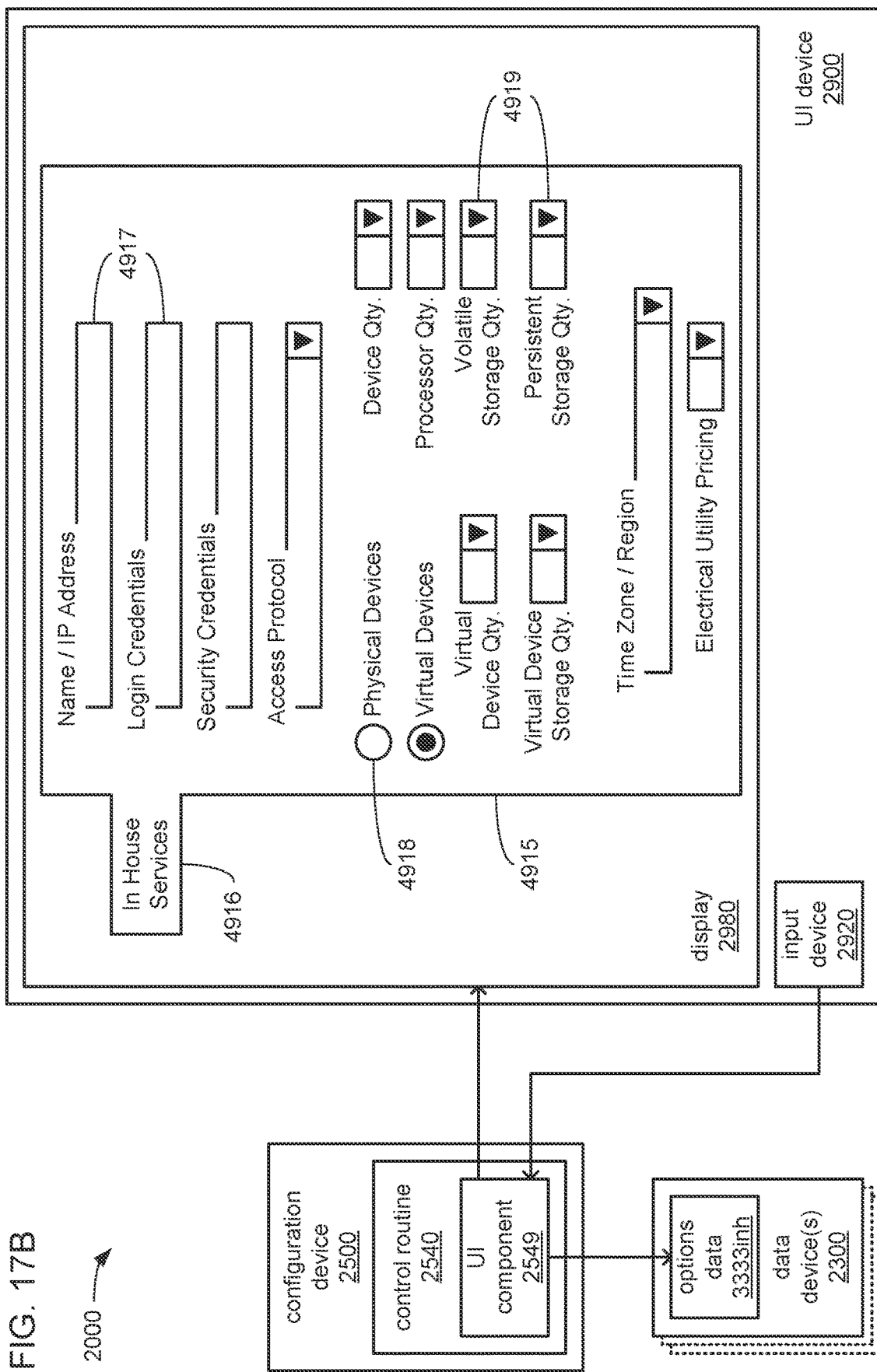
Figure 17C:
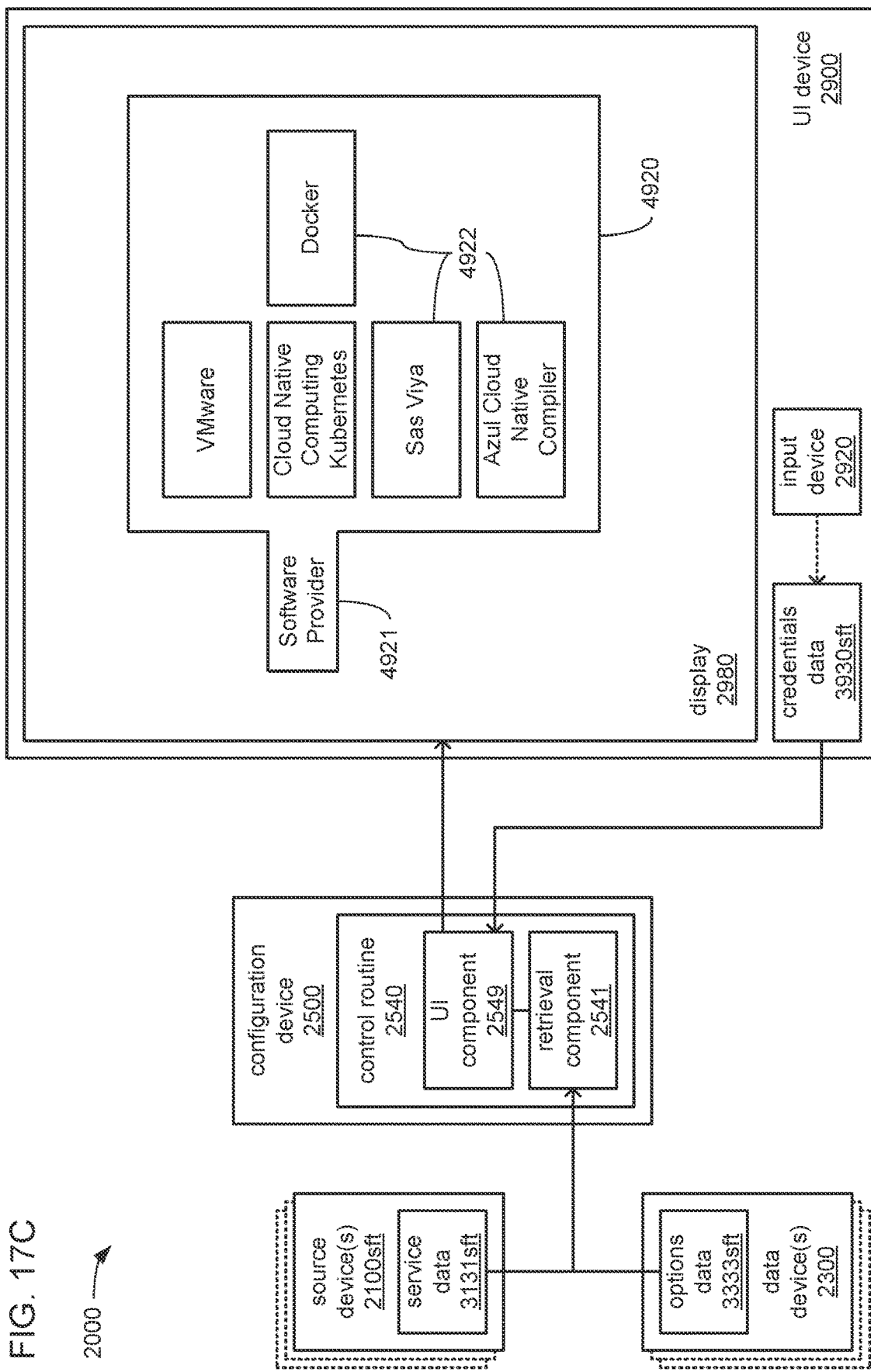
Figure 17D:
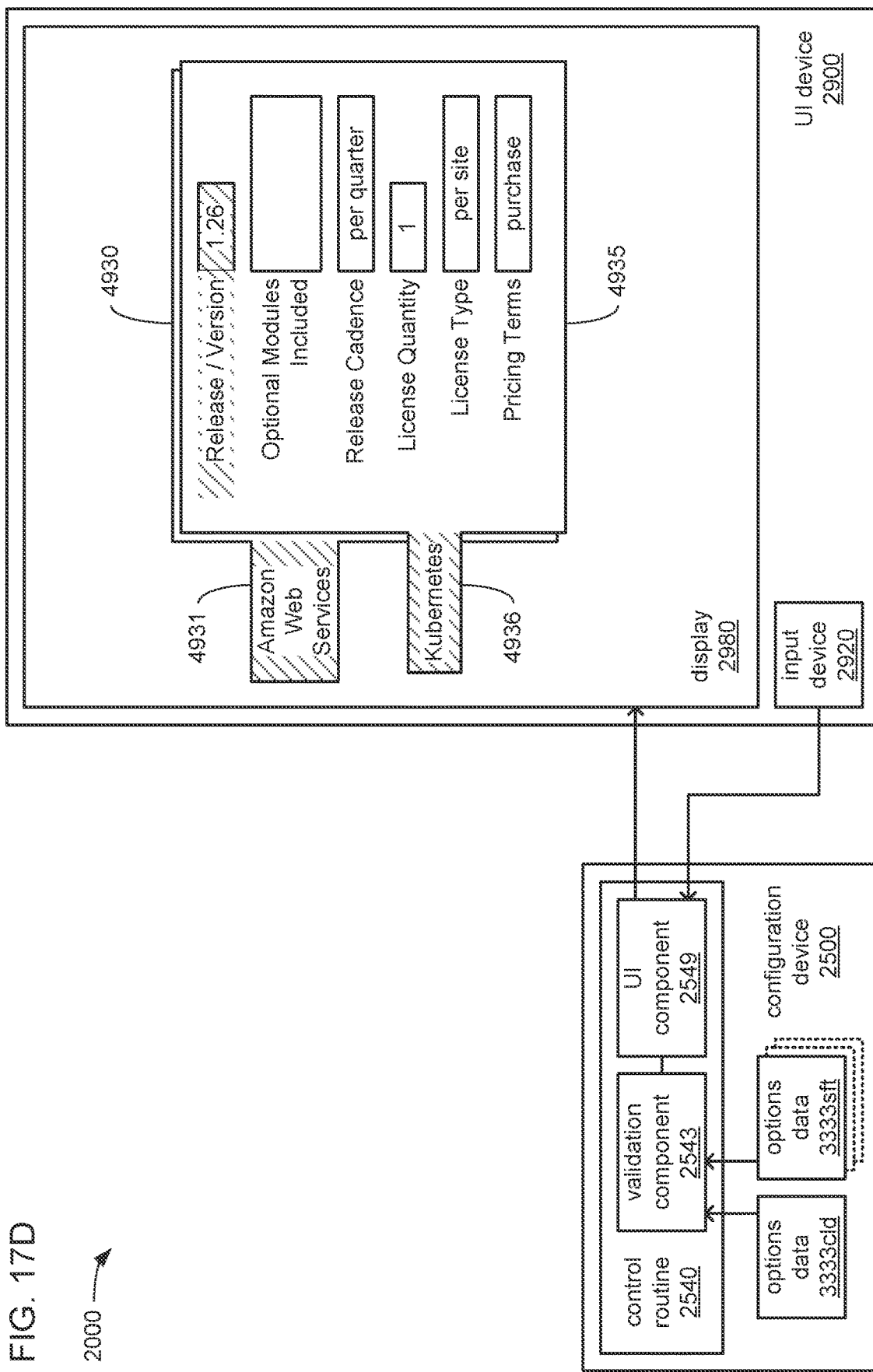
Figure 17E:
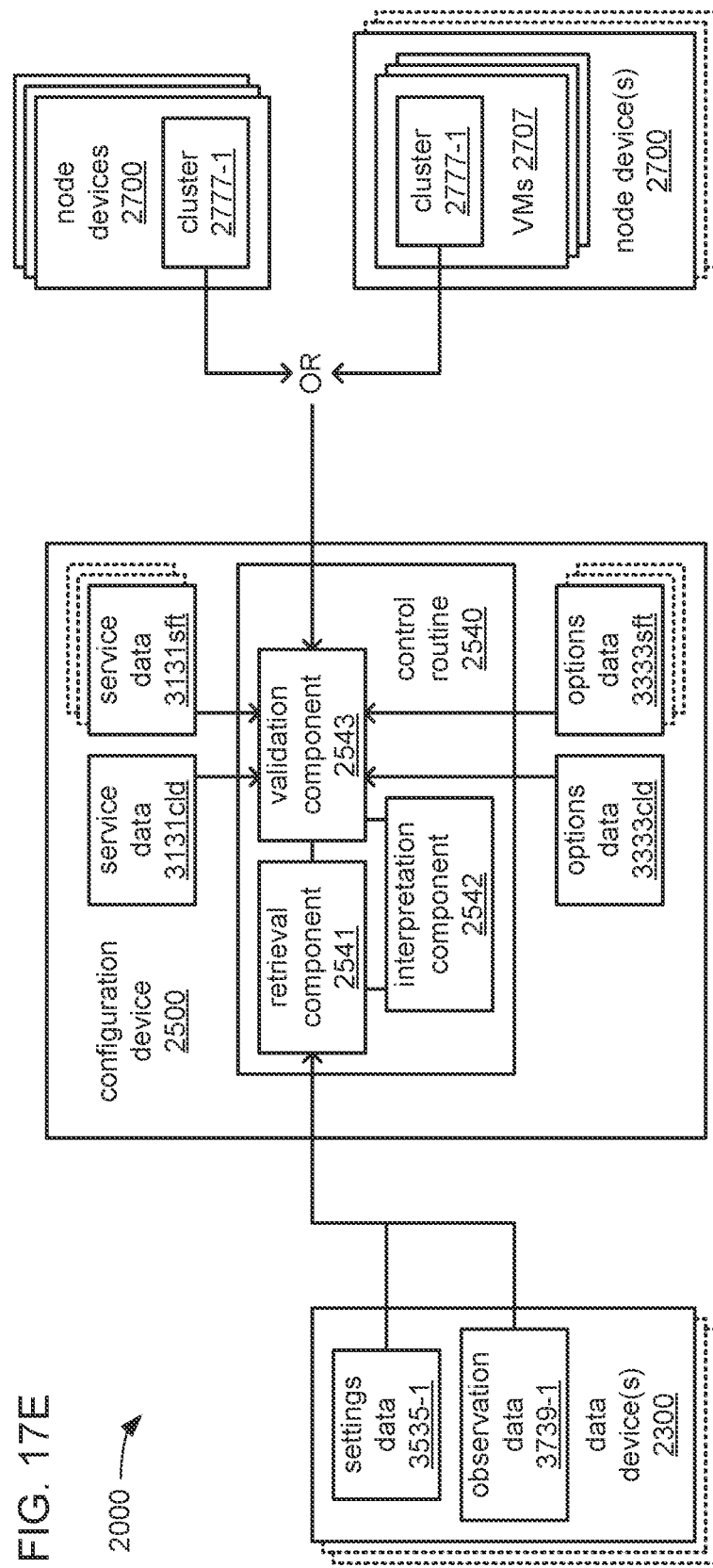
Figure 17F:
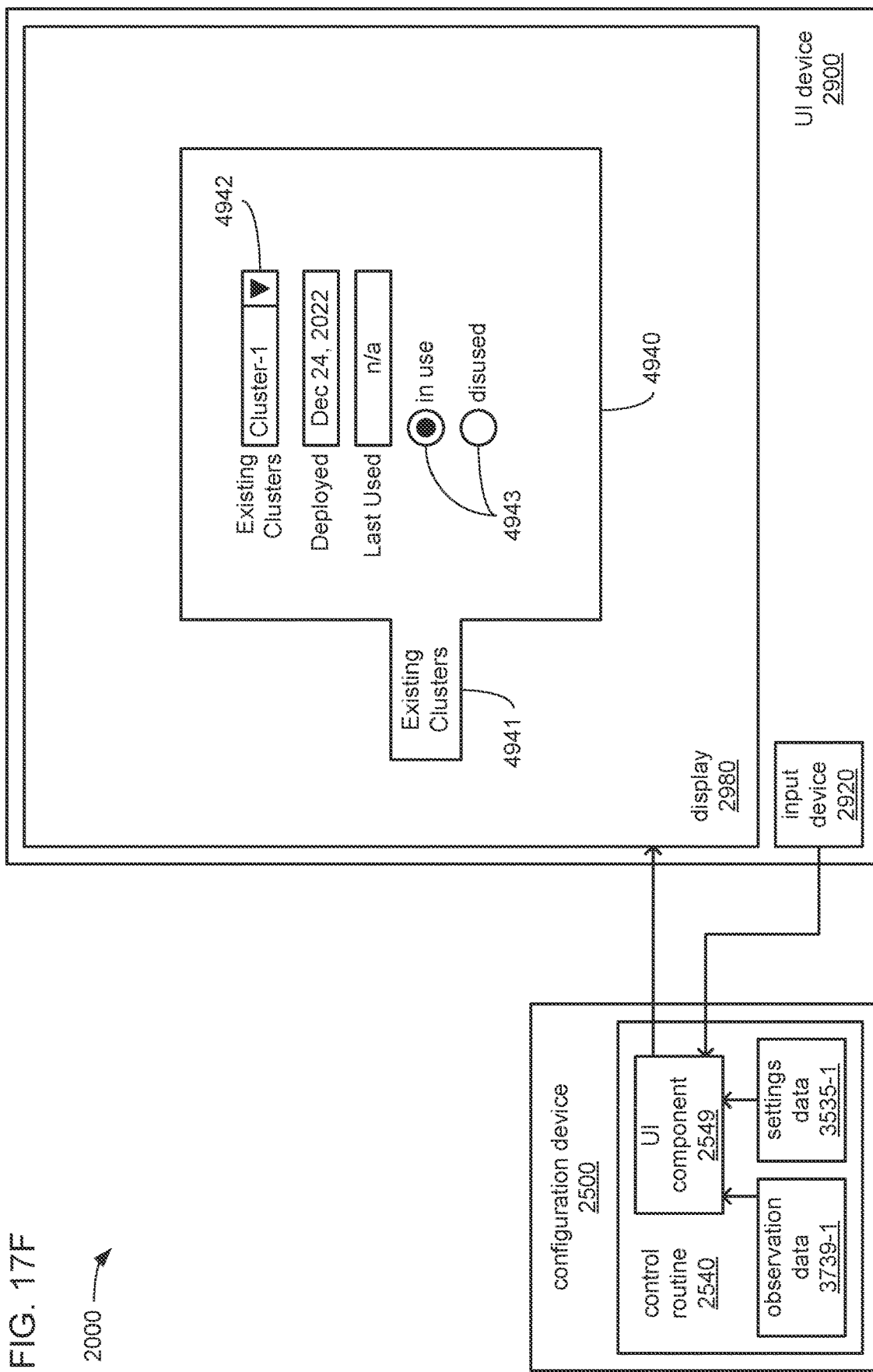
Figure 17G:
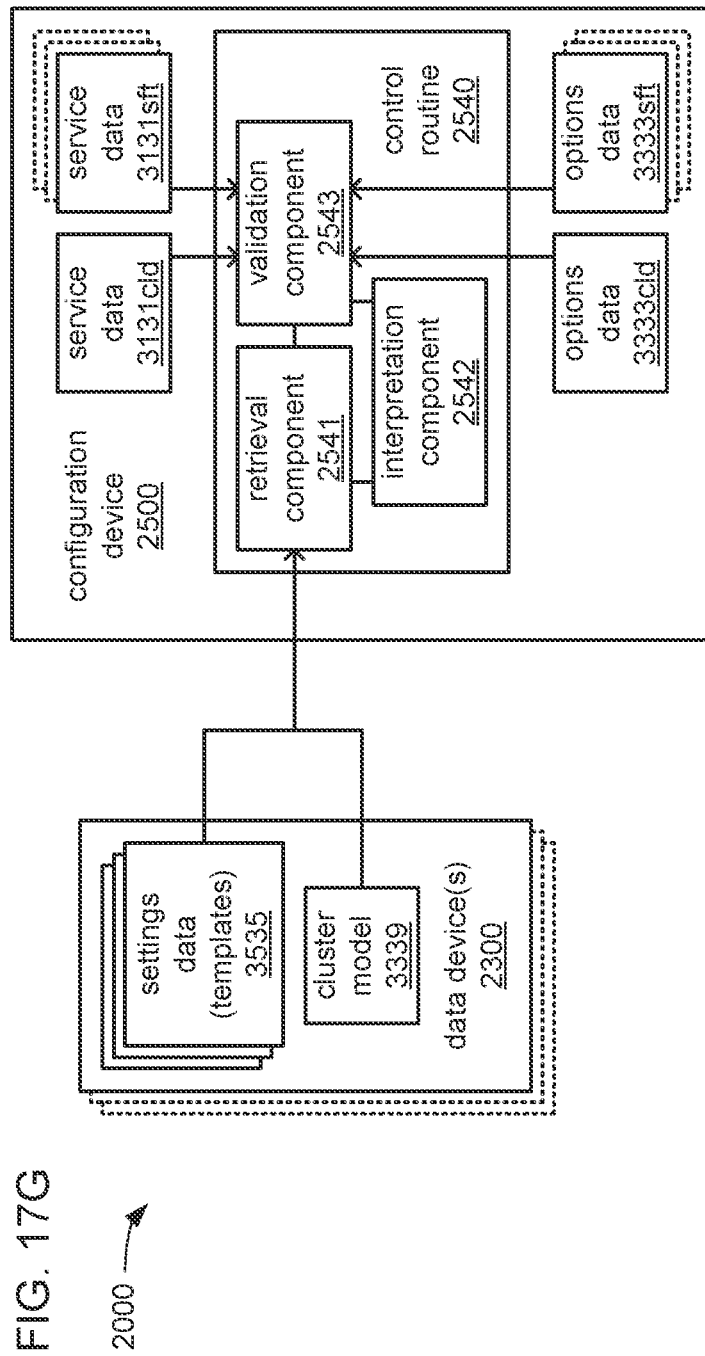
Figure 171:
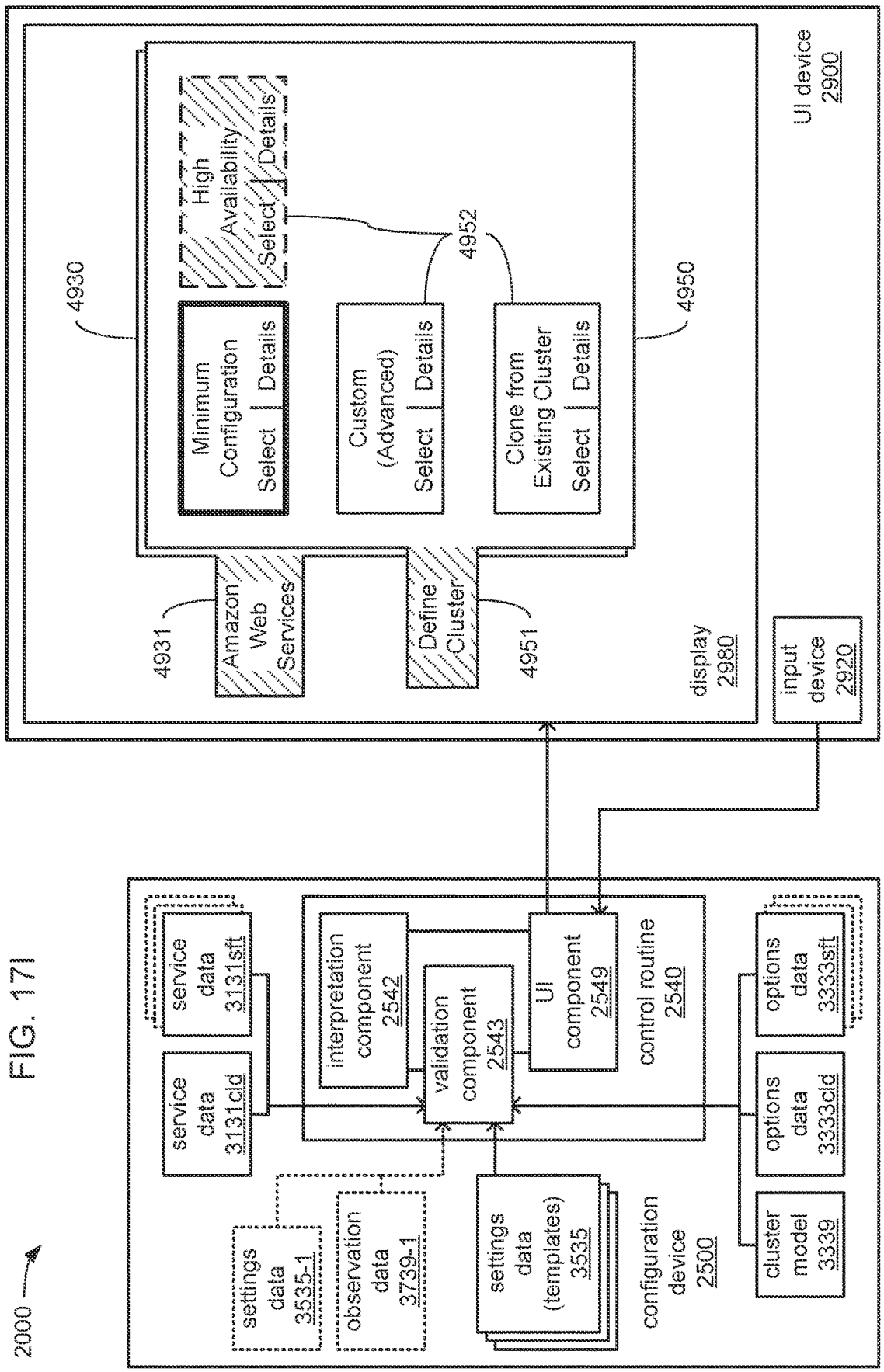
Figure 17J:
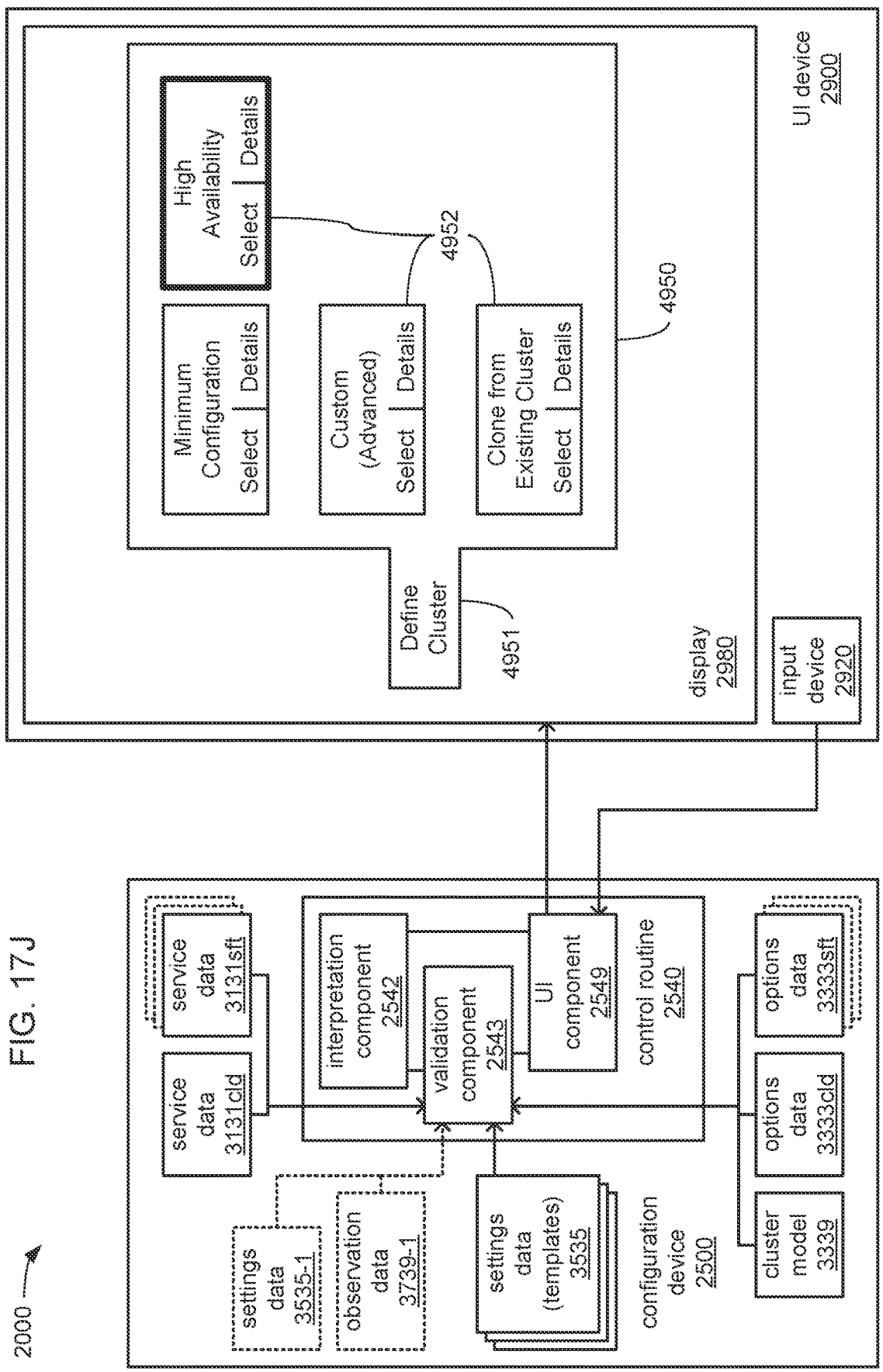
Figure 17K:
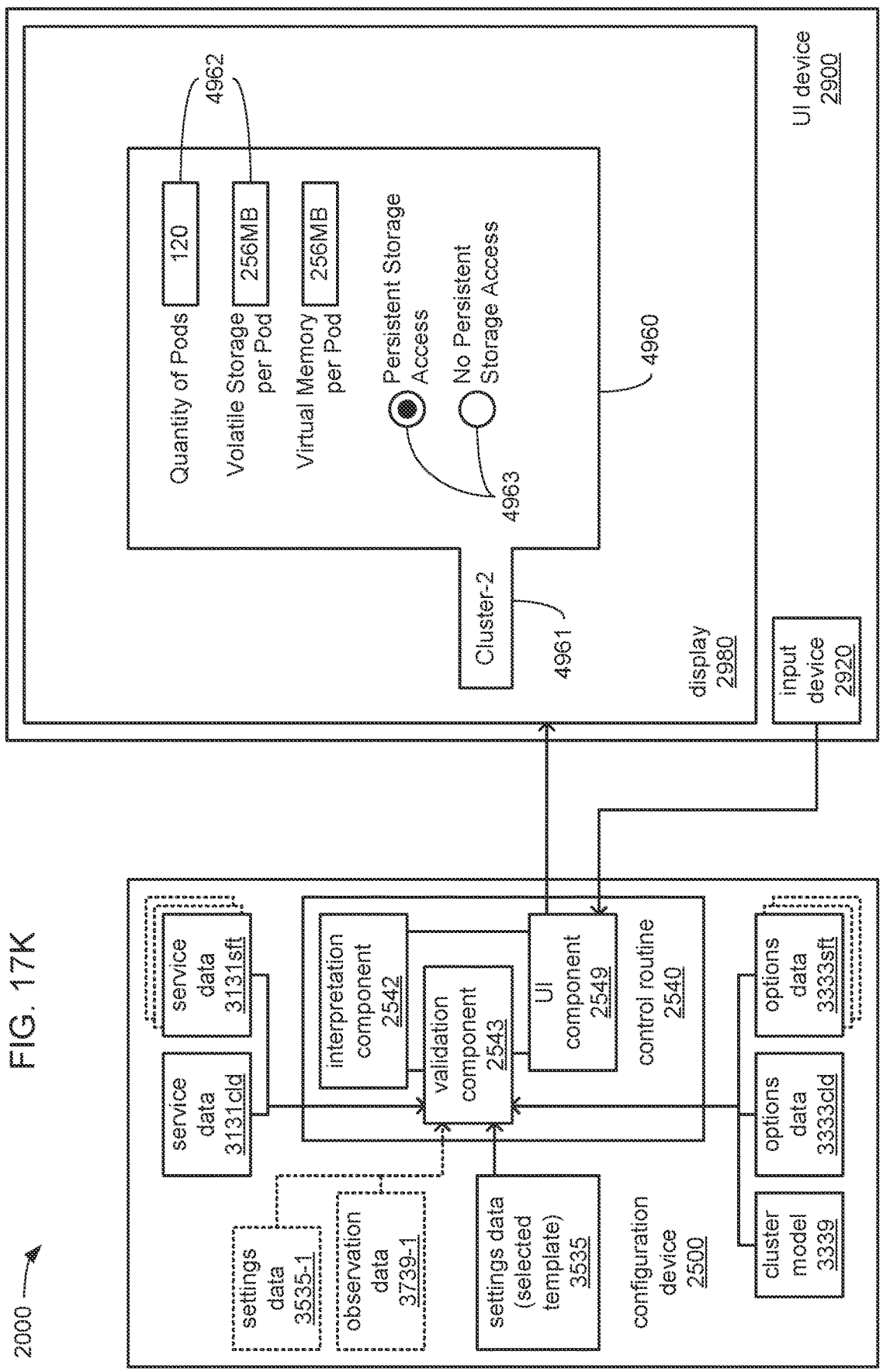
Figure 17L:
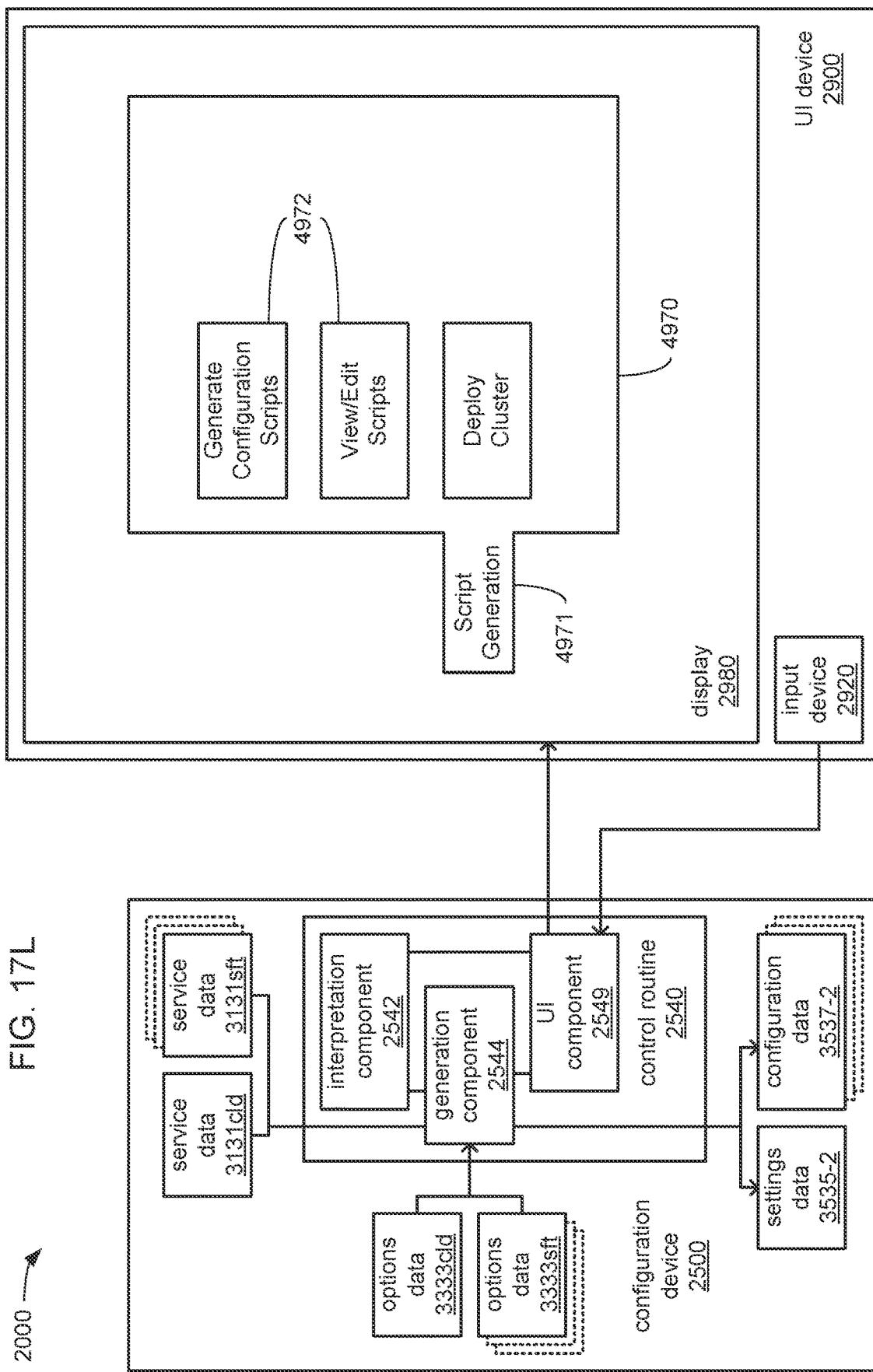
Figure 17M:
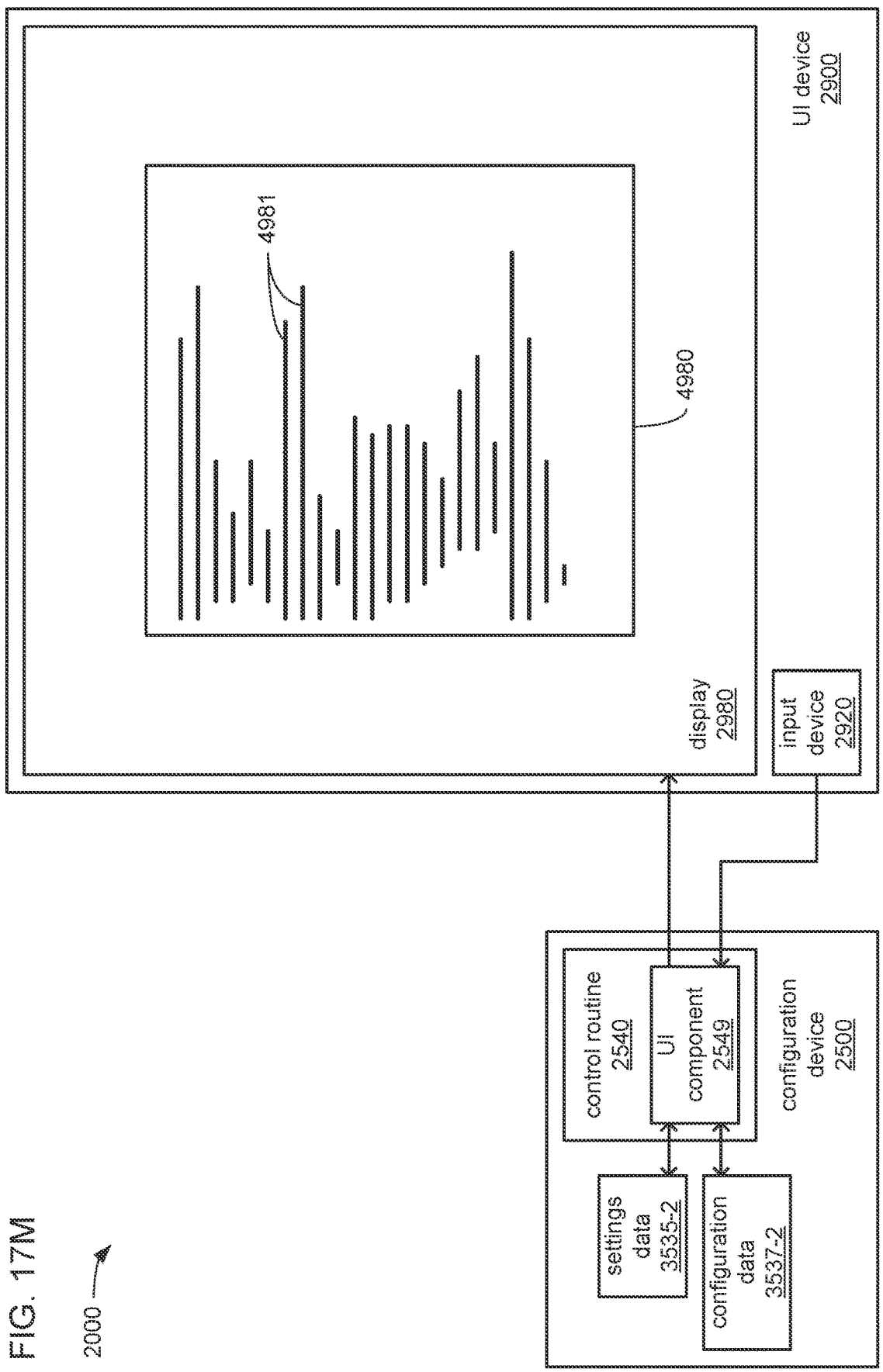
Figure 17N:
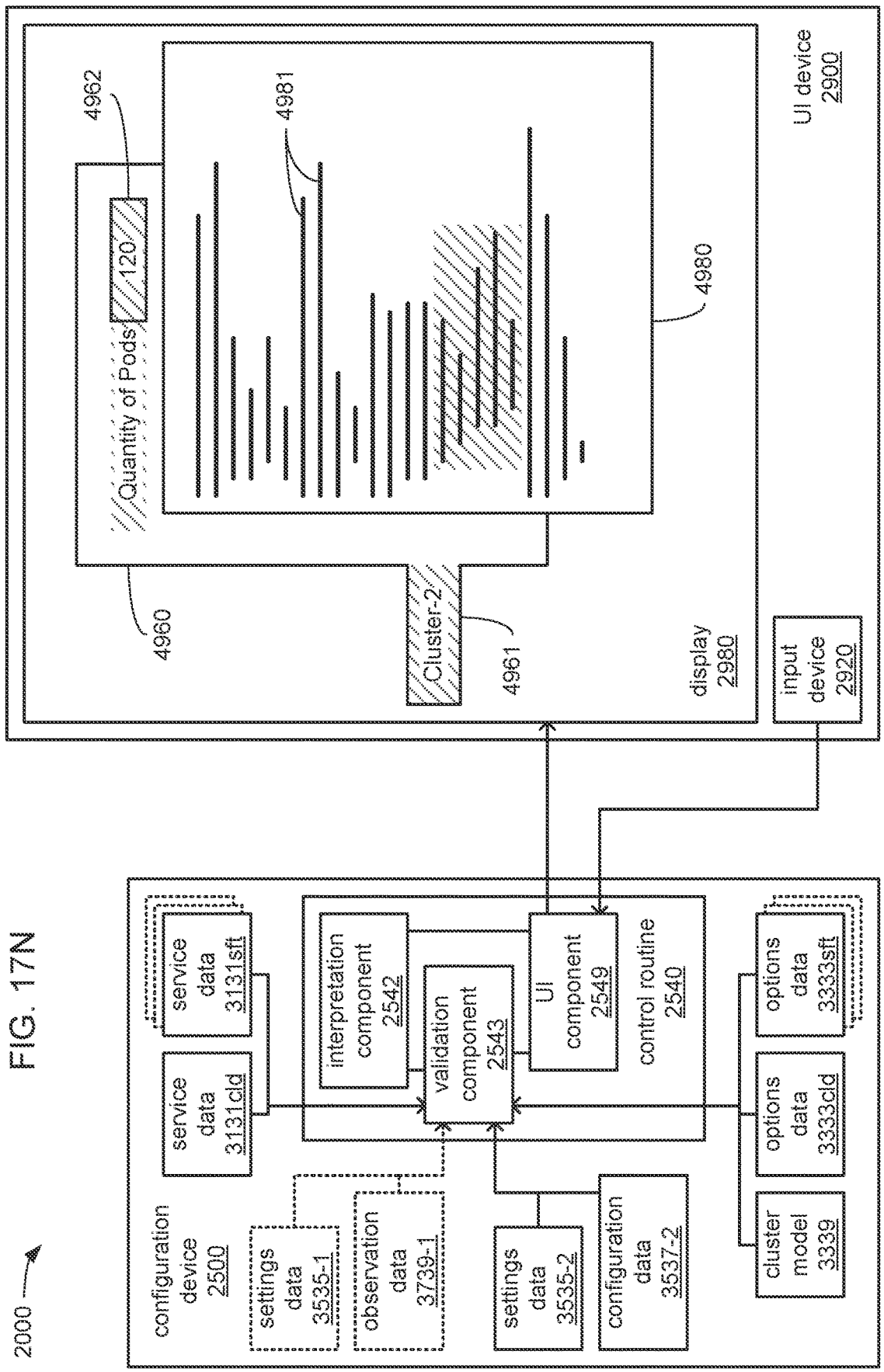

FIGS. 17A through 17N, taken together, set forth a more detailed presentation of aspects of an example of configuring and provisioning of a new computing cluster than was presented above in reference to FIG. 16A. It should be noted that, despite the presentation of a greater degree of detail, numerous aspects of this presented example are deliberately simplified for sake of ease of understanding.

By way of example, throughout FIGS. 17A-N, there are multiple depictions of portions of a visually presented UI that includes various menus for configuring aspects of a computing cluster, selectable menu items for use in selecting various configuration settings, and/or locations within menus at which information for a configuration setting may be manually entered. Such depictions of such menus are intended to be illustrative of an example of various types of information that a customer may be guided through providing via such a UI, and should not be taken as limiting what is depicted, described and/or claimed herein to just the specific examples of content within these particular example menus, and/or to just the specific order of visual presentation of these particular example menus. Indeed, it is envisioned that, as network communications technologies, computing cluster architectures, approaches to hosting computing clusters, etc. continue to evolve over time, the specific content of the menus of such a UI, and/or their order of being visually presented, will also evolve over time.

It should also be noted that, for purposes of this deliberately simplified example, it is presumed that a customer seeking to configure and deploy a new computing cluster is interacting remotely with the UI generated by the control device 2500, and remotely provided via the display 2980 and input device 2520 of one of the UI devices 2900. Again, in at least some embodiments, and as an alternative to such remote interaction with the control device 2500, the customer may interact more directly with such a UI generated by the control device 2500 through the display 2580 and input device 2520 of the control device 2500, itself.

Turning to FIGS. 17A through 17C, a customer may be remotely guided through providing information concerning earlier selections, by the customer, of providers of a hosting service and/or of one or more software routines for a new computing cluster. It should be noted that, for sake of clarity of presentation and ease of understanding, in this deliberately simplified example, the cloud provider of the hosting service for the new computing cluster, and the software provider(s) of the one or more software routines for the new computing cluster, are separate entities. However, as those skilled in the art will readily recognize, it is not uncommon for a cloud provider of hosting services to also serve in the role of a software provider for at least a subset of the software routine(s) that may be selected for a computing cluster. Thus, it may be that, under other circumstances than are presented here in this example, a customer may have selected a cloud provider that provides both the hosting service and the entire set of software selected by the customer for a particular computing cluster such that no other separate software provider of software is used.

Turning more specifically to FIG. 17A, as depicted, the control routine 2540 executed within the control device 2500 may include a UI component 2549 to generate portions of a user interface by which the customer is guided through making various choices for configuration settings for the new computing cluster. As also depicted, the control routine 2540 may also include a retrieval component 2541 to interact, through the network 2999, with other devices to retrieve data and/or software routines therefrom.

As a result of the execution of the control routine 2540 within the control device 2500, the UI routine 2549 may generate a menu 4910 for being visually presented on the display 2980 of the depicted UI device 2900 as part of enabling the customer to indicate what cloud provider has been selected by the customer to provide the hosting service for the new computing cluster. As depicted, various regions within the menu 4910 are defined to serve as buttons 4912 that are selectable by the customer through use of the input device 2920 of the depicted UI device 2900. Further, each button 4912 is labeled with text specifying a different one of multiple cloud providers and/or types of hosting service. As will be familiar to those skilled in the art, the particular cloud providers that are depicted in this example are a sampling of multiple cloud providers that are currently well known and widely used in the hosting service industry, and this visual depiction of these particular cloud providers should not be taken as limiting.

As also depicted, the menu 4910, as well as other menus that are subsequently depicted herein in later figures in this example, may employ a visual metaphor of a virtual book in which each menu is presented as if it were a page in that virtual book that has been provided with a tab along a page edge, such as the depicted example tab 4911 that carries the label "Cloud Provider" thereon for the menu 4910. As will be familiar to those skilled in the art, a set of such tabs may be presented along the edge of such a virtual book as part of providing an index to the pages thereof, and also as part of providing a mechanism by which an input device may be used to select a particular page as part of navigating between pages within such a virtual book. It should be noted that, for sake of ease of understanding, and to reduce visual clutter, none of the figures herein provide a depiction of all of such tabs of the virtual book of this example together within a single figure.

It should also be noted that this depiction of use of such a virtual book metaphor is intended to provide an example of one approach that may be employed to presenting a set of menus (including the menu 4910) that allows navigation thereamong. As will be familiar to those skilled in the art, numerous other well known approaches exist for visually presenting a set of menus in a manner that also provides a mechanism for navigating thereamong, including and not limited to: sets of tabs along other edges and/or along multiple edges of such pages; drop-down menus able to be caused to appear (e.g., caused to "pop up") in response to operation of an input device; a tree-like hierarchical relationship among menus that enables selection of particular menus by moving in various ways within the tree structure (e.g., with selectable buttons allowing movement "up" and/or "down" through branching levels); scrolling horizontally and/or vertically to adjacent menus; etc. Thus, the presentation herein of a set of menus within such a virtual book metaphor with tabbed pages for navigation thereamong should not be taken as limiting In response to the prompting, by the menu 4910, to indicate which cloud provider has been selected by the customer to host the new computing cluster, the customer may operate the input device 2920 to select one of the buttons 4912 to specify the selected cloud provider. In response to receiving an indication of the selected cloud provider, the UI component 2549 may then cause a popup menu or other subsidiary menu (not shown) to appear on the display 2980 that requests the provision of the access credentials (e.g., account name and/or identifier) and/or the security credentials (e.g., password) required to access the customer's account with the selected cloud provider to obtain information concerning the level of hosting service that was ordered by the customer. In response to such a subsidiary menu, the customer may employ the input device 2920 to manually provide such credentials (i.e., the depicted credentials data 3930*cld*).

Upon being provided with the prompted-for credentials data 3930*cld*, the retrieval component 2541 may use the access credentials and/or security credentials thereof to access the one of the source device(s) 2100*cld* associated with the selected cloud provider to retrieve the corresponding instance of the service data 3131*cld*. As previously discussed, the service data 3131*cld* may include information from the selected cloud provider about the level of hosting service ordered by the customer, various details of the levels of resources (e.g., quantities of various hardware resources) that are provided at the level of hosting service ordered by the customer, and/or indications of the pricing of the level of hosting service ordered by the customer. As also previously discussed, the information provided in each instance of the service data 3131*cld* that may be retrieved from a particular source device 2100*cld* may be formatted, encoded and/or organized in any of a variety of ways that may be unique to the cloud provider associated with that particular source device 2100*cld*.

With the instance of the services data 3131*cld* associated with the selected cloud provider having been retrieved, the retrieval component 2541 may use at least the identity of the cloud provider to search for and retrieve a corresponding instance of the options data 3333*cld*. As previously discussed, the options data 3333*cld* may include additional information concerning the selected cloud provider and/or the selected level of hosting service ordered therefrom that may not be included in the corresponding instance of the service data 3131*cld*. Additionally, the retrieved instance of the options data 3333*cld* may include information concerning the formatting, encoding and/or organization of data within the retrieved instance of the services data $3131cld$ to enable the interpretation of that data.

Turning to FIG. 17B, as an alternative to ordering hosting service from a cloud provider, it may be that the customer has chosen to use physical and/or virtual computing devices that are owned and/or operated by the customer to host the new computing cluster. Thus, it may be that the button 4912 labeled "In House Services" within the menu 4910 is selected by the customer. In response, the UI component 2549 may generate and cause the visual presentation of the depicted menu 4915 on the display 2980 to prompt the customer to manually enter various pieces of information concerning such in-house hosting.

Such entered information may include, and are not limited to: access and/or security credentials to enable communications with the one or more hosting computing devices; whether the new computing cluster will be hosted using multiple physical computing devices or multiple VMs, as well as the quantity used to do so; amount(s) of volatile, persistent and/or virtual storage to be provided by each physical or virtual device; time zone and/or other location information of the hosting computing devices; and/or pricing for the electrical utility to be used for such hosting. Upon being provided with such information concerning the in-house hosting of the new computing cluster, such information may be stored within the one or more data devices 2300 for future reference as an instance of options data $3333inh$.

Turning to FIG. 17C, in a manner similar to what was depicted and discussed in reference to FIG. 17A, a menu 4920 may be generated by the UI component 2549 and presented on the display 2980 to prompt the customer to similarly indicate a software provider selected by the customer to provide one or more software routines (e.g., one or more resource allocation routines 3710, and/or one or more support routines 3740) for the new computing cluster. The menu 4920 is accompanied by a tab 4921, and includes a set of buttons 4922 that are each labeled with text specifying a software provider and/or a particular software routine offered by a software provider. As will be familiar to those skilled in the art, the particular software providers and/or software routines that are depicted in this example are a sampling of multiple software providers and/or software routines that are currently well known and widely used in creating, operating, supporting and/or maintaining computing clusters of physical and/or virtual computing devices, and this visual depiction of these particular software providers and/or software routines should not be taken as limiting.

Also in a manner similar to what was depicted and discussed in reference to FIG. 17A, in response to receiving an indication of a selected software provider (via the selection of one of the depicted buttons 4922), the UI component may then cause a popup menu or other subsidiary menu (not shown) to appear on the display 2980 that requests the provision of the access credentials (e.g., account name and/or identifier) and/or security credentials (e.g., password) required to access the customer's account with the selected software provider to obtain information concerning the particular software routine(s) ordered by the customer from that software provider, including various licensing details. In response to such a subsidiary menu, the customer may employ the input device 2920 to manually provide such credentials (i.e., the depicted credentials data $3930sft$).

Upon being provided with the prompted-for credentials data $3930sft$, the retrieval component 2541 may use the access credentials and/or security credentials thereof to access the one of the source device(s) $2100sft$ associated with the selected software provider to retrieve the corresponding instance of the service data $3131sft$. As previously discussed, the service data $3131sft$ may include information from the selected software provider about the particular software routine(s) that the customer has selected to license from the selected software provider, details concerning the quantity of instances of each software routine that are permitted to be executed simultaneously (e.g., whether based on a maximum quantity of users, a maximum quantity of physical and/or virtual devices, a maximum quantity of processors and/or processor cores, etc.), and/or indications of the pricing for the licensing of each software routine. As also previously discussed, the information provided in each instance of the service data $3131sft$ that may be retrieved from a particular source device $2100sft$ may be formatted, encoded and/or organized in any of a variety of ways that may be unique to the software provider associated with that particular source device $2100sft$.

Additionally in a manner similar to what was depicted and discussed in reference to FIG. 17A, with the instance of the services data $3131sft$ associated with the selected software provider having been retrieved, the retrieval component 2541 may use at least the identity of the software provider to search for and retrieve a corresponding instance of the options data $3333sft$. As previously discussed, the options data $3333sft$ may include additional information concerning the selected software provider and/or the selected licensing of each software routine ordered therefrom that may not be included in the corresponding instance of the service data $3131sft$. Additionally, the retrieved instance of the options data $3333sft$ may include information concerning the formatting, encoding and/or organization of data within the retrieved instance of the services data $3131sft$ to enable the interpretation of that data.

It should be noted that, depending on at least the intended purposes of the new computing cluster, the customer may choose to license more than one software routine from more than one software provider. Thus, in some embodiments, it may be that the customer is caused to interact with the menu 4920 more than once to specify more than one software provider from which the customer has licensed software.

Alternatively, and as previously discussed, it may be that the selected cloud provider also serves in the role of a software provider such that the customer may obtain some or all of the selected software routines that the customer chooses to license for the new computing cluster from the cloud provider. Thus, in some embodiments, it may be that specifying the cloud provider in the menu 4910 results in the retrieval of information concerning both the hosting service that the customer ordered and all software routines that the customer licensed, and accordingly, there is no need to specify a separate software provider in the menu 4920.

Turning to FIG. 17D, as depicted, the control routine 2540 executed within the control device 2500 may include a validation component 2543 to perform one or more checks of various aspects of the combination of selected level of hosting service and selected software routines in conjunction with various configuration settings for the new computing cluster. As previously discussed, it may be that the instances of options data $3333cld$ and/or $3333sft$ include indications of known incompatibilities and/or known affinities between particular combinations of hosting service and particular software routines, and/or among particular combinations of software routines. Alternatively or additionally, it may be that the instances of options data $3333cld$ and/or $3333sft$ include indications of particular configuration settings that should be used and/or configuration settings that should not be used with such particular combinations.

Following the retrieval of the instances of the options data 3333*cld* and 3333*sft* associated with the selected hosting service and selected software routine(s), the validation component 2543 may use such information concerning incompatibilities, affinities, and/or configuration settings that should and/or should not be used to perform an interoperability check to determine whether the particular combination of hosting service and software routines selected by the customer is able to be used together for the new computing cluster. As depicted, if such an interoperability check reveals an incompatibility or other issue that prevents a selected software routine from being used with the selected level of hosting service or with another selected software routine, then the UI component 2549 may generate a visual indication of the fact of such an incompatibility or other issue for presentation on the display 2980.

In the depicted example of such a visual indication, it may be that a combination of Amazon Web Services as the selected cloud provider for the selected level of hosting service and a particular version of Kubernetes selected as a software routine for resource allocation for the new computing cluster are known to be in some way incompatible with each other (it should be noted that this is an entirely fictitious incompatibility situation that is presented here solely as an example for illustrative purposes—no such real incompatibility situation is actually known to exist). As will be familiar to those skilled in the art, there are numerous well known approaches to providing a visual warning indication. FIG. 17D presents an example in which two different pages in the virtual book metaphor that each include a configuration setting or detail that is pertinent to the example incompatibility or issue are depicted with one overlying the other with various forms of highlighting employed to visually draw attention to the incompatibility or other issue.

More specifically, a menu 4930 associated with aspects of Amazon Web Services (as indicated by the associated tab 4931) is overlain by a menu 4935 associated with aspects of the Kubernetes resource allocation software (as indicated by the associated tab 4935). As further depicted, the indication of the "Release/Version" of "1.26" of Kubernetes is highlighted with a particular color or other form of shading to draw attention thereto. As still further depicted, the tabs 4931 and 4936 are also both highlighted with a particular color or other form of shading to draw attention thereto. This depicted combination of highlighting may serve to provide a visual indication that the "1.26" release or version of Kubernetes is subject to an incompatibility or other issue with the selected level of hosting service ordered from Amazon Web Services, and that further details of this incompatibility or other issue may be revealed by selecting the tab 4931 to cause the menu 4935 to become overlain by the menu 4930. In this way, the customer may be visually guided to one or more particular configuration aspects that may present an issue, such as an incompatibility of a particular release or version of Kubernetes with particular level of hosting service, thereby providing a visual prompt for the customer to consider changing the release or version of Kubernetes to be used and/or changing the level or other aspect of the Amazon Web Services that may be similarly highlighted within the menu 4930 (not fully shown).

In this way, the customer may be provided with a relatively quick indication of issues that may arise from the selected combination of selected hosting service and selected software routine(s) that may necessitate a change in what hosting service and/or what software routine(s) should be ordered. Again, it should be noted that this depiction of this particular mechanism of the use of highlighting of portion(s) of menu(s) and/or of tabs associated with menus presented as pages to provide visual notice of a condition requiring attention is an example of one possible approach to providing a visual notice.

Turning to FIG. 17E, as depicted, the control routine 2540 executed within the control device 2500 may include an interpretation component 2542 to interpret various forms of unique encoding, formatting and/or organization of data that may be employed within various instances of service data 3131*cld* and/or 3131*sft*, as previously discussed. In so doing, the interpretation component 2542 may employ information in corresponding instances of the options data 3333*cld* and/or 3333*sft* about such encoding, formatting and/or organization of data.

As also depicted, and presuming that the interoperability check discussed above in reference to FIG. 17D either did not reveal any issues, or revealed issues that were successfully addressed, the validation component 2543 may employ information within either the retrieved instance of the service data 3131*cld* (as interpreted by the interpretation component 2542) or the corresponding instance of the options data 3333*cld* concerning accessing the node device(s) 2700 of the selected cloud provider to determine whether the selected hosting service thereof is already in use to host one or more existing computing clusters. As further depicted in this example, such an existing computing cluster 2777-1 is identified as being already hosted across multiple ones of the node devices 2700, or across multiple VMs 2707 within one or more node devices 2700.

In response to having identified the existing computing cluster 2777-1 as already being hosted using the same hosting service that was selected by the customer for use in hosting the new computing cluster, the retrieval component may retrieve settings data 3535-1 and/or observation data 3739-1 for the existing computing cluster 2777-1 from the one or more data devices 2300. As previously discussed, the settings data 3535-1 may represent a record of the set of configuration settings that were selected in configuring the existing computing cluster 2777-1, including and not limited to, the selection of hosting service (which has been found to be the same hosting service as those planned for use with the new computing cluster) and/or the selection of one or more software routines for the existing computing cluster 2777-1 (which may or may not include one or more software routines also selected for use with the new computing cluster). As also previously discussed, the observation data 3739-1 may include indications observations of the performance of the existing computing cluster 2777-1 that have been collected and assembled over time. Together, these two retrieved items may provide a very complete picture of the configuration and the observed performance of the operation of the existing computing cluster 2777-1.

Turning to FIG. 17F, with such information concerning the existing computing cluster 2777-1 having been gathered, the UI component 2549 may use portions of the information within the settings data 3535-1 and/or within the observation data 3739-1 to generate a menu 4940 concerning "Existing Clusters" (as indicated by the text of the corresponding tab 4941) for being presented on the display 2980 of the depicted UI device 2900. Within the menu 4940, a drop-down sub-menu 4942 may enable the selection of which existing computing cluster to view information for. Since it may be that no other existing computing clusters were identified beyond the existing computing cluster 2777-1, the drop-down sub-menu 4942 may present the existing computing cluster 2777-1 as the only available choice.

With the single existing computing cluster 2777-1 so selected for viewing within the menu 4940, it may be that various details concerning its status may be visually presented, such as the depicted date of deployment, the date on which it was last used (currently depicted as "n/a" as a reflection of still being currently in use), and/or a more explicit visual indication that the existing computing cluster 2777-1 is in use (which may be based on timestamps for the most recent observations of the existing computing cluster 2777-1 that are stored within the observation data 3739-1). As depicted, the indication of the existing computing cluster 2777-1 as being currently in use may be provided by a pair of radio buttons 4943, which in some embodiments, may also be operable for being selected to actually cause the existing computing cluster 2777-1 to be remotely commanded to enter into operation so as to be in use, and/or to cease operation so as to become disused.

Such a retrieval and visual presentation of information concerning existing computing clusters that are already being hosted within the selected hosting service may be deemed desirable to provide the customer with an indication of already ongoing consumption of at least some of the resources provided by the selected hosting service, and/or an indication of already ongoing consumption of at least some of the resources afforded by a license for selected software routine(s). More specifically, where the existing computing cluster 2777-1 is currently in use, it may be currently consuming both storage resources (e.g., quantities of volatile, persistent and/or virtual storage, etc.) and/or processing resources (e.g., processors, processor cores, etc.). Alternatively or additionally, where the existing computing cluster 2777-1 is currently in use, it may also be currently consuming a portion of the limited quantity of licensed instances of at least one software routine. As a result, various aspects of the configuration of the new computing cluster may need to take into account a sharing of such resources between the two computing clusters. However, where the existing computing cluster 2777-1 is transitioned out of use such that it is disused (and especially where it is not planned to be used again, or not planned to be used simultaneously with the new computing cluster), it may be that just a subset of the persistent storage resources provided by hosting service are used for the long term storage of software and/or data associated with the existing computing cluster 2777-1. As a result of being disused, the existing computing cluster 2777-1 may not consume volatile and/or virtual storage resources, may not consume processing resources, and/or may not consume software-related resources (e.g., a quantity containers provided by a resource allocation routine 3710, and/or a quantity of licensed instances of a support routine 3740).

Turning to FIG. 17G, the retrieval component 2541 may search the data device(s) 2300 for instances of the settings data 3535 and/or cluster models 3339 that are associated with other computing clusters that employ an identical combination of hosting service and software routine(s) to what is selected for the new computing cluster. Again, the information concerning what hosting service was ordered by the customer, and/or what software routine(s) were licensed by the customer, for the new computing cluster may be provided by the earlier retrieved instances of the service data 3131*cld* and/or 3131*sft*.

As previously discussed, the one or more data device(s) 2300 may store cluster models 3339 that have been derived from observations of aspects of the performance of either individual computing clusters, or sets of multiple computing clusters, that employ an identical combination of hosting service and software routine(s) to what is selected for the new computing cluster. Since the new computing cluster has never before been created or operated, there cannot yet be a cluster model 3339 based on observations of aspects of its performance. Thus, for purposes of configuring the new computing cluster, the use of a cluster model 3339 that is associated with one or more existing computing clusters employing an identical combination of hosting service and software routine(s) may be the closest available analog thereto.

However, as those skilled in the art will readily recognize, even between two computing clusters that start out as being identically configured, and start out with identical hardware components and software routines, various differences can still arise between them over time that may beget differences in their performances. By way of example, differences in how each of the two computing clusters are used, and/or in their quantities of users, may beget differing observations in at least some aspects of how each performs. Alternatively or additionally, the inevitable replacement of various components of the computing devices that host each computing cluster may create even slight differences that may, over time, cause the performance of each computing cluster to differ from the other. Also alternatively or additionally, differences may arise in other external factors, such as the speed and/or capacities of their network connections that may also, over time, cause performance differences. Thus, and as will be discussed in greater detail, it may be preferred to eventually replace a cluster model 3339 generated for a different existing computing cluster, but which was nonetheless used in the initial configuration of the new computing cluster, with a cluster model 3339 that is later generated from observations of the performance of the new computing cluster.

As also previously discussed, each instance of settings data 3535 may be generated as a record of the set of settings for the configuration of a single computing cluster. However, where multiple computing clusters of substantially similar configuration (if not identical configuration) are to be created, it may be that the instance of settings data 3535 generated to record the set of settings for the first of those multiple computing clusters may then be used to speed the creation of the others of those multiple computing clusters. Alternatively or additionally, even where a later-created computing cluster is not meant to have an identical configuration to an earlier-created computing cluster, an instance of settings data 3535 that records the settings of the earlier-created computing cluster may still be useful as a template that serves as a starting point for the configuration of the later-created computing cluster where there are still substantial similarities therebetween, including where both computing clusters employ identical combinations of hosting service and software routine(s). Thus, and as noted in FIG. 17G, each of the one or more instances of settings data 3535 that may be retrieved from the data device(s) 2300 may be useful as a template that may serve as a starting point for configuring the new computing cluster as a result of being selected for retrieval based on employing an identical combination of hosting service and software routine(s).

Turning to FIGS. 17H through 17J, as previously discussed, the earlier-retrieved instance of service data 3131*cld* for the selected hosting service for the new computing cluster may include indications of levels of various resources that may be provided by, and/or that may be required for, the selected level of hosting service to be provided by the selected cloud provider for the new computing cluster. Similarly, each of the earlier-retrieved instances of service data 3131sft for one of the selected software routine(s) for the new computing cluster may include indications of levels of various resources that may be provided by, and/or that may be required for, a selected software routine that has been licensed by the customer for the new computing cluster. Thus, these retrieved instances of service data 3131cld and/or 3131sft may, together, define one or more minimum and/or maximum levels of resources that are able to be provided by the combination of hosting service and software routines selected by the customer. As also previously discussed, each instance of settings data 3535 retrieved as a candidate for use as a template may provide a record of a configuration for how one or more levels of the resources provided by such a combination may be allocated and/or used in a computing cluster.

The validation component 2543 may employ a combination of such information associated with such levels of resources provided by the retrieved instances of service data 3131cld and 3131sft, and/or the retrieved instances of options data 3333cld and 3333sft to evaluate each instance of settings data 3535 that is retrieved as a candidate for use as a template as part of identifying which of the retrieved instance(s) of settings data 3535 specifies settings for levels of resources for the new computing cluster that are able to be accommodated. Where it has been discovered that an existing computing cluster, such as the computing cluster 2777-1 of FIGS. 17E-F, is already being hosted by the selected hosting service and/or is already using a portion of a license for one or more of the selected software routines, the validation component 2543 may additionally employ such information concerning levels of resources specified within the settings data 3535-1 and/or the observation data 3739-1 that are each associated with the existing computing cluster 2777-1 as part of taking into account at least the levels of resources that are being consumed by the existing computing cluster 2777-1.

Turning more specifically to FIG. 17H, and by way of example, it may be that, as a result of the presence and in-use status of the existing computing cluster 2777-1 within the set of node devices 2700, or within the set of VMs 2707, in which the new computing cluster is to be hosted, the validation component 2543 may determine that there is an insufficient level of one or more of the processing, storage and/or licensed software resources remaining available to support the addition of the new computing cluster therein with a configuration based on any of the instances of settings data 3535 that were retrieved as candidates for serving as a template. Thus, instead of being able to provide a recommendation, within the depicted menu 4950, of a template (based on one of the retrieved instances of settings data 3535) for either of a larger scale high availability configuration or a smaller scale minimum configuration, the UI component 2549 may generate a visual presentation of the menu 4950 with visual indications of a current inability to provide such recommendations.

More specifically, and as depicted, it may be that the buttons 4952 that would otherwise be operable to select one or the other of a template for a minimum configuration or a template for a high availability configuration are both highlighted with a color or other shading that indicates that neither are operable to select a template. Further, and as also depicted, it may be that the tab 4951 for the menu 4950 is also highlighted with a color or other shading, as well as the tab 4941 for the menu 4940 for "Existing Clusters" (more fully shown in FIG. 14F) in which the existing computing cluster 2777-1 was identified as present. In a manner similar to what was earlier depicted and discussed in reference to FIG. 17D, such highlighting of the two tabs 4941 and 4951 may provide a visual indication that an issue has been identified that is associated with aspect(s) of the configuration of the new computing cluster that span the two menus 4940 and 4950, respectively. More specifically, in this case, such highlighting serves to provide an indication that the presence and in-use status of the existing computing cluster 2777-1 currently prevents further progress in configuring the new computing cluster.

FIG. 17I depicts a different situation in which there may not be an existing computing cluster 2777-1 such that all of the resources provided by of the selected hosting service and of the selected software routine(s) are available for the new computing cluster; or a situation in which the existing computing cluster 2777-1 is present, but in a disused status such that it consumes relatively few resources to simply remain stored in persistent storage. However, as another alternative, the situation may be that the level of resources provided by one or more of the selected hosting service and the selected software routine(s) are not quite sufficient to support a larger scale computing cluster. As a result, the validation component 2543 may determine that there is an insufficient level of one or more of the processing, storage and/or licensed software resources available to support the addition of the new computing cluster with a configuration based on one or more of the retrieved instances of settings data 3535 that are for larger scale computing clusters. However, the validation component 2543 may also determine that there are sufficient levels of all of such resources needed to support the addition of the new computing cluster with a configuration based on one or more of the retrieved instances of settings data 3535 that are for smaller scale computing clusters.

Thus, and as depicted, the UI component 2549 may generate a visual presentation of the menu 4950 with highlighting or other shading of the button 4952 for the selection of a template for a larger scale high availability computing cluster to indicate that it is not operable to select such a template. As also depicted, it may be that the tab 4951 for the menu 4950 is also highlighted with a color or other shading, as well as the tab 4931 for the menu 4930 for "Amazon Web Services" as the selected cloud provider in this example. Again, in a manner similar to what was earlier depicted and discussed in reference to FIGS. 17D and 17H, such highlighting of the two tabs 4931 and 4951 may provide a visual indication that an issue has been identified that is associated with aspects of the configuration of the selected level of hosting service provided by the selected cloud provider that spans the two menus 4930 and 4950, respectively. More specifically, in this case, such highlighting serves to provide an indication that at least one aspect of the currently selected level of hosting service prevents configuring the new computing cluster as a larger scale computing cluster.

In contrast, and as also depicted, the generated visual presentation of the menu 4950 includes a button 4952 that is operable to select a template to use as a starting point for configuring the new computing cluster as a smaller scale computing cluster. As depicted, there may be highlighting of the border of that button 4952 to indicate that it is both operable for being so selected, and that it is the recommended template to choose based on the levels of resources that are available for the new computing cluster.

FIG. 17J depicts still another situation in which, again, there may not be an existing computing cluster 2777-1 such that all of the resources provided by the selected hosting service and by the selected software routine(s) are available for the new computing cluster; or where the existing computing cluster 2777-1 is present, but in a disused status such that it consumes relatively few resources to simply remain stored in persistent storage. Additionally, unlike the situation depicted in FIG. 17I, it may be that the level of resources provided by the selected hosting service and by the selected software routine(s) are sufficient to support a larger scale computing cluster. As a result, the validation component 2543 may determine that there are sufficient resources available to support the addition of the new computing cluster with either a configuration based on one or more of the retrieved instances of settings data 3535 that are for larger scale computing clusters, or a configuration based on one or more of the retrieved instances of settings data 3535 that are for smaller scale computing clusters.

Thus, and as depicted, the UI component 2549 may generate a visual presentation of the menu 4950 that includes both a button 4952 that is operable to select a template to use as a starting point for configuring the new computing cluster as a smaller scale computing cluster, and another button 4952 that is operable to select a different template to use as a starting point for configuring the new computing cluster as a larger scale computing cluster. As depicted, there may be highlighting of the border of that other button 4952 for the larger scale computing cluster to indicate that it is associated with the recommended template based on the levels of resources that are available.

Referring back to all three of FIGS. 17H through 17J, each of the depicted visual presentations of the menu 4950 also include a button 4952 operable to choose to commence with configuring the new computing cluster without the use of a template as a starting point (i.e., the button labeled as "Custom"). If this button 4952 is selected, then the customer may still be guided through making configuration choices for the new computing cluster, but without the provision of default configuration choices that could simply be accepted in instances where the customer is uncertain of one or more of the choices for a configuration setting.

Additionally, each of these visual presentations of the menu 4950 also include another button 4952 operable to enable the customer to select a template (i.e., select an instance of settings data 3535) of the customer's choice for use as a starting point. As previously discussed, being able to select a particular instance of settings data 3535 may be deemed desirable where there is a desire to configure the new computing cluster to have configuration settings that are identical to (i.e., a "clone" of) the configuration settings of another existing computing cluster.

FIG. 17K depicts an example of a menu 4960 of configuration choices with a tab 4961 labeling the menu 4960 as being associated with the new computing cluster, for which the name "Cluster-2" may have been provided by the customer in response to the existing "Cluster-1" having been identified as already being hosted using at least the very same selected hosting service. As previously discussed, and regardless of whether a template is selected by the customer, the UI component 2549 proceeds with visually guiding the customer through what may be a wide variety of configuration settings that may depend on what aspects of the selected hosting service and/or each selected software routine are to be configured. By way of example, in the depicted example menu 4960, there are text boxes 4962 into which settings may be manually entered such as the quantity of pods, as well as the amounts of volatile storage and/or persistent storage to be provided for each pod. As also depicted, there are also radio buttons 4963 that allow a choice of whether to provide each pod with access to persistent storage.

As also previously discussed, it may be that, as such guidance through configuration settings is being provided by the UI component 2549, and as choices are being made by the customer for various configuration settings, the validation component 2543 may repeatedly use such newly provided choices for configuration settings as further input to a check for the introduction of a conflict between configuration settings that specify levels of resources and/or performance that are to be provided (or able to be provided) and levels of resources that are to be consumed (or are predicted by a cluster model 3339 to be consumed). In embodiments where, as depicted herein, configuration settings may be presented as sets of settings in distinct menu pages, it may be that the validation component 2543 performs such repeated checks each time the making of choices for configuration settings on a menu page is completed, which may be indicated by guided progress to a next menu page.

Turning to FIG. 17L, as depicted, the control routine 2540 executed within the control device 2500 may include a generation component 2544 to generate an instance of settings data 3535-2 that records the configuration choices made by the customer in configuring the new computing cluster, and/or instance(s) of configuration data 3537-2 for the configuration of the selected hosting service and/or at least a subset of the selected software routine(s) for the new computing cluster. As previously discussed, one or more of the instances of the configuration data 3537-2 may include a script that is generated in a particular scripting language required for the selected hosting service or for a selected software routine. Again, each instance of the options data 3333*cld* and/or 3333*sft* may contain information concerning the particular scripting language that may be used (e.g., syntax rules, vocabulary, text formatting rules, etc.) by the generation component 2544 in generating such script within one of the instances of the configuration data 3537-2.

As also depicted, upon completion of the guidance through the configuration of the new computing cluster, the UI component 2549 may present a menu 4970 (labeled with the depicted tab 4971 as "Script Generation") in which the option may be provided (via the depicted button 4972 labeled "Generate Configuration Scripts") to the customer to proceed with generating configuration scripts for use in deploying the new computing cluster. In response to the selection of that particular button 4972, the generation component 2544 may be triggered to proceed with the generation of the instances of the configuration data 3537-2, as just discussed. As additionally depicted, the menu 4970 may also include another button 4972 (labeled "View/Edit Scripts") that may be operable to allow the customer to directly read and/or to manually edit of one or more of the configuration scripts that may be so generated by the configuration component 2544.

FIG. 17M depicts an example of a text editing field 4980 that may be generated by the UI component for visual presentation on the display 2980. As depicted, the UI component 2549 may retrieve numerous lines of scripting text 4981 from one of the instances of the configuration data 3537-2 for being visually presented within the text editing field 4980. As has been discussed, this may enable a customer who is skilled in the scripting language used for the selected hosting service or for a selected software routine to manually introduce customizations to the scripting text that may provide one or more customized configuration settings that the guided configuration process provided no opportunity to include.

Turning to FIG. 17N, following such editing of a configuration script of one of the instances of the configuration data 3537-2, and as previously discussed, the interpretation component 2542 may interpret the particular lines of scripting text 4981 that are associated with such a customization to determine what change to a level of a resource and/or to a level of performance may have been made thereby. The validation component 2543 may then use such a change as another input to another performance of checks of levels of resources and/or of performance to determine if a conflict among configuration settings has been introduced by such a customization. As depicted, if such a conflict is found to have been introduced, then the particular lines of scripting text 4981 may be highlighted with a color or other shading within the text editing field 4980 to identify them to the customer. As also depicted, it may be that one of the earlier presented menus (i.e., the depicted menu 4960) may also be visually presented, and with highlighting that may visually indicate what configuration setting therein is in conflict with that customization. In this way, the customer may be prompted to make changes to the customization and/or to one or more configuration settings within one or more menus to address the conflict.

Returning to FIG. 17L, regardless of whether no customizations are made, or no conflicts were identified with the customizations that are made, or the identified conflicts are resolved, once the configuring of the new computing cluster is complete, the customer may operate the input device 2920 to select another of the buttons 4972 of the menu 4970 that is labeled "Deploy Cluster" to cause the deployment of the new computing cluster, as has been previously discussed, above.

Figure 18A:
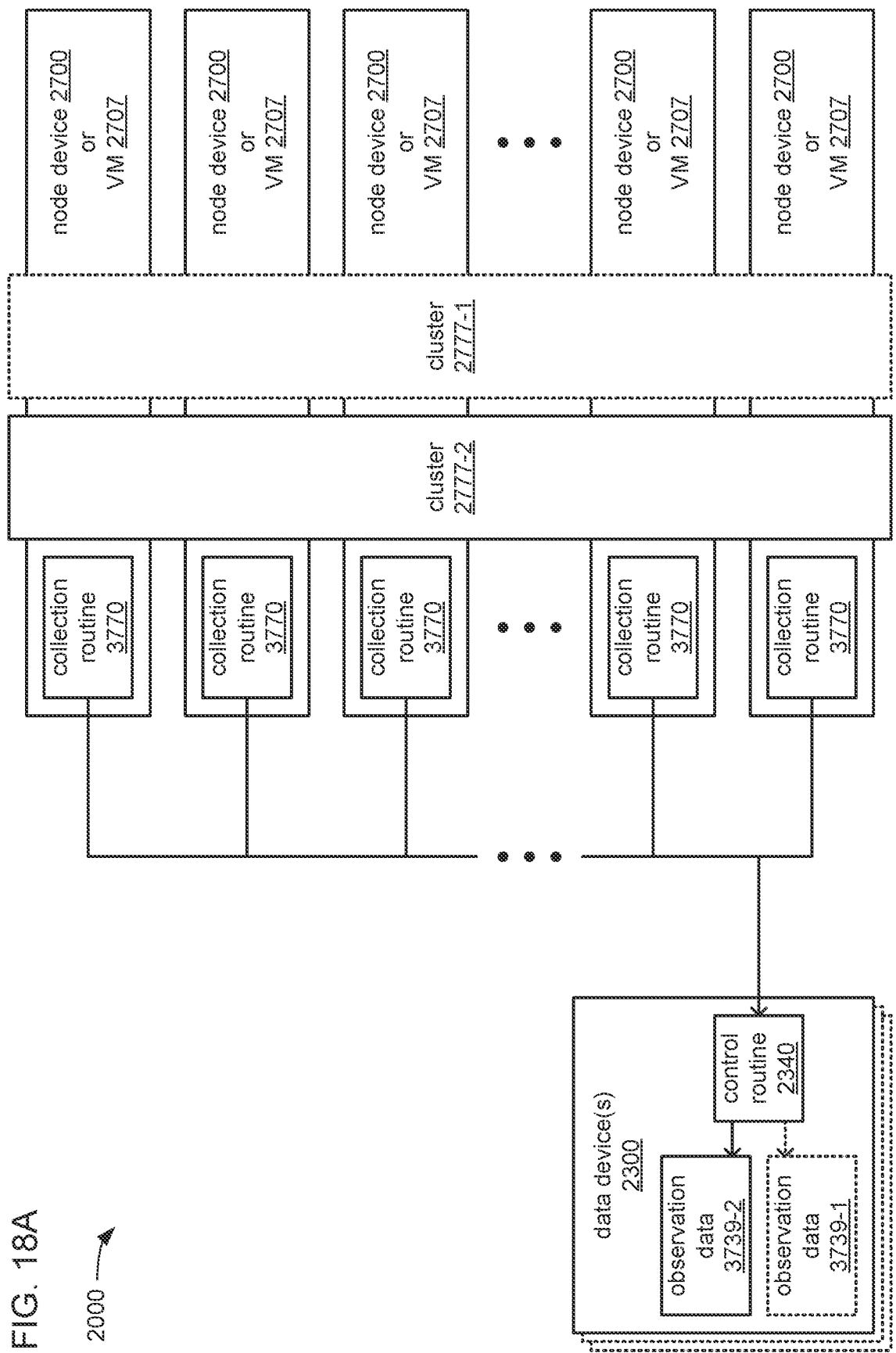
FIGS. 18A and 18B, together, illustrate aspects of an example embodiment of use of the distributed processing system of either FIG. 14A or 14B to analyze the performance of a new computing cluster to determine whether a new model of the new cluster is to be generated.
Figure 18B:
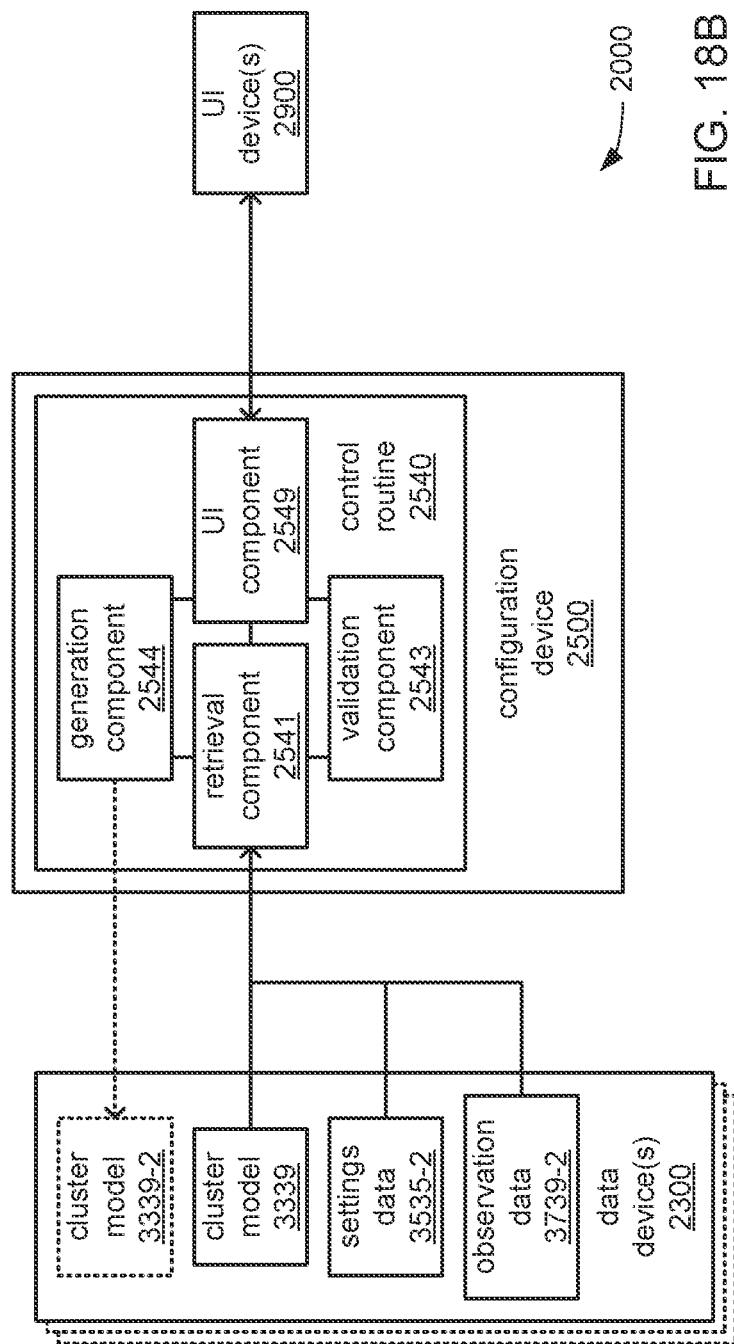

FIGS. 18A and 18B, taken together, set forth a more detailed presentation of aspects of an example of analyzing aspects of observations of the performance of the new computing cluster 2777-2 that was configured as depicted and discussed in the example of FIGS. 17A-N to determine how closely those aspects of its performance conform to what was predicted as part of determining whether a new model of the new computing cluster 2777-2 is to be generated from those observations.

Turning to FIG. 18A, as previously discussed, the new computing cluster 2777-2 that may have been configured as described in reference to FIGS. 17A-N may then be deployed so as to be hosted by either a set of the node devices 2700 or a set of the VMs 2707. Again, the new computing cluster 2777-2 may be so deployed alongside the existing computing cluster 2777-1, which as depicted with dotted lines, may be disused such that it consumes relatively little of the resources being provided for the new computing cluster 2777-2.

As also previously discussed, as the new computing cluster 2777-2 is operated, instances of the collection routine 3770 may monitor aspects of the performance of the computing cluster 2777-2 within each of the node devices 2700 or VMs 2707 in which it is hosted, and may transmit portions of data conveying indications of those observations back to the one or more data devices 2300. Within the one or more data devices, execution of the control routine 2340 may cause the assembly of those received portions of data into at least one instance of observation data 3739-2 to include observations of the performance of the whole of the new computing cluster 2777-2 over a period of time. As also depicted, at an earlier time when the existing computing cluster 2777-1 may have been operated, it may be that at least one instance of observation data 3739-1 may have been similarly assembled for the existing computing cluster 2777-1.

Turning to FIG. 18B, as previously discussed, it may be that, at a recurring interval of time, the retrieval component 2541 of the configuration device 2500 retrieves, from the one or more data devices 2300, at least the most recent instance of the observation data 3739-2, the settings data 3535-2 that records the set of configuration settings used in the last performance of the configuration of the new computing cluster 2777-2 (which in this case was the initial performance of configuration of the new computing cluster 2777-2), and/or the cluster model 3339 that was used in the last performance of the configuration of the new computing cluster 2777-2 (which, again, was the initial performance). Again, the recurring interval of time on which such retrievals for analysis may occur may be multiple minutes, one or more hours, etc.

Following each such retrieval of these items from the one or more data devices 2300, the validation component 2543 may perform various analyses of the observation data 3739-2, including comparisons of various observed levels of actual provision and/or actual consumption of resources to determine whether those observed levels fall within the levels specified during configuration of the new computing cluster 2777-2, as recorded in the settings data 3535-2. As previously discussed, it may be that instances of a level failing to fall within such specified levels, and/or instances of such levels approaching such failure to within a predetermined degree, may trigger the provision of notices of such events to the customer. In response, the customer may employ one or more of the UI devices 2900 to interact with the control device 2500 to use the UI thereof to view various visual presentations detailing aspects of such events.

Although not specifically depicted, such visual presentations may include various graphs that include timelines depicting when such events occurred and/or their duration. Further, in a manner somewhat similar to what is depicted in FIG. 17N, it may be that such visual depictions of such events may include the visual presentation of customized configuration settings and/or customized lines of configuration scripts (e.g., instances of configuration data 3537-2 that include a script) that are associated with such events, and that may be visually highlighted to draw attention thereto.

In addition to and/or in lieu of, such comparisons of such observed levels to such explicitly specified levels from configuration of the new computing cluster 2777-2, it may be that such observed levels may be compared to predictions that had been made of some levels of provision and/or of consumption of resources that were made using the retrieved cluster model 3339 during configuration to determine the degree of accuracy of those predictions. As depicted, where such predictions fail to be accurate to within a preselected degree, the observed levels of the retrieved instance of the observation data 3739-2 may be used to generate a new cluster model 3339-2 that is specific to the new computing cluster 2777-2 in recognition of the retrieved cluster model 3339 that is based on observations of the performance of a different computing cluster of similar configuration is not sufficiently accurate to continue to be used for the new computing cluster 2777-2.

Further, and as also previously discussed, where the accuracy of previous predictions has proven to not meet the preselected degree accuracy such that the generation of a new cluster model has been triggered (or an existing cluster model has been updated), then a recommendation may be provided to the customer that configuration of the new computing cluster 2777-2 be repeated, thereby providing an opportunity to gain the benefits of the greater accuracy that is likely to be provided by using such a new or updated cluster model (e.g., the new cluster model 3339-2 generated specifically for the new computing cluster 2777-2).

In various embodiments, each of the processors 2150, 2350, 2550, 2750 and 2950 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor(s) 2750 of each of the one or more node devices 2700 may be selected to efficiently perform the analysis of multiple instances of pre-processing, processing and/or post-processing operations at least partially in parallel. By way of example, the processor(s) 2750 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor(s) 2750 may incorporate multi-threaded capabilities and/or multiple processor cores to enable parallel performances of the tasks of more than job flow.

In various embodiments, each of the control routine 2140, 2340, 2540, 2770, 2940, 3710, 3740 and 3770, including the components of which each is composed, may be selected to be operative on whatever type of processor or processors that are selected to implement applicable ones of the processors 2150, 2350, 2550, 2750 and/or 2950 within each one of the devices 2100, 2300, 2500, 2700 and/or 2900, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2350, 2550, 2750 and/or 2950. Where one or more device drivers are included, those device drivers may provide support for any of a variety of other components, whether hardware or software components, of the devices 2100, 2300, 2500, 2700 and/or 2900.

In various embodiments, each of the storages 2160, 2360, 2560, 2760 and 2960 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the input device(s) 2520 and/or 2920 may be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display(s) 2580 and/or 2980 may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may be a touchscreen display such that the input device 2720 may be incorporated therein as touch-sensitive components thereof.

In various embodiments, each of the network interfaces 2190, 2390, 2590, 2790 and 2990 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

In various embodiments, API architectures that may be employed to support communications among the devices 2100, 2300, 2500, 2700 and/or 2900 may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes.

In various embodiments, Hadoop®, an open-source framework for storing and analyzing big data in a distributed computing environment, may be used.

The invention claimed is:

1. An apparatus comprising:
a computing cluster that employs a combination of at least a selected level of hosting service and a selected resource allocation routine, wherein:
  an initial set of configuration settings for the computing cluster is generated during an initial configuration of the computing cluster performed at a time prior to operation of the computing cluster;
  the initial configuration of the computing cluster is based on at least one prediction generated using a pre-existing cluster model that is derived from observations of operation of at least one pre-existing computing cluster; and
  the at least one pre-existing computing cluster employs a combination of at least a level of hosting service and a resource allocation routine that is identical to the combination of at least the selected level of hosting service and the selected resource allocation routine of the computing cluster;
at least one node device to provide the selected level of hosting service to host the computing cluster, wherein:
  the at least one node device provides a level of a processing resource and a level of a storage resource to support execution of the selected resource allocation routine;
  the selected resource allocation routine allocates the processing resource and the storage resource of the at least one node device through provision of multiple containers; and
  each container of the multiple containers provides an execution environment in which to execute instructions of an executable routine to perform a task; and
at least one processor and a storage to store instructions that, when executed by the at least one processor, cause the at least one processor to perform operations comprising:
  use at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster;
  compare the predicted level to a corresponding observed level of resource consumed or of performance provided; and
  in response to the predicted level not matching the observed level to within a pre-selected degree, perform operations comprising:
    derive a new cluster model from observations of the operation of the computing cluster; and
    generate a prompt to perform a repetition of the configuration of the computing cluster using the new cluster model in place of the pre-existing cluster model to generate a new set of configuration settings for the computing cluster that replaces the initial set of configuration settings.

2. The apparatus of claim 1, wherein:
the prompt to perform the repetition of the configuration of the computing cluster is generated in a user interface (UI); and
the at least one processor is caused to perform operations comprising:
  compare the observed level of resource consumed or of performance provided to a corresponding minimum level or maximum level specified in the initial set of configuration settings; and
  in response to the observed level falling below the corresponding minimum level, or in response to the observed level rising above the corresponding maximum level, generate the UI to include an indication of the minimum level not being reached or an indication of the maximum level being exceeded.

3. The apparatus of claim 2, wherein:
during the initial configuration of the computing cluster, an initial configuration script to configure at least one of the selected level of hosting service or the selected resource allocation routine was generated based on the initial set of configuration settings;
the initial configuration script was edited to include a customization of at least one configuration setting of the initial set of configuration settings that is associated with the corresponding minimum level or maximum level; and
generation of the UI to include an indication of the minimum level not being reached or an indication of the maximum level being exceeded comprises the at least one processor being caused to generate a view of a portion of the initial configuration script that includes the customization of the at least one configuration setting.

4. The apparatus of claim 1, wherein:
during the initial configuration of the computing cluster, an initial interoperability check of the combination of at least the selected level of hosting service and the selected resource allocation routine was performed to determine whether at least the selected level of hosting service and the selected resource allocation routine are interoperable with each other;
the prompt to perform the repetition of the configuration of the computing cluster is generated in a user interface (UI); and
in response to receiving, from an input device used to provide the UI, input indicative of a choice to perform a repetition of the configuration of the computing cluster, the at least one processor is caused to perform operations comprising:

retrieve first data specifying at least one of a known incompatibility or a known affinity of the selected level of hosting service with at least one resource allocation routine;

retrieve second data specifying at least one of a known incompatibility or a known affinity of the selected resource allocation routine with at least one hosting service;

perform a repetition of the interoperability check for the combination of at least the selected level of hosting service and the selected resource allocation routine based on the first data and the second data to determine whether the selected level of hosting service and the selected resource allocation routine are interoperable with each other; and in response to a determination that the selected level of hosting service and the selected resource allocation routine are not interoperable with each other, generate an indication that the selected level of hosting service and the selected resource allocation routine are not interoperable for presentation by through the UI.

5. The apparatus of claim 1, wherein:

the prompt to perform the repetition of the configuration of the computing cluster is generated in a user interface (UI); and in response to receiving, from an input device used to provide the UI, input indicative of a choice to perform a repetition of the configuration of the computing cluster, the at least one processor is caused to perform operations comprising:

retrieve, from among multiple stored sets of configuration settings associated with multiple other computing clusters, at least one alternate set of configuration settings associated with at least one other computing cluster that employs a combination of at least a level of hosting service and a resource allocation routine that is identical to the combination of at least the selected level of hosting service and the selected resource allocation routine of the computing cluster;

generate the UI to include a prompt to choose between using the initial set of configuration settings, and using an alternate set of configuration settings of the at least one alternate set of configuration settings, as a template of default configuration settings for the repetition of the configuration of the computing cluster to generate the new set of configuration settings;

receive, from the input device, input indicative of a selection of a set of configuration settings to use as the template of default configuration settings;

perform an initial check of the selected set of configuration settings to determine whether the selected set of configuration settings includes a conflict among the selected set of configuration settings; and in response to a determination that the selected set of configuration settings includes a conflict among the selected set of configuration settings, perform operations comprising:

generate an indication of the conflict for presentation in the UI; and receive a change to a configuration setting as an input from the input device.

6. The apparatus of claim 5, wherein:

the new cluster model includes at least one correlation between a level of resources consumed by the computing cluster and a level of performance provided by the computing cluster based on the observations of the operation of the computing cluster; and performing the initial check of the selected set of configuration settings comprises the at least one processor performing operations comprising:

use an observation of at least one of a level of resource consumed by operation of the computing cluster or a level of performance provided by operation of the computing cluster as an input to the new cluster model to derive a predicted level of resource consumed or of performance provided; and compare the predicted level to a corresponding minimum level or maximum level of resource consumed or of performance provided that is specified in the selected set of configuration settings to determine whether the selected set of configuration settings includes a conflict among the selected set of configuration settings.

7. The apparatus of claim 5, wherein the at least one processor is caused to perform operations comprising:

generate a new configuration script to configure at least one of the selected level of hosting service or the selected resource allocation routine based on the new set of configuration settings;

generate an editing portion of the UI comprising a visual presentation of text of the new configuration script to enable editing of the text of the new configuration script via operation of the input device to introduce a customization of at least one configuration setting into the new configuration script;

after completion of the editing of the text of the new configuration script, parse the new configuration script to interpret the at least one customization;

perform a check of the new set of configuration settings to determine whether the customization creates a conflict between the customization and at least one other configuration setting; and in response to a determination that the customization creates a conflict between the customization and at least one other setting, generate an indication of the conflict between the customization and the at least one other setting for presentation in the UI.

8. The apparatus of claim 1, wherein:

the computing cluster employs a combination of the selected level of hosting service, the selected resource allocation routine and a selected support routine;

the level of the processing resource and the level of the storage resource provided by the at least one node device support execution of the selected support routine in addition to the selected resource allocation routine;

the selected support routine provides a library of at least one callable routine able to be called by the executable routine executed within a container of the multiple containers;

the pre-existing cluster model is derived from observations of multiple pre-existing computing clusters that each employ a combination of a level of hosting service, a resource allocation routine and a support routine that is identical to the combination of the selected level of hosting service, the selected resource allocation routine and the selected support routine of the computing cluster; and deriving the new cluster model from the observations of the operation of the computing cluster comprises the at least one processor updating the pre-existing cluster model to become additionally based on the observations of the operation of the computing cluster to generate the new cluster model.

9. The apparatus of claim 1, wherein:
the at least one node device comprises multiple node devices;
the computing cluster comprises the multiple node devices to form a cluster of physical computing devices; and
the level of the processing resource comprises at least one of:
  a quantity of node devices of the multiple node devices;
  a quantity of processors provided by the multiple node devices; or
  a quantity of cores of the processors provided by the multiple node devices; and
the level of storage resource comprises at least one of:
  a quantity of volatile storage provided by the multiple node devices;
  a quantity of nonvolatile storage provided by the multiple node devices; or
  a quantity of virtual storage provided within the quantity of nonvolatile storage provided by the multiple node devices.

10. The apparatus of claim 1, wherein:
the computing cluster comprises multiple virtual machines (VMs) instantiated within the at least one node device to form a cluster of virtual computing devices; and
the level of the processing resource comprises at least one of:
  a quantity of VMs of the multiple VMs;
  a quantity of processors of the at least one node device that are provided to the multiple VMs; or
  a quantity of cores of the processors of the at least one node device that are provided to the multiple VMs; and
the level of storage resource comprises at least one of:
  a quantity of volatile storage of the at least one node device that is provided to the multiple VMs;
  a quantity of nonvolatile storage of the at least one node device that is provided to the multiple VMs; or
  a quantity of virtual storage within the quantity of nonvolatile storage that is provided to the multiple VMs.

11. A computer-program product tangibly embodied in a non-transitory machine-readable storage medium, the computer-program product including instructions operable to cause at least one processor to conditionally repeat configuration of a computing cluster, wherein:
the computing cluster employs a combination of at least a selected level of hosting service and a selected resource allocation routine;
an initial set of configuration settings for the computing cluster is generated during an initial configuration of the computing cluster performed at a time prior to operation of the computing cluster;
the initial configuration of the computing cluster is based on at least one prediction generated using a pre-existing cluster model that is derived from observations of operation of at least one pre-existing computing cluster;
the at least one pre-existing computing cluster employs a combination of at least a level of hosting service and a resource allocation routine that is identical to the combination of at least the selected level of hosting service and the selected resource allocation routine of the computing cluster;

at least one node device provides the selected level of hosting service to host the computing cluster;
the selected level of hosting service defines a level of processing resource and a level of storage resource provided by the at least one node device to support execution of a selected resource allocation routine;
the selected resource allocation routine allocates the processing resource and the storage resource of the at least one node device through provision of multiple containers;
each container of the multiple containers provides an execution environment in which to execute instructions of an executable routine to perform a task; and
the at least one processor is caused to perform operations comprising:
  use at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster;
  compare the predicted level to a corresponding observed level of resource consumed or of performance provided; and
  in response to the predicted level not matching the observed level to within a pre-selected degree, perform operations comprising:
    derive a new cluster model from observations of the operation of the computing cluster; and
    generate a prompt to perform a repetition of the configuration of the computing cluster using the new cluster model in place of the pre-existing cluster model to generate a new set of configuration settings for the computing cluster that replaces the initial set of configuration settings.

12. The computer-program product of claim 11, wherein:
the prompt to perform the repetition of the configuration of the computing cluster is generated in a user interface (UI); and
the at least one processor is caused to perform operations comprising:
  compare the observed level of resource consumed or of performance provided to a corresponding minimum level or maximum level specified in the initial set of configuration settings; and
  in response to the observed level falling below the corresponding minimum level, or in response to the observed level rising above the corresponding maximum level, generate the UI to include an indication of the minimum level not being reached or an indication of the maximum level being exceeded.

13. The computer-program product of claim 12, wherein:
during the initial configuration of the computing cluster, an initial configuration script to configure at least one of the selected level of hosting service or the selected resource allocation routine was generated based on the initial set of configuration settings;
the initial configuration script was edited to include a customization of at least one configuration setting of the initial set of configuration settings that is associated with the corresponding minimum level or maximum level; and
generation of the UI to include an indication of the minimum level not being reached or an indication of the maximum level being exceeded comprises the at least one processor being caused to generate a view of a portion of the initial configuration script that includes the customization of the at least one configuration setting.

14. The computer-program product of claim 11, wherein:
during the initial configuration of the computing cluster, an initial interoperability check of the combination of at least the selected level of hosting service and the selected resource allocation routine was performed to determine whether at least the selected level of hosting service and the selected resource allocation routine are interoperable with each other;
the prompt to perform the repetition of the configuration of the computing cluster is generated in a user interface (UI); and
in response to receiving, from an input device used to provide the UI, input indicative of a choice to perform a repetition of the configuration of the computing cluster, the at least one processor is caused to perform operations comprising:
  retrieve first data specifying at least one of a known incompatibility or a known affinity of the selected level of hosting service with at least one resource allocation routine;
  retrieve second data specifying at least one of a known incompatibility or a known affinity of the selected resource allocation routine with at least one hosting service;
  perform a repetition of the interoperability check for the combination of at least the selected level of hosting service and the selected resource allocation routine based on the first data and the second data to determine whether the selected level of hosting service and the selected resource allocation routine are interoperable with each other; and
  in response to a determination that the selected level of hosting service and the selected resource allocation routine are not interoperable with each other, generate an indication that the selected level of hosting service and the selected resource allocation routine are not interoperable for presentation by through the UI.

15. The computer-program product of claim 11, wherein:
the prompt to perform the repetition of the configuration of the computing cluster is generated in a user interface (UI); and
in response to receiving, from an input device used to provide the UI, input indicative of a choice to perform a repetition of the configuration of the computing cluster, the at least one processor is caused to perform operations comprising:
  retrieve, from among multiple stored sets of configuration settings associated with multiple other computing clusters, at least one alternate set of configuration settings associated with at least one other computing cluster that employs a combination of at least a level of hosting service and a resource allocation routine that is identical to the combination of at least the selected level of hosting service and the selected resource allocation routine of the computing cluster;
  generate the UI to include a prompt to choose between using the initial set of configuration settings, and using an alternate set of configuration settings of the at least one alternate set of configuration settings, as a template of default configuration settings for the repetition of the configuration of the computing cluster to generate the new set of configuration settings;
  receive, from the input device, input indicative of a selection of a set of configuration settings to use as the template of default configuration settings;
  perform an initial check of the selected set of configuration settings to determine whether the selected set of configuration settings includes a conflict among the selected set of configuration settings; and
  in response to a determination that the selected set of configuration settings includes a conflict among the selected set of configuration settings, perform operations comprising:
    generate an indication of the conflict for presentation in the UI; and
    receive a change to a configuration setting as an input from the input device.

16. The computer-program product of claim 15, wherein:
the new cluster model includes at least one correlation between a level of resources consumed by the computing cluster and a level of performance provided by the computing cluster based on the observations of the operation of the computing cluster; and
performing the initial check of the selected set of configuration settings comprises the at least one processor performing operations comprising:
  use an observation of at least one of a level of resource consumed by operation of the computing cluster or a level of performance provided by operation of the computing cluster as an input to the new cluster model to derive a predicted level of resource consumed or of performance provided; and
  compare the predicted level to a corresponding minimum level or maximum level of resource consumed or of performance provided that is specified in the selected set of configuration settings to determine whether the selected set of configuration settings includes a conflict among the selected set of configuration settings.

17. The computer-program product of claim 15, wherein the at least one processor is caused to perform operations comprising:
  generate a new configuration script to configure at least one of the selected level of hosting service or the selected resource allocation routine based on the new set of configuration settings;
  generate an editing portion of the UI comprising a visual presentation of text of the new configuration script to enable editing of the text of the new configuration script via operation of the input device to introduce a customization of at least one configuration setting into the new configuration script;
  after completion of the editing of the text of the new configuration script, parse the new configuration script to interpret the at least one customization;
  perform a check of the new set of configuration settings to determine whether the customization creates a conflict between the customization and at least one other configuration setting; and
  in response to a determination that the customization creates a conflict between the customization and at least one other setting, generate an indication of the conflict between the customization and the at least one other setting for presentation in the UI.

18. The computer-program product of claim 11, wherein:
the computing cluster employs a combination of the selected level of hosting service, the selected resource allocation routine and a selected support routine;
the level of the processing resource and the level of the storage resource provided by the at least one node device support execution of the selected support routine in addition to the selected resource allocation routine;
the selected support routine provides a library of at least one callable routine able to be called by the executable routine executed within a container of the multiple containers;
the pre-existing cluster model is derived from observations of multiple pre-existing computing clusters that each employ a combination of a level of hosting service, a resource allocation routine and a support routine that is identical to the combination of the selected level of hosting service, the selected resource allocation routine and the selected support routine of the computing cluster; and
deriving the new cluster model from the observations of the operation of the computing cluster comprises the at least one processor updating the pre-existing cluster model to become additionally based on the observations of the operation of the computing cluster to generate the new cluster model.

19. The computer-program product of claim 11, wherein:
the at least one node device comprises multiple node devices;
the computing cluster comprises the multiple node devices to form a cluster of physical computing devices; and
the level of the processing resource comprises at least one of:
   a quantity of node devices of the multiple node devices;
   a quantity of processors provided by the multiple node devices; or
   a quantity of cores of the processors provided by the multiple node devices; and
the level of storage resource comprises at least one of:
   a quantity of volatile storage provided by the multiple node devices;
   a quantity of nonvolatile storage provided by the multiple node devices; or
   a quantity of virtual storage provided within the quantity of nonvolatile storage provided by the multiple node devices.

20. The computer-program product of claim 11, wherein:
the computing cluster comprises multiple virtual machines (VMs) instantiated within the at least one node device to form a cluster of virtual computing devices; and
the level of the processing resource comprises at least one of:
   a quantity of VMs of the multiple VMs;
   a quantity of processors of the at least one node device that are provided to the multiple VMs; or
   a quantity of cores of the processors of the at least one node device that are provided to the multiple VMs; and
the level of storage resource comprises at least one of:
   a quantity of volatile storage of the at least one node device that is provided to the multiple VMs;
   a quantity of nonvolatile storage of the at least one node device that is provided to the multiple VMs; or
   a quantity of virtual storage within the quantity of nonvolatile storage that is provided to the multiple VMs.

21. A computer-implemented method for conditionally repeating configuration of a computing cluster, wherein:
the computing cluster employs a combination of at least a selected level of hosting service and a selected resource allocation routine;
an initial set of configuration settings for the computing cluster is generated during an initial configuration of the computing cluster performed at a time prior to operation of the computing cluster;
the initial configuration of the computing cluster is based on at least one prediction generated using a pre-existing cluster model that is derived from observations of operation of at least one pre-existing computing cluster;
the at least one pre-existing computing cluster employs a combination of at least a level of hosting service and a resource allocation routine that is identical to the combination of at least the selected level of hosting service and the selected resource allocation routine of the computing cluster;
at least one node device provides the selected level of hosting service to host the computing cluster;
the selected level of hosting service defines a level of processing resource and a level of storage resource provided by the at least one node device to support execution of a selected resource allocation routine;
the selected resource allocation routine allocates the processing resource and the storage resource of the at least one node device through provision of multiple containers;
each container of the multiple containers provides an execution environment in which to execute instructions of an executable routine to perform a task; and
the method comprises:
   using, by at least one processor, at least one of a level of resource observed to be consumed by operation of the computing cluster or a level of performance observed to be provided by operation of the computing cluster as an input to the pre-existing cluster model to derive one of a predicted level of performance to be provided by operation of the computing cluster or of a level of resource to be consumed by operation of the computing cluster;
   comparing, by the at least one processor, the predicted level to a corresponding observed level of resource consumed or of performance provided; and
   in response to the predicted level not matching the observed level to within a pre-selected degree, performing operations comprising:
      deriving, by the at least one processor, a new cluster model from observations of the operation of the computing cluster; and
      generating, by the at least one processor, a prompt to perform a repetition of the configuration of the computing cluster using the new cluster model in place of the pre-existing cluster model to generate a new set of configuration settings for the computing cluster that replaces the initial set of configuration settings.

22. The computer-implemented method of claim 21, wherein:
the prompt to perform the repetition of the configuration of the computing cluster is generated in a user interface (UI); and
the method comprises:
   comparing, by the at least one processor, the observed level of resource consumed or of performance provided to a corresponding minimum level or maximum level specified in the initial set of configuration settings; and in response to the observed level falling below the corresponding minimum level, or in response to the observed level rising above the corresponding maximum level, generating, by the at least one processor, the UI to include an indication of the minimum level not being reached or an indication of the maximum level being exceeded.

23. The computer-implemented method of claim 22, wherein:

during the initial configuration of the computing cluster, an initial configuration script to configure at least one of the selected level of hosting service or the selected resource allocation routine was generated based on the initial set of configuration settings;

the initial configuration script was edited to include a customization of at least one configuration setting of the initial set of configuration settings that is associated with the corresponding minimum level or maximum level; and generating the UI to include an indication of the minimum level not being reached or an indication of the maximum level being exceeded comprises generating, by the at least one processor, a view of a portion of the initial configuration script that includes the customization of the at least one configuration setting.

24. The computer-implemented method of claim 21, wherein:

during the initial configuration of the computing cluster, an initial interoperability check of the combination of at least the selected level of hosting service and the selected resource allocation routine was performed to determine whether at least the selected level of hosting service and the selected resource allocation routine are interoperable with each other;

the prompt to perform the repetition of the configuration of the computing cluster is generated in a user interface (UI); and the method comprises, in response to receiving, from an input device used to provide the UI, input indicative of a choice to perform a repetition of the configuration of the computing cluster, performing operations comprising:

retrieving first data specifying at least one of a known incompatibility or a known affinity of the selected level of hosting service with at least one resource allocation routine;

retrieving second data specifying at least one of a known incompatibility or a known affinity of the selected resource allocation routine with at least one hosting service;

performing, by the at least one processor, a repetition of the interoperability check for the combination of at least the selected level of hosting service and the selected resource allocation routine based on the first data and the second data to determine whether the selected level of hosting service and the selected resource allocation routine are interoperable with each other; and in response to a determination that the selected level of hosting service and the selected resource allocation routine are not interoperable with each other, generating by the at least one processor, an indication that the selected level of hosting service and the selected resource allocation routine are not interoperable for presentation by through the UI.

25. The computer-implemented method of claim 21, wherein:

the prompt to perform the repetition of the configuration of the computing cluster is generated in a user interface (UI); and the method comprises, in response to receiving, from an input device used to provide the UI, input indicative of a choice to perform a repetition of the configuration of the computing cluster, performing operations comprising:

retrieving, from among multiple stored sets of configuration settings associated with multiple other computing clusters, at least one alternate set of configuration settings associated with at least one other computing cluster that employs a combination of at least a level of hosting service and a resource allocation routine that is identical to the combination of at least the selected level of hosting service and the selected resource allocation routine of the computing cluster;

generating, by the at least one processor, the UI to include a prompt to choose between using the initial set of configuration settings, and using an alternate set of configuration settings of the at least one alternate set of configuration settings, as a template of default configuration settings for the repetition of the configuration of the computing cluster to generate the new set of configuration settings;

receiving, from the input device, input indicative of a selection of a set of configuration settings to use as the template of default configuration settings;

performing, by the at least one processor, an initial check of the selected set of configuration settings to determine whether the selected set of configuration settings includes a conflict among the selected set of configuration settings; and in response to a determination that the selected set of configuration settings includes a conflict among the selected set of configuration settings, performing operations comprising:

generating, by the at least one processor, an indication of the conflict for presentation in the UI; and receiving a change to a configuration setting as an input from the input device.

26. The computer-implemented method of claim 25, wherein:

the new cluster model includes at least one correlation between a level of resources consumed by the computing cluster and a level of performance provided by the computing cluster based on the observations of the operation of the computing cluster; and performing the initial check of the selected set of configuration settings comprises:

using, by the at least one processor, an observation of at least one of a level of resource consumed by operation of the computing cluster or a level of performance provided by operation of the computing cluster as an input to the new cluster model to derive a predicted level of resource consumed or of performance provided; and comparing, by the at least one processor, the predicted level to a corresponding minimum level or maximum level of resource consumed or of performance provided that is specified in the selected set of configuration settings to determine whether the selected set of configuration settings includes a conflict among the selected set of configuration settings.

27. The computer-implemented method of claim 25, comprising:
generating, by the at least one processor, a new configuration script to configure at least one of the selected level of hosting service or the selected resource allocation routine based on the new set of configuration settings;
generating, by the at least one processor, an editing portion of the UI comprising a visual presentation of text of the new configuration script to enable editing of the text of the new configuration script via operation of the input device to introduce a customization of at least one configuration setting into the new configuration script;
after completion of the editing of the text of the new configuration script, parsing, by the at least one processor, the new configuration script to interpret the at least one customization;
performing, by the at least one processor, a check of the new set of configuration settings to determine whether the customization creates a conflict between the customization and at least one other configuration setting; and
in response to a determination that the customization creates a conflict between the customization and at least one other setting, generating by the at least one processor, an indication of the conflict between the customization and the at least one other setting for presentation in the UI.

28. The computer-program product of claim 21, wherein:
the computing cluster employs a combination of the selected level of hosting service, the selected resource allocation routine and a selected support routine;
the level of the processing resource and the level of the storage resource provided by the at least one node device support execution of the selected support routine in addition to the selected resource allocation routine;
the selected support routine provides a library of at least one callable routine able to be called by the executable routine executed within a container of the multiple containers;
the pre-existing cluster model is derived from observations of multiple pre-existing computing clusters that each employ a combination of a level of hosting service, a resource allocation routine and a support routine that is identical to the combination of the selected level of hosting service, the selected resource allocation routine and the selected support routine of the computing cluster; and
deriving the new cluster model from the observations of the operation of the computing cluster comprises updating, by the at least one processor, the pre-existing cluster model to become additionally based on the observations of the operation of the computing cluster to generate the new cluster model.

29. The computer-implemented method of claim 21, wherein:
the at least one node device comprises multiple node devices;
the computing cluster comprises the multiple node devices to form a cluster of physical computing devices; and
the level of the processing resource comprises at least one of:
a quantity of node devices of the multiple node devices;
a quantity of processors provided by the multiple node devices; or
a quantity of cores of the processors provided by the multiple node devices; and
the level of storage resource comprises at least one of:
a quantity of volatile storage provided by the multiple node devices;
a quantity of nonvolatile storage provided by the multiple node devices; or
a quantity of virtual storage provided within the quantity of nonvolatile storage provided by the multiple node devices.

30. The computer-implemented method of claim 21, wherein:
the computing cluster comprises multiple virtual machines (VMs) instantiated within the at least one node device to form a cluster of virtual computing devices; and
the level of the processing resource comprises at least one of:
a quantity of VMs of the multiple VMs;
a quantity of processors of the at least one node device that are provided to the multiple VMs; or
a quantity of cores of the processors of the at least one node device that are provided to the multiple VMs; and
the level of storage resource comprises at least one of:
a quantity of volatile storage of the at least one node device that is provided to the multiple VMs;
a quantity of nonvolatile storage of the at least one node device that is provided to the multiple VMs; or
a quantity of virtual storage within the quantity of nonvolatile storage that is provided to the multiple VMs.

* * * * *